US009454532B2

(12) United States Patent
Powell et al.

(10) Patent No.: US 9,454,532 B2
(45) Date of Patent: Sep. 27, 2016

(54) METHOD AND APPARATUS FOR MIGRATION OF A VIRTUALIZED FILE SYSTEM, DATA STORAGE SYSTEM FOR MIGRATION OF A VIRTUALIZED FILE SYSTEM, AND FILE SERVER FOR USE IN A DATA STORAGE SYSTEM

(71) Applicant: Hitachi Data Systems Engineering UK Limited, Berkshire (GB)

(72) Inventors: Richard Powell, Maidenhead (GB); James Gibbs, Wokingham (GB); Daniel Picken, Berkshire (GB); Timothy Warner, Farnborough (GB); Zahra Tabaaloute, Southampton (GB); Chris Aston, Hughenden Valley (GB); Jon Smith, Bracknell (GB); Ray Brown, Berkshire (GB); Joseph Smith, Berkshire (GB); Michael Benson, Reading (GB)

(73) Assignee: HITACHI DATA SYSTEMS ENGINEERING UK LIMITED, Berkshire (GB)

( * ) Notice: Subject to any disclaimer, the term of this patent is extended or adjusted under 35 U.S.C. 154(b) by 242 days.

(21) Appl. No.: 14/373,050

(22) PCT Filed: Jul. 2, 2013

(86) PCT No.: PCT/EP2013/063911
§ 371 (c)(1),
(2) Date: Jul. 18, 2014

(87) PCT Pub. No.: WO2015/000503
PCT Pub. Date: Jan. 8, 2015

(65) Prior Publication Data
US 2015/0213032 A1   Jul. 30, 2015

(51) Int. Cl.
G06F 17/00 (2006.01)
G06F 17/30 (2006.01)
G06F 3/06 (2006.01)

(52) U.S. Cl.
CPC ....... *G06F 17/30079* (2013.01); *G06F 3/0607* (2013.01); *G06F 3/067* (2013.01); *G06F 3/0647* (2013.01); *G06F 17/30197* (2013.01); *G06F 17/30233* (2013.01)

(58) Field of Classification Search
CPC .......................... G06F 17/30; G06F 17/30079
USPC .................................................. 707/600–899
See application file for complete search history.

(56) References Cited

U.S. PATENT DOCUMENTS 6,938,039 B1   8/2005   Bober et al.
6,959,310 B2   10/2005   Eshel et al.
(Continued)

FOREIGN PATENT DOCUMENTS

EP   0 926 585 A2   6/1999
EP   1 209 556 A2   5/2002
(Continued)

OTHER PUBLICATIONS

International Search Report received in International Application No. PCT/EP2013/063910 dated Jan. 3, 2014.
(Continued)

*Primary Examiner* — Isaac M Woo
(74) *Attorney, Agent, or Firm* — Mattingly & Malur, PC

(57) ABSTRACT

The present invention relates to a method and an apparatus for data migration of a first file system in a data storage system comprising a plurality of client computers 100, a first file system managing unit 310 for managing the first file system and being connected to the plurality of client computers 100, and a second file system managing unit 410 for managing a second file system and being connected to the first file system managing unit 310, the second file system comprising a plurality of data files and the first file system comprising a plurality of external link objects, each external link object of the first file system being associated with a respective data file of the second file system for enabling client access to the respective data file of the second file system.

19 Claims, 31 Drawing Sheets

(56) References Cited

U.S. PATENT DOCUMENTS

| | | |
|---|---|---|
| 7,330,950 B2 | 2/2008 | Matsunami et al. |
| 7,457,822 B1 | 11/2008 | Barrall et al. |
| 7,587,436 B2 | 9/2009 | Agetsuma et al. |
| 7,603,397 B1 | 10/2009 | Hagerstrom et al. |
| 2003/0018624 A1* | 1/2003 | Hsiao ............... G06F 17/30094 |
| 2003/0182525 A1 | 9/2003 | O'Connell et al. |
| 2006/0129537 A1 | 6/2006 | Torii et al. |
| 2006/0212481 A1 | 9/2006 | Stacey et al. |
| 2008/0028169 A1 | 1/2008 | Kaplan et al. |
| 2009/0006888 A1 | 1/2009 | Bernhard et al. |
| 2009/0044046 A1 | 2/2009 | Yamasaki |
| 2009/0112947 A1 | 4/2009 | Bourbonnais et al. |
| 2009/0248762 A1 | 10/2009 | Prahlad et al. |
| 2009/0271451 A1 | 10/2009 | Young et al. |
| 2009/0313311 A1 | 12/2009 | Hoffmann et al. |
| 2011/0078112 A1 | 3/2011 | Takata et al. |
| 2012/0150799 A1 | 6/2012 | Matsuzawa |

FOREIGN PATENT DOCUMENTS

| | | |
|---|---|---|
| EP | 2178005 A2 | 4/2010 |
| EP | 2 219 106 A2 | 8/2010 |
| JP | 2005316708 A1 | 11/2005 |
| JP | 2008040699 A2 | 2/2008 |

OTHER PUBLICATIONS

European Search Report received in corresponding European Application No. 14176056 dated Aug. 6, 2014.

Anonymous: "Indir(1)—Linux man page", Dec. 6, 2007, XP002727655.

Anonymous: "CP(1)", Dec. 12, 2000, XP002727656.

Elwaywitac et al.: "Recursively symlink", Oct. 28, 2012, XP002727657.

Urbano, Randy, Oracle Database—Advanced Replication 10g Release 1 (10.1), Part No. B10732-01; Dec. 2003; 342 pages.

European Search Report received in corresponding European Application No. 14176065 dated Oct. 23, 2014.

* cited by examiner

| Name | Object type | Object ID | Virtualization status | Object status |
|---|---|---|---|---|
| /root | directory | 001 | virtualized | complete |
| /dir1 | directory | 002 | virtualized | complete |
| /dir2 | directory | 003 | virtualized | complete |
| file1 | file | 004 | virtualized | needs migration |
| file2 | file | 005 | virtualized | needs migration |
| /dir11 | directory | 006 | virtualized | complete |
| /dir12 | directory | 007 | virtualized | complete |
| /dir21 | directory | 008 | virtualized | complete |
| file8 | file | 015 | virtualized | needs migration |
| /dir111 | directory | 010 | virtualized | complete |
| file4 | file | 011 | virtualized | needs migration |
| file9 | file | 016 | virtualized | needs migration |
| file10 | file | 014 | virtualized | needs migration |
| file5 | file | 012 | virtualized | needs migration |
| file6 | file | 013 | virtualized | needs migration |
| file3 | file | 009 | virtualized | needs migration |
| file7 | file | 014 | virtualized | needs migration |
| | | | | |
| | | | | |
| | | | | |

341a, 341b, 341c, 341d

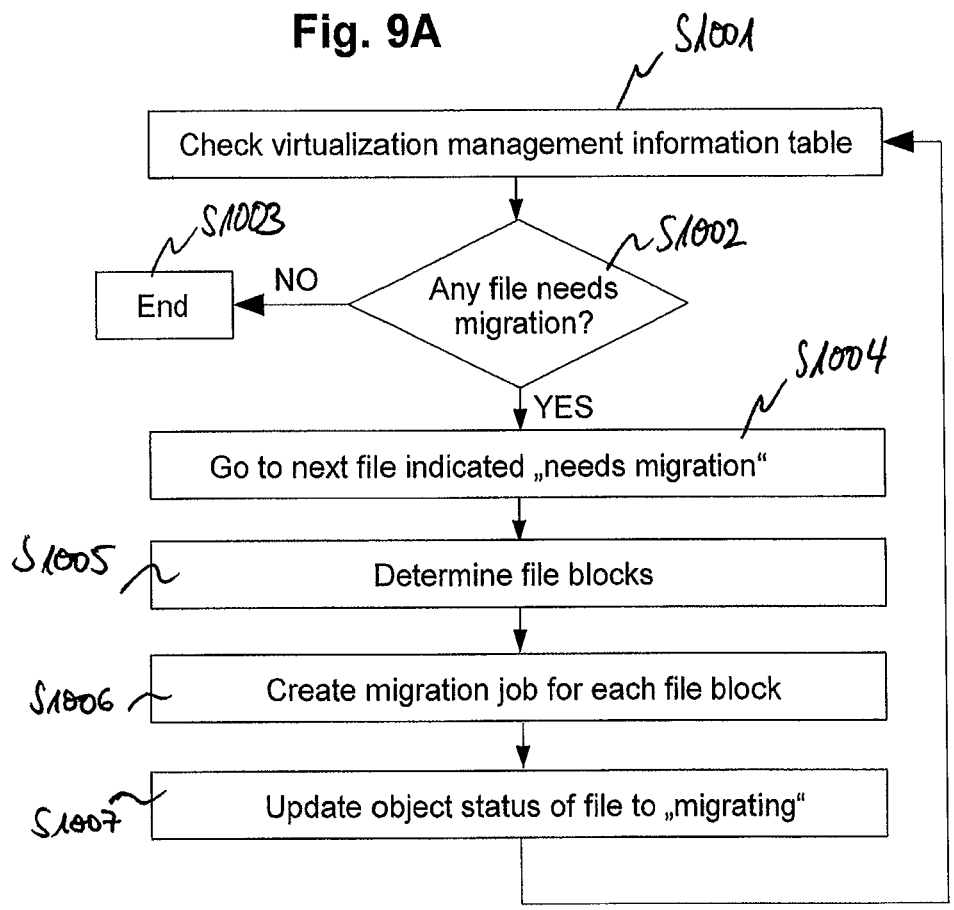

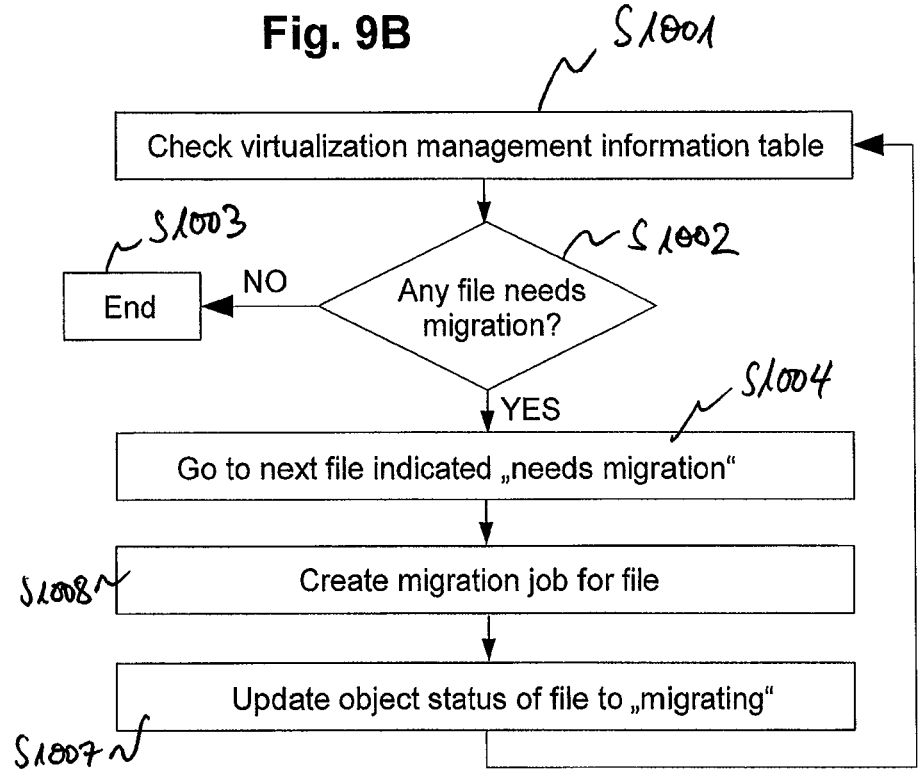

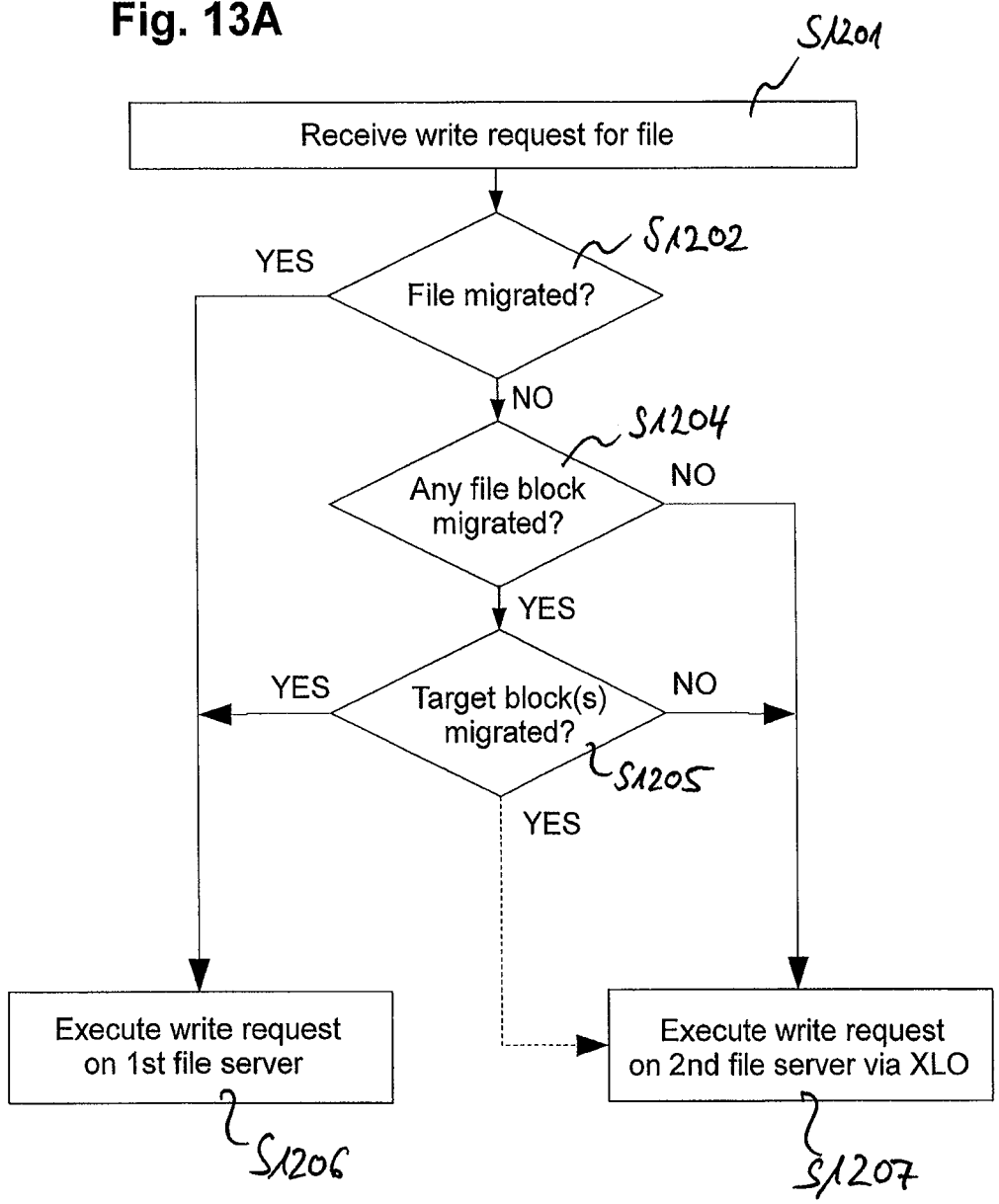

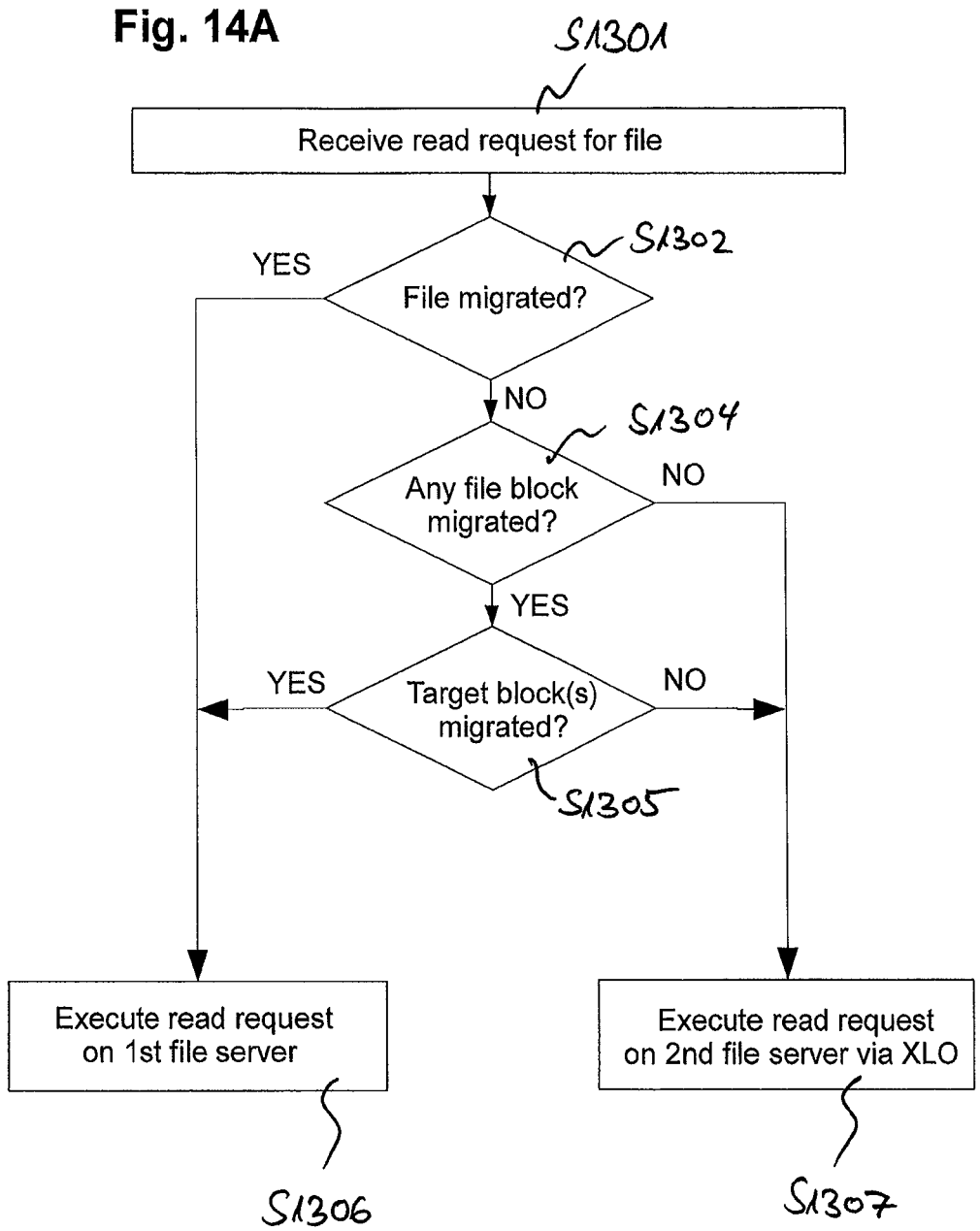

METHOD AND APPARATUS FOR MIGRATION OF A VIRTUALIZED FILE SYSTEM, DATA STORAGE SYSTEM FOR MIGRATION OF A VIRTUALIZED FILE SYSTEM, AND FILE SERVER FOR USE IN A DATA STORAGE SYSTEM

The present invention relates to a method, and apparatus and a data storage system for data migration of a virtualized file system, and a file server for use in such data storage system.

BACKGROUND

In the prior art, there are known data storage systems such as e.g. described in connection with FIG. 1A below, in which multiple client computers are connected via a communication network with one or more file server systems managing one or more file systems for I/O access by the client computers. At certain times, it may be desirable to exchange the one or more (legacy) file servers with new file servers in order to improve performance of the whole data storage system, e.g., because the newer file servers may be adapted to manage more file systems or larger file systems (including enabling more data storage space and/or larger number of file system objects), enable more efficient input/output (I/O) performance, enable use of larger storage units or storage units containing more efficient storage device technologies.

Still, it may be desirable to keep the already existing file system(s) including file system structure (such as an existing file tree structure) and user data (file content) thereof, while it is, in principle, desirable to enable the users to access the existing file system(s) without interruption or at least with only a single interruption that is as short as possible. An example of an apparatus and a method for a hard-ware based file system is described in U.S. Pat. No. 7,457,822 B1, which is herein incorporated by reference.

SUMMARY

As described in more detail below, embodiments of the invention may be related to a data storage system, and parts thereof, in which a (new) first file system managing unit is interconnected between a plurality of client computers and a (legacy) second file system managing unit which manages one or more file systems accessible by the client computers.

After interconnecting the (new) first file system managing unit, I/O access by the client computers to the one or more file systems of the (legacy) second file system managing unit may be achieved through the (new) first file system managing unit. In a first phase referred to as virtualization, the one or more file systems of the (legacy) second file system managing unit may be represented by one or more virtualized file systems of the (new) first file system managing unit, the virtualized file systems being built incrementally during the virtualization phase. In a second phase (which may overlap with the virtualization phase), referred to migration, user data of the one or more file systems of the (legacy) second file system managing unit may be migrated to the (new) first file system managing unit.

According to the present invention, it is an object to provide a method, and apparatus, a data storage system and a file server for performing efficient data migration of user data in a virtualized file system from a second file system while enabling efficient and seamless client access to the file system objects of the second file system.

According to some embodiments, there may be provided an apparatus for data migration of a first file system in a data storage system comprising a plurality of client computers, a (new) first file system managing unit for managing the first file system and being connected to the plurality of client computers, and a (legacy) second file system managing unit for managing a second file system and being connected to the first file system managing unit, the second file system comprising a plurality of data files and the first file system (virtualized file system) comprising a plurality of external link objects (as a sort of virtual file), each external link object of the first file system being associated with a respective data file of the second file system for enabling client access to the respective data file of the second file system, in particular for enabling indirect client access to the respective data file of the second file system through the respective external link object of the first file system.

Accordingly, user data of the data files of the second file system managed by the second file system managing unit can be indirectly accessed by the client computers through respective external link objects (as a sort of virtual file) in the (virtualized) first file system, even before the actual user data is migrated.

In some embodiments, the apparatus may comprise the first file system managing unit adapted to divide file content data of a first file of the second file system into a first group of migration data blocks, and/or migrate file content data of a first file of the second file system from the second file system managing unit to the first file system managing unit in units of migration data blocks of the first group of migration data blocks. This has the advantage that user data of files of the second file system can be migrated successively to the first file system in blocks of data.

In some embodiments, client access to data content of a migration data block of the first group of migration data blocks may be blocked (queued, temporarily held off) while the respective migration data block is migrated from the second file system managing unit to the first file system managing unit, and client access requests directed to the respective migration data block of the first group of migration data blocks received during migration of the respective migration data block are queued and executed after the respective migration data block of the first group of migration data blocks has been migrated.

When it is described that client access to data content of a migration data block of the first group of migration data blocks is blocked (queued), this means that the client access is queued until client access is enabled again in that the term "blocked" is used in the process/thread scheduling sense, i.e. the client access is queued in the sense of being temporarily held off. The only noticeable effect on the client side may be some additional latency, but as soon as client access is enabled again, the queued access may preferably be processed, and no I/O error message is issued. That is, client access (I/O access) to blocked data blocks is queued until their migration completes, thus the only effect that can be perceived by the client is some additional latency.

In preferred aspects, client access to data content of the first group of migration data blocks may be enabled for all migration data blocks, which have been migrated from the second file system managing unit to the first file system managing unit, and for all migration data blocks, which have not yet started migration from the second file system managing unit to the first file system managing unit.

This has the advantage that even while a certain block of data is migrated, all blocks of the same file may be accessed seamlessly by the client computers. In addition, user access to all other files of the second data system may remain enabled during migration of a block of the certain file. That is, access to the migrating block of the file may be blocked (queued) only for periods of time during migration of the one migrating block of the file, but remain enabled in all other times, including times of migration of other blocks of the same file.

In alternative embodiments, client access to data content of the first file may be blocked (queued, temporarily held off) while a respective migration data block of the first group is migrated from the second file system managing unit to the first file system managing unit. This has the advantage that even while a certain block of data of a certain file is migrated, at least all other files of the second data system may be accessed seamless by the client computers. That is, access to a certain file may be blocked (queued, temporarily held off) only for periods of time during migration of one or more blocks of the certain file, but remain enabled in all other times.

In some embodiments, the first file system managing unit may be adapted to determine a block size of data migration data blocks of the first group of migration data blocks as the smaller value of a maximal block size as supported by the first file system management unit for receiving data blocks and the maximal block size as supported by the second file system management unit for sending data blocks. This has the advantage that block size is determined as large as possible in order to efficiently migrate file content in as few migration steps possible, while each data block can still be migrated by a single read operation because the block size is smarter or equal than both of a maximal block size as supported by the first file system management unit for receiving data blocks and the maximal block size as supported by the second file system management unit for sending data blocks.

In some embodiments, when a write access request directed to one or more target migration data blocks of the first group of migration data blocks is received at the first file system managing unit from a client computer, the first file system managing unit may be further adapted to determine whether at least one target migration data block has been migrated already, wherein, if at least one target migration data block has been migrated already, the write access request may be executed locally by the first file system management unit, and, if none of the target migration data blocks has started migration yet, the write access request may be passed through to the second file system management unit for being executed in the second file system by the second file system management unit.

In some embodiments, if at least one target migration data block has been migrated already, the first file system managing unit may be further adapted to further pass through the write access request to the second file system management unit for being executed in the second file system by the second file system management unit so as to be able to keep the user data of the second file system in sync with the user data of the first file system.

In some embodiments, when a write access request directed to one or more target migration data blocks of the first group of migration data blocks is received at the first file system managing unit from a client computer, the first file system managing unit may be further adapted to determine whether all target migration data blocks have been migrated already, wherein, if none of the target migration data blocks has been migrated yet, the write access request may be executed locally by the first file system management unit, and/or, when later migrating the one or more target migration data blocks of the first group of migration data blocks, the first file system managing unit may be adapted to refrain from migrating a data portion corresponding to a data write block of the write access request.

In some embodiments, when a write access request directed to one or more target migration data blocks of the first group of migration data blocks is received at the first file system managing unit from a client computer, the first file system managing unit may be further adapted to determine whether all target migration data blocks have been migrated already, wherein, if none of the target migration data blocks has been migrated yet, the write access request may be executed locally by the first file system management unit, and/or, the first file system managing unit may be further adapted to assign a checkpoint number, which is smaller than a current checkpoint number that is assigned to the data write block of the write access request, to a data hole between an end position of an already migrated data portion and a start position of a data write block of the write access request.

In preferred embodiments, the write request to a certain file may be passed through by the first file system management unit to the second file system managed by the second file system management unit at least until all blocks of the certain file have been fully migrated, so as to have a canonical version of the certain file always within the second file system, at least until the certain file is fully migrated so that the file content on the first file system may become the canonical version. In other preferred embodiments, the write request may be passed through by the first file system management unit to the second file system managed by the second file system management unit at least until all blocks of all files of the second file system have been fully migrated (i.e. until end of migration phase), so as to have a canonical version of the file always within the second file system, at least until all files are fully migrated.

The above embodiments provide advantages that it can be conveniently and efficiently determined whether to execute a user write request locally in the first file system (e.g. when all target blocks have been migrated already), locally in the second file system (e.g. when no target block has been migrated yet), or even in both of the first and second file system (e.g. when some target blocks have been migrated already). The determination may be performed on the basis of the object store length (e.g. indicating an end-of-migrated region of the first file) described below as an indication which data blocks have been migrated yet (e.g. in that the object store length indicates the blocks already migrated and/or the number of migrated blocks).

In some embodiments, when a read access request directed to one or more target migration data blocks of the first group of migration data blocks is received at the first file system managing unit from a client computer, the first file system managing unit may be further adapted to determine whether all target migration data blocks have been migrated already, wherein, if all target migration data blocks have been migrated already, the read access request may be executed locally by the first file system management unit, and, if at least one of the target migration data blocks has not started migration yet, the read access request may be passed through to the second file system management unit for being executed in the second file system by the second file system management unit, and/or, a corresponding read response received, at the first file system management unit from the second file system management unit, may be passed through by the first file system management unit to the requesting client computer.

The above embodiments provide advantages that it can be conveniently and efficiently determined whether to execute a user read request locally in the first file system (e.g. when all target blocks have been migrated already), locally in the second file system (e.g. when no or only some target blocks have been migrated yet). The determination may be performed on the basis of the object store length (e.g. indicating an end-of-migrated region of the first file) described below as an indication which data blocks have been migrated yet (e.g. in that the object store length may indicates the blocks already migrated and/or the number of migrated blocks).

In some embodiments, the first file system managing unit may be further adapted to determine, at the first file system managing unit, an object store length of file content data stored by the first file system managing unit in the first file system being associated with the first file of the second file system, determine, at the first file system managing unit based on data received from the second file system managing unit, a length of the first file of the second file system, and/or determine that all migration data blocks of the first group have been migrated when it is determined that said object store length is equal to said length of the first file. This has the advantage that it may be easily determined if or at which time the data content of the file has been fully migrated on the basis of comparison of file system attributes that are already provided in typical file systems.

The object store length (e.g. the onode length of the file in the first file system, such as a WFS onode length) of a file may correspond to the size of stored file content data already transferred (migrated) to and stored for the first file system (i.e. when the object store length of the file corresponds to the length of the file on the external second file system, this means that all data of the actual file content has been fully migrated). That is, the object store length may be regarded as representing an indication of an end-of-migrated region of user data of the file in the first file system. Before initiating migration of the file, since no actual file content data will have been transferred (migrated), the object store length will remain to be zero until the first block is migrated. Then, each migrated block may increment the object store length by one block size. The object store length may be given in storage units such as Bytes and KiloBytes or in units of numbers of blocks. It is to be noted that user writes during migration may affect the object store length (however, only when the user write is performed locally in the first file system).

The length of the file (e.g. the enode length in the second file system) may indicate the actual size of the storage space allocated to the file data (file content) in the second file system as managed by the second file system management unit in the second file system. The length of the file may be given in storage units such as Bytes and KiloBytes or in units of numbers of blocks. It is to be noted that user writes during virtualization and migration may affect the length of the file.

In some embodiments, the first file system managing unit may be further adapted to delete the external link object of the first file system being associated with the first file of the second file system when it is determined that all migration data blocks of the first group have been migrated. In some embodiments, the first file system managing unit may be further adapted to send, to the second file system management unit, a request for deletion of the first file of the second file system when it is determined that all migration data blocks of the first group have been migrated. The first file system managing unit may be adapted to update one or more flags of metadata of the first file system being associated with the first file of the second file system when it is determined that all migration data blocks of the first group have been migrated so as to indicate in the metadata of the file that the file has been fully migrated.

In some embodiments, the first file system managing unit may be further adapted to receive, from a client computer, a file creation request for creating a second file in the second file system in a path location indicated in the file creation request, and/or create the second file in the first file system based on path location indicated in the file creation request. Specifically, in some preferred embodiments, new files may be created only in the first file system as regular files without passing through the file creation request to the second file system management unit.

In addition to the creation of new files ("create" operation) being performed only at the first file system during migration phase, also the operations "unlink", "link" and/or "rename" are preferably only executed at the first file system by the first file system management unit without being passed through to the second file system management unit during migration phase.

In the instance that file metadata such as file handles of the files of the second file system being discovered during virtualization become stale during migration (e.g. if the second file system needs to be rebuilt from a backup after catastrophic failure), these can be regenerated from the view of the second (legacy) file system tree at the start of the migration as "create"/"link"/"unlink"/"rename" operations are not passed to the second file system during migration by the following two measures. First, a snapshot of the first file system can be taken at the start of the migration to save this view. Second, file metadata including a file handle for a given object can be found by deriving the path of the corresponding XLO in the snapshot and then looking up this path in the second (legacy) file system. During migration, files can be moved anywhere in the first file system, even outside the association tree (corresponding to the tree of the second file system), via rename operations, and this is without the need for a copy/delete when crossing the boundaries of the association tree.

In some embodiments, the first file system managing unit may be further adapted to determine, for a first migration data block of the first group of migration data blocks, whether said first migration data block has at least one non-zero bit, and/or refrain from migrating and or storing said first migration data block from the second file system managing unit to the first file system managing unit when it is determined that said first migration data block does not have at least one non-zero bit (i.e. is comprised entirely of zeros, has only zero-filled bits) when it is determined that the data block has only zero-filled bits and/or update metadata of the first file indicating that a storage region associated with the said first migration data block shall contain only zeros (has only zero-filled bits).

For example, instead of actually migrating and writing zeros to disk for storing the zero-filled bits in the first file system, it may be just indicated in the file's metadata that the corresponding data block shall contain only zeros (has only zero-filled bits). This allows to advantageously handle sparseness in the file to be migrated and make migration more efficient. Specifically, if sparseness is not preserved over migration and the second file system contains a lot of sparse files, the sparse files would require more space on the first storage unit, which may lead to a risk of filling the file systems with sparse files and the need for its expansion, and also the risk of affecting quotas. In order to avoid filling the first file system with sparse files, when determining that a data block to be migrated has only zero-filled bits (all bit entries of the data block being zeros), the first file system management unit may refrain from actually migrating the data of the block and only increment the onode length of the respective file by the block size. In addition, a flag of metadata of the block may be set so as to indicate that the block only contains zeros (has only zero-filled bits).

It is preferred for efficiency reasons that the step of determining for one or more data blocks, whether the respective data block has at least one non-zero bit (i.e. whether the block has only zeros) may be performed by means other than a CPU. For example, the task of determining for one or more data blocks, whether the respective data block has at least one non-zero bit (i.e. whether the block has only zeros) may be offloaded (transmitted) to one or more FPGAs (Field Programmable Gate Array) of the first file system management unit.

It is to be noted that this aspect may be provided independent of the above virtualization and migration aspects in any file system server as an independent method for determining, for a received data block, whether said data block has at least one non-zero bit, and refraining from writing the data content of the block to a storage unit if it is determined that the received data block has only zero-filled bits (i.e. does not have any non-zero bits) and/or updating metadata of the first file indicating that a storage region associated with the said first migration data block shall contain only zeros (has only zero-filled bits). In such method, preferred aspects as described below may be used for specific implementations.

In some embodiments, determining whether said first migration data block has at least one non-zero bit may be performed by the first file system management unit based on data indicative of a position of a first non-zero bit in the file content of the first file in the second file system based on a read response directed to the first file being received from the second file system management unit.

In some embodiments, determining whether said first migration data block has at least one non-zero bit may be performed by the first file system management unit by doing a byte-by-byte analysis of the first migration data block.

In some embodiments, the first file system managing unit may be further adapted to determine, for a second migration data block of the first group of migration data blocks, whether said migration data block has at least one non-zero bit, only if the usage percentage of storage space allocated for the first file in the second file system and/or a length of the first file indicating the storage space allocated for the first file in the second file system do meet one or more conditions indicating a threshold of sparseness (e.g. when the usage percentage falls below a certain threshold), and/or refrain from migrating said second migration data block from the second file system managing unit to the first file system managing unit if it is determined that said second migration data block does not have at least one non-zero bit and/or update metadata of the first file indicating that a storage region associated with the said first migration data block shall contain only zeros.

In some embodiments, the first file system managing unit may be further adapted to determine, for a second migration data block of the first group of migration data blocks, whether said migration data block has at least one non-zero bit, if a ratio of a usage percentage of storage space allocated for the first file in the second file system and a length of the first file indicating the storage space allocated for the first file in the second file system falls below a predetermined threshold, and/or refrain from migrating said second migration data block from the second file system managing unit to the first file system managing unit if it is determined that said second migration data block does not have at least one non-zero bit (i.e. is comprised entirely of zeros) bit and/or update metadata of the first file indicating that a storage region associated with the said first migration data block shall contain only zeros.

According to some embodiments, there may be provided a method for data migration of a first file system in a data storage system comprising a plurality of client computers, a first file system managing unit for managing the first file system and being connected to the plurality of client computers, and a second file system managing unit for managing a second file system and being connected to the first file system managing unit.

According to some embodiments, the second file system may comprise a plurality of data files and the first file system comprising a plurality of external link objects, each external link object of the first file system being associated with a respective data file of the second file system for enabling client access to the respective data file of the second file system.

According to some embodiments, the method may comprise dividing file content data of a first file of the second file system into a first group of migration data blocks, and migrating file content data of a first file of the second file system from the second file system managing unit to the first file system managing unit in units of migration data blocks of the first group of migration data blocks.

According to some embodiments, client access to data content of a migration data block of the first group of migration data blocks may be temporarily held off while the respective migration data block is migrated from the second file system managing unit to the first file system managing unit, and client access requests directed to the respective migration data block of the first group of migration data blocks received during migration of the respective migration data block may be queued and executed after the respective migration data block of the first group of migration data blocks has been migrated.

According to some embodiments, client access to data content of the first group of migration data blocks may be enabled for all migration data blocks, which have been migrated from the second file system managing unit to the first file system managing unit, and for all migration data blocks, which have not yet started migration from the second file system managing unit to the first file system managing unit.

According to some embodiments, a block size of data migration data blocks of the first group of migration data blocks may be determined as the smaller value of a maximal block size as supported by the first file system management unit for receiving data blocks and the maximal block size as supported by the second file system management unit for sending data blocks.

According to some embodiments, when a write access request directed to one or more target migration data blocks of the first group of migration data blocks is received at the first file system managing unit from a client computer, the method may comprise determining whether at least one target migration data block has been migrated already, wherein, if at least one target migration data block has been migrated already, the write access request may be executed locally by the first file system management unit, and, if none of the target migration data blocks has started migration yet, the write access request may be passed through to the second file system management unit and executed in the second file system by the second file system management unit.

According to some embodiments, if at least one target migration data block has been migrated already, the write access request may be further passed through to the second file system management unit and executed in the second file system by the second file system management unit.

According to some embodiments, when a write access request directed to one or more target migration data blocks of the first group of migration data blocks is received at the first file system managing unit from a client computer, the method may comprise determining whether all target migration data blocks have been migrated already, wherein, if none of the target migration data blocks has been migrated yet, the write access request may be executed locally by the first file system management unit, and, when later migrating the one or more target migration data blocks of the first group of migration data blocks, a data portion corresponding to a data write block of the write access request may be refrained from migrating.

According to some embodiments, when a write access request directed to one or more target migration data blocks of the first group of migration data blocks is received at the first file system managing unit from a client computer, the method may comprise determining whether all target migration data blocks have been migrated already, wherein, if none of the target migration data blocks has been migrated yet, the write access request may be executed locally by the first file system management unit, and, a data hole between an end position of an already migrated data portion and a start position of a data write block of the write access request may be assigned a checkpoint number smaller than a current checkpoint number that is assigned to the data write block of the write access request.

According to some embodiments, when a read access request directed to one or more target migration data blocks of the first group of migration data blocks is received at the first file system managing unit from a client computer, the method may comprise determining whether all target migration data blocks have been migrated already, wherein, if all target migration data blocks have been migrated already, the read access request may be executed locally by the first file system management unit, and, if at least one of the target migration data blocks has not started migration yet, the read access request may be passed through to the second file system management unit and executed in the second file system by the second file system management unit, the second file system management unit sending a corresponding read response to the first file system management unit which may be passed through by the first file system management unit to the requesting client computer.

According to some embodiments, the method may comprise determining, at the first file system managing unit, an object store length of file content data stored by the first file system managing unit in the first file system being associated with the first file of the second file system, determining, at the first file system managing unit, a length of the first file of the second file system, and/or determining that all migration data blocks of the first group have been migrated when it is determined that said object store length is equal to said length of the first file.

According to some embodiments, the method may comprise deleting the external link object of the first file system being associated with the first file of the second file system when it is determined that all migration data blocks of the first group have been migrated. In some embodiments, the method may further comprise deleting the first file of the second file system when it is determined that all migration data blocks of the first group have been migrated.

According to some embodiments, the method may comprise receiving, at the first file system managing unit from a client computer, a file creation request for creating a second file in the second file system in a path location indicated in the file creation request, and/or creating the second file in the first file system based on path location indicated in the file creation request.

According to some embodiments, the method may comprise determining, for a first migration data block of the first group of migration data blocks, whether said first migration data block has at least one non-zero bit, and refraining from migrating said first migration data block from the second file system managing unit to the first file system managing unit when it is determined that said first migration data block does not have at least one non-zero bit (i.e. is comprised entirely of zeros) and/or updating metadata of the first file indicating that a storage region associated with the said first migration data block shall contain only zeros.

According to some embodiments, determining whether said first migration data block has at least one non-zero bit may be performed based on data indicative of a position of a first non-zero bit in the file content of the first file in the second file system based on a read response directed to the first file being received from the second file system management unit.

According to some embodiments, determining whether said first migration data block has at least one non-zero bit may be performed by doing a byte-by-byte analysis of the first migration data block.

According to some embodiments, the method may comprise determining, for a second migration data block of the first group of migration data blocks, whether said migration data block has at least one non-zero bit, when a ratio of a usage percentage of storage space allocated for the first file in the second file system and a length of the first file indicating the storage space allocated for the first file in the second file system falls below a predetermined threshold, and/or refraining from migrating said second migration data block from the second file system managing unit to the first file system managing unit when it is determined that said second migration data block does not have at least one non-zero bit (i.e. is comprised entirely of zeros) and/or updating metadata of the first file indicating that a storage region associated with the said first migration data block shall contain only zeros.

According to further embodiments, there may be provided an apparatus for data migration of a first file system in a data storage system comprising a plurality of client computers, a first file system managing unit for managing the first file system and being connected to the plurality of client computers, and a second file system managing unit for managing a second file system and being connected to the first file system managing unit, the second file system comprising a plurality of data files and the first file system comprising a plurality of external link objects, each external link object of the first file system being associated with a respective data file of the second file system for enabling client access to the respective data file of the second file system.

According to some embodiments, the apparatus may comprise the first file system managing unit being adapted to divide file content data of a first file of the second file system into a first group of migration data blocks, and migrate file content data of a first file of the second file system from the second file system managing unit to the first file system managing unit in units of migration data blocks of the first group of migration data blocks.

Client access to data content of a migration data block of the first group of migration data blocks may be temporarily held off while the respective migration data block is migrated from the second file system managing unit to the first file system managing unit, and client access requests directed to the respective migration data block of the first group of migration data blocks received during migration of the respective migration data block are queued and executed after the respective migration data block of the first group of migration data blocks has been migrated.

According to some embodiments, client access to data content of the first group of migration data blocks may be enabled for all migration data blocks, which have been migrated from the second file system managing unit to the first file system managing unit, and for all migration data blocks, which have not yet started migration from the second file system managing unit to the first file system managing unit.

According to some embodiments, the first file system managing unit may be further adapted to execute steps of a method according to one or more of the above aspects.

According to further embodiments, there may be provided a data storage system for data migration of a first file system, the data storage system comprising a plurality of client computers, a first file system managing unit for managing the first file system and being connected to the plurality of client computers, and a second file system managing unit for managing a second file system and being connected to the first file system managing unit, the second file system comprising a plurality of data files and the first file system comprising a plurality of external link objects, each external link object of the first file system being associated with a respective data file of the second file system for enabling client access to the respective data file of the second file system.

The first file system managing unit may be adapted to divide file content data of a first file of the second file system into a first group of migration data blocks, and migrate file content data of a first file of the second file system from the second file system managing unit to the first file system managing unit in units of migration data blocks of the first group of migration data blocks Client access to data content of a migration data block of the first group of migration data blocks may be temporarily held off while the respective migration data block is migrated from the second file system managing unit to the first file system managing unit, and client access requests directed to the respective migration data block of the first group of migration data blocks received during migration of the respective migration data block are queued and executed after the respective migration data block of the first group of migration data blocks has been migrated.

In some embodiments, client access to data content of the first group of migration data blocks may be enabled for all migration data blocks, which have been migrated from the second file system managing unit to the first file system managing unit, and for all migration data blocks, which have not yet started migration from the second file system managing unit to the first file system managing unit.

According to some embodiments, the first file system managing unit may be further adapted to execute steps of a method according to one or more of the above aspects.

According to further embodiments, there may be provided a file system server for use in a data storage system as described above, comprising a first file system managing unit being further adapted to execute steps of a method according to one or more of the above aspects.

According to further embodiments, there may be provided a computer program product comprising computer program code means being configured to cause a processing unit of a file system management unit in a data storage system comprising a plurality of client computers, a first file system managing unit for managing the first file system and being connected to the plurality of client computers, and a second file system managing unit for managing a second file system and being connected to the first file system managing unit, the second file system comprising a plurality of data files and the first file system comprising a plurality of external link objects, each external link object of the first file system being associated with a respective data file of the second file system for enabling client access to the respective data file of the second file system, to execute the steps dividing file content data of a first file of the second file system into a first group of migration data blocks, and migrating file content data of a first file of the second file system from the second file system managing unit to the first file system managing unit in units of migration data blocks of the first group of migration data blocks.

Client access to data content of a migration data block of the first group of migration data blocks may be temporarily held off while the respective migration data block is migrated from the second file system managing unit to the first file system managing unit, and client access requests directed to the respective migration data block of the first group of migration data blocks received during migration of the respective migration data block are queued and executed after the respective migration data block of the first group of migration data blocks has been migrated.

In some embodiments, client access to data content of the first group of migration data blocks may be enabled for all migration data blocks, which have been migrated from the second file system managing unit to the first file system managing unit, and for all migration data blocks, which have not yet started migration from the second file system managing unit to the first file system managing unit.

According to some embodiments, the computer program product may further comprising computer program code means being configured to cause the processing unit to execute the steps of a method according to one or more of the above aspects.

BRIEF DESCRIPTION OF DRAWINGS

FIG. 7 shows an example of the virtualization management information table upon completion of virtualization of the file system tree of FIG. 4.

FIG. 9A shows an example of a flow chart of background migration management.

FIG. 9B shows another example of a flow chart of background migration management.

FIG. 13A shows an example of a flow chart of write access management during migration.

FIG. 14A shows an example of a flow chart of read access management during migration.

DETAILED DESCRIPTION

Figure 1A:
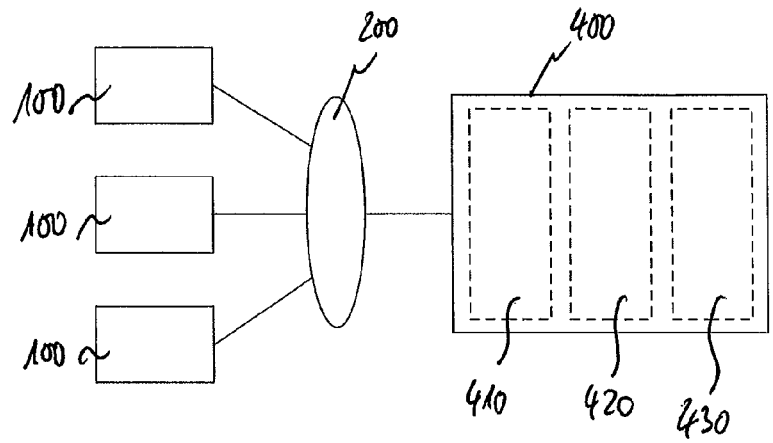
FIG. 1A shows an example of a data storage system.

In the following, preferred aspects and embodiments of the present invention will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

FIG. 1A shows an example of a data storage system comprising a plurality of client computers 100 (clients) connected via a communication network 200 to a second storage apparatus 400. The second storage apparatus 400 comprises a file system management unit 410 for managing one or more file systems, a storage unit 420 for storing user data and metadata of user data of the one or more file systems managed by the storage unit 420, and a backup storage unit 430 for performing backup of data stored in the storage unit 420 upon backup request or automatically such as e.g. periodically. The second storage apparatus 400 can be realized as a single computing device or as a system of plural devices connected to each other. For example, the file system management unit 410 can be realized as a system of one or more file system server computers connected to one or more storage devices as storage units 420 and 430 of a network attached storage (NAS).

The communication network 200 (as well as communication networks 500, 600, and 800 discussed below) may be realized as a wired communication network (such as WAN, LAN, local Fibre channel network, an Internet based network, an Ethernet communication network or the like) or a wireless communication network (such as WLAN), or any combination thereof. An underlying communication protocol may be an Fibre Channel protocol or file based protocols such as NFS-based protocols or SMB/CIFS-based protocols.

The clients 100 are adapted to access user data of the one or more file systems managed by the file system management unit 410 of the second storage apparatus 400 via the communication network 200. Specifically, users can write data to the file system, read data from the file system, create files and directories in the file system, set or read attributes of file system objects such as files and directories, modify data of the file system, delete objects of the file system and move file system objects, via each of the clients 100 connected via the network 200 to the second storage apparatus 400 depending on user individual or user group individual access policies (e.g. user access rights, user group access rights, file system permissions etc.).

At certain times, it may be desirable to exchange the second storage apparatus 400 with another newer file system managing storage apparatus in order to improve performance of the whole data storage system, e.g., because the newer file system managing storage apparatus may be adapted to manage more file systems or larger file systems (including enabling more data storage space and/or larger number of file system objects), enable more efficient input/output (I/O) performance, enable use of larger storage units or storage units containing more efficient storage device technologies. Still, it may be desirable to keep the already existing file system(s) including file system structure (such as an existing file tree structure) and user data (file content) thereof, while it is, in principle, desirable to enable the users to access the existing file system(s) without interruption or at least with only a single interruption that is as short as possible.

Figure 1B:
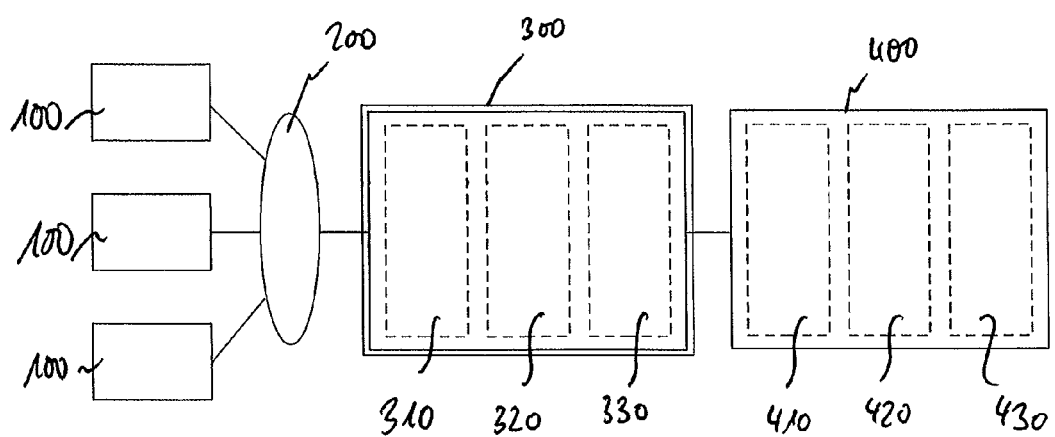
FIG. 1B shows an example of the data storage system of FIG. 1A having interconnected an additional storage apparatus.

According to some preferred aspects of the invention, it is an underlying idea that a newer first storage apparatus 300, which shall be used instead of the older legacy second storage apparatus 400 for managing the existing file system(s), is interconnected between the accessing clients 100 and the legacy second storage apparatus 400 as exemplarily illustrated in FIG. 1B, with only a single brief service interruption.

FIG. 1B shows an example of the data storage system of FIG. 1A having interconnected the additional first storage apparatus 300 in between the communication network 200 and the second storage apparatus 400 according to preferred aspects of the invention. The first storage apparatus 300 comprises a file system management unit 310 for managing one or more file systems, a storage unit 320 for storing user data and metadata of user data of the one or more file systems managed by the storage unit 320, and a backup storage unit 330 for performing backup of data stored in the storage unit 320 upon backup request or automatically such as e.g. periodically. The first storage apparatus 300 can be realized as a single computing device or as a system of plural devices connected to each other. For example, the file system management unit 310 can be realized as a system of one or more file system server computers connected to one or more storage devices as storage units 320 and 330 of a network attached storage (NAS).

Interconnecting the first storage apparatus 300 in between the communication network 200 and the second storage apparatus 400 requires only a single short interruption of file system services, during which interruption the clients 100 are disconnected and cannot access the existing file system(s) for a short period, i.e. clients 100 cannot read user data, write user data, create new file system objects such as files and directories or access file system object attributes.

After interconnecting the first storage apparatus 300 in between the communication network 200 and the second storage apparatus 400, the clients 100 remain disconnected from the second storage system 400 and can, therefore, not directly access the file system(s) managed by the second file storage apparatus 400 but only can access the file system(s) managed by the second storage apparatus 400 indirectly through the first storage apparatus 300. According to preferred aspects, it is desirable that all user access will only be addressed to the first storage apparatus 300 and no direct connections to the second storage apparatus 400 exist.

First, after interconnecting the first storage apparatus 300, the one or more file systems to be accessed by the users via the clients 100 are still held on the second storage apparatus 400 (including the user data of files and directories for organizing the files, and including metadata of the file system objects) and the first storage apparatus 300 does not hold any data of the existing file system(s).

In order to be able to handle all user access requests to the file system(s) locally on the first storage apparatus 300 and disconnect the second storage apparatus 400, all file system data (including user data and file system metadata) may eventually need to be migrated from the second storage apparatus 400 to the first storage apparatus 300. However, for large file systems containing a large number of directories and files, such data migration may take very long, and if user access were disabled or held off during migration of data until all file system data (including user data and file system metadata) would exist on the first storage apparatus 300, this would lead to disadvantageously long periods of undesirable non-accessibility of the file system(s) by the clients 100.

For minimizing the period of undesirable non-accessibility of the file system(s), the first storage system 300 is adapted to enable indirect user access to the file system(s) managed by the second storage apparatus 400 immediately after interconnecting the first storage apparatus 300.

Then, in a first phase after interconnecting the first storage apparatus 300, referred to as "Virtualization" in the following, the first storage apparatus 300 performs virtualization of the file system tree(s) of the file system(s) in which the file system tree(s) of the file system(s) which exist on the second storage system 400 is/are virtually created on the first storage apparatus 300 without actually migrating user data stored on the storage unit 420 of the second storage apparatus.

In a second phase, referred to "Migration" in the following, the actual user data including the actual data contents of files and the like will be transferred from the second storage apparatus 400 to the first storage apparatus 300.

Upon completion of both of the virtualization phase and the migration phase, the first storage apparatus 300 will be able to handle locally the existing file system(s), which may very likely have been changed in the meantime due to ongoing user access to the file system(s) during the virtualization and migration phases, and the second storage apparatus 400 can be disconnected completely thereafter.

During both of the virtualization phase and the migration phase, however, the second storage apparatus 400 will need to remain accessible by the first storage apparatus 300.

While the virtualization phase and the migration phase will be described in more detail below with respect to some preferred aspects as distinct phases, in which data migration is not started until completion of the virtualization phase, it is to be understood that the present invention is not limited to such configuration, and that these phases can also overlap in a timely manner in that migration of file data content of files of already virtualized portions of the file system(s) may be performed already while virtualization is still ongoing for other portions of the file system(s).

When exemplarily considering the virtualization phase and the migration phase as distinct subsequently performed operational phases, no user data (i.e. contents of files) will exist on the first storage system 300 (e.g. stored in the storage unit 320) because during the virtualization phase, the first file system management unit 310 will build a virtualized file tree structure of the file system(s) managed by the second file system management unit 410 in that the first file system management unit 310 will create an external link object stored by the storage unit 320 for each file that exists in the file system(s) of the second storage apparatus 400.

The external link objects will be file system objects of the file system(s) managed by the first file system management unit 310, each external link object enabling access to the corresponding file of the file system(s) managed by the second file system management unit 410 as long as the actual user data of the file (i.e. the file content itself) has not been migrated to the storage unit 320 of the first storage apparatus 300.

The details of user access to files of the file system(s) existing on the second storage apparatus 400 through external link objects existing on the first storage apparatus 300 will be described below.

While the connection of the first and second storage apparatuses 300 and 400 in all of the configurations of FIGS. 1B to 1D below may be realized in various ways, e.g. similar to the communication network 200 discussed above, and it may be particularly desirable to provide a Fibre channel connection having plural Fibre channels allowing parallel communication in the different plural Fibre channels. Furthermore, it may be desirable to use a file-based communication protocol such as e.g. FTP-based protocols, NFS-based protocols (e.g. NFSv3 or NFSv4) or SMB/CIFS-based protocols, or the like.

Figure 1C:
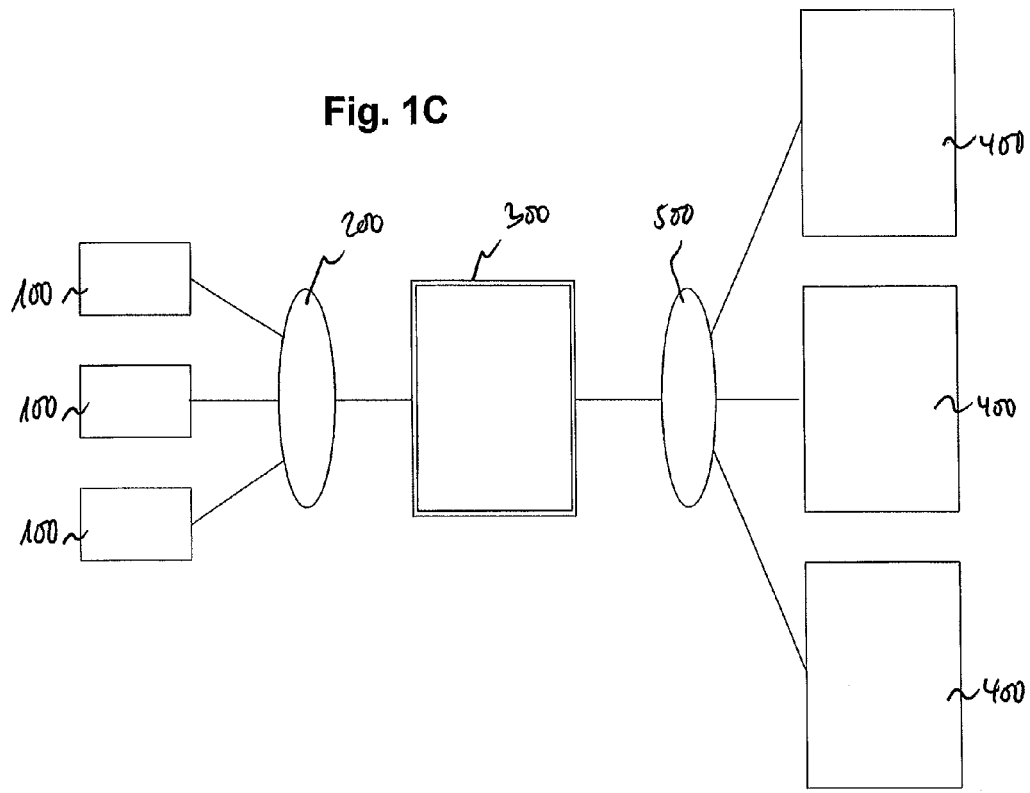
FIG. 1C shows another example of a data storage system.

FIG. 1C shows another example of a data storage system having interconnected an additional first storage apparatus 300 in between the communication network 200 and another communication network 500, which is connected to plural second storage apparatuses 400. That is, the difference to the data storage system as shown in FIG. 1B is that the first storage apparatus 300 can be used to be exchanged with a plurality of previously existing legacy storage apparatuses 400, each managing one or more file system(s) to be accessed by the clients 100. The first storage apparatus 300 is adapted to perform virtualization and migration of the file systems managed by the plural legacy storage apparatuses 400.

Upon completion of both of the virtualization phase and the migration phase, the first storage apparatus 300 will be able to handle locally the existing file systems, which may very likely have been changed in the meantime due to ongoing user access to the file system(s) during the virtualization and migration phases, and one or more or all of the second storage apparatuses 400 can be disconnected completely thereafter. During both of the virtualization phase and the migration phase, however, the second storage apparatuses 400 will need to remain, accessible by the first storage apparatus 300.

In the example of FIG. 1C, it becomes apparent that it may even be advantageous in some cases to only perform virtualization of file systems by the first storage apparatus 300 without any subsequent migration phase. For example, after completion of the virtualization of all file systems managed by the legacy storage apparatuses 400, while the actual user data (file content) of the file systems will remain to be stored only on the storage units of the legacy storage apparatuses 400, all file systems of the plural legacy storage apparatuses 400 can be accessed by the clients 100 through the virtualized file systems managed by the first storage apparatus 300 as a single access point.

Figure 1D:
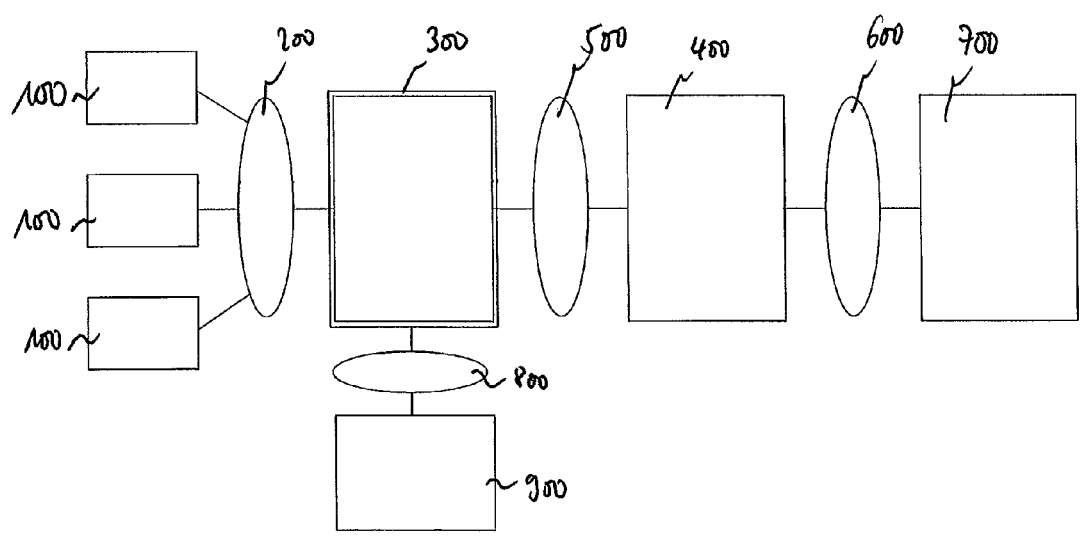
FIG. 1D shows another example of a data storage system.

FIG. 1D shows another example of a data storage system. Again, clients 100 are connected via a communication network 200 to the first storage apparatus 300, and the first storage apparatus 300 is connected via another communication network 500 to the second (legacy) storage apparatus 300. In addition, the first storage apparatus 300 is connected via yet another communication network 800 to a remote storage apparatus 900 while the second storage apparatus 400 is connected via yet another communication network 600 to another remote storage apparatus 700.

Such configuration also allows remote data replication, in which user data stored on the storage unit 320 of the first storage apparatus 300 can be remote replicated via the communication network 800 to a storage unit of the first remote storage apparatus 900 and user data stored on the storage unit 420 of the second storage apparatus 400 can be remote replicated via the communication network 600 to a storage unit of the second remote storage apparatus 700. Of course, remote replication of data via the networks 800 and 600 can be performed synchronously or asynchronously.

In principle, for a large number of legacy data storage systems, there will exist a configuration having a second storage apparatus 400 at a first site and a remote storage apparatus 700 for synchronous or asynchronous remote replication of user data of the file system(s) managed by the second storage apparatus 400. After interconnecting the first storage apparatus 300 as described above in connection with FIG. 1B, the first storage apparatus 300 will perform virtualization of the file system(s) managed by the second storage apparatus 400 but will not actually migrate user data until the start of the migration phase.

According to an exemplary embodiment, during virtualization phase without migration, all user access to the file system(s) by the clients 100 will be passed through to the second storage apparatus 400, including all data modifying user requests such as write access, attribute changing user access, creation of new file and directories, renaming operations etc., and the second storage system 400 will continue to manage the current (canonical) version of the file system(s). In such embodiments, it will not be necessary to perform data replication from the first storage apparatus 300 to the remote storage apparatus 900 as long as all data modifying user access to the file system(s) by the clients 100 will be passed through to the second storage apparatus 400, because the canonical data version of the file system(s) will be held completely on the second storage apparatus 400 and be replicated synchronously or asynchronously to the storage apparatus 900, and the remote storage apparatus 900 can be connected later.

However, in some other embodiments in which migration is started already during (or after virtualization), and modifying user access is not passed through anymore to the second storage apparatus 400 for file system objects which have been fully migrated and are fully held on the first storage apparatus 300, and/or for creation of new files and/or new directories being only performed in the file system(s) being managed by the first storage apparatus 300, i.e. when the file systems may start to differ, additional data replication to the remote storage apparatus 900 may become desirable at least for file system objects which have been fully migrated and are fully held on the first storage apparatus 300 and/or for newly created files and/or newly created directories.

Similarly, in all of the above configurations, for backup of data, it will not be necessary to perform data backup from the storage unit 320 of the first storage apparatus 300 to the backup storage unit 330 as long as all data modifying user access to the file system(s) by the clients 100 will be passed through to the second storage apparatus 400, when the still canonical version of the file system(s) will be held still on the second storage apparatus 400, and backup of the canonical version will be performed from the storage unit 420 of the second storage apparatus 400 to the backup storage unit 430.

However, in some other embodiments in which migration is started already during (or after virtualization), and modifying user access is not passed through anymore to the second storage apparatus 400 for file system objects which have been fully migrated and are fully held on the first storage apparatus 300, and/or for creation of new files and/or new directories being only performed in the file system(s) being managed by the first storage apparatus 300, i.e. when the file systems may start to differ, additional data backup to the remote storage unit 330 may become desirable at least for file system objects which have been fully migrated and are fully held on the first storage apparatus 300 and/or for newly created files and/or newly created directories.

Figure 2:
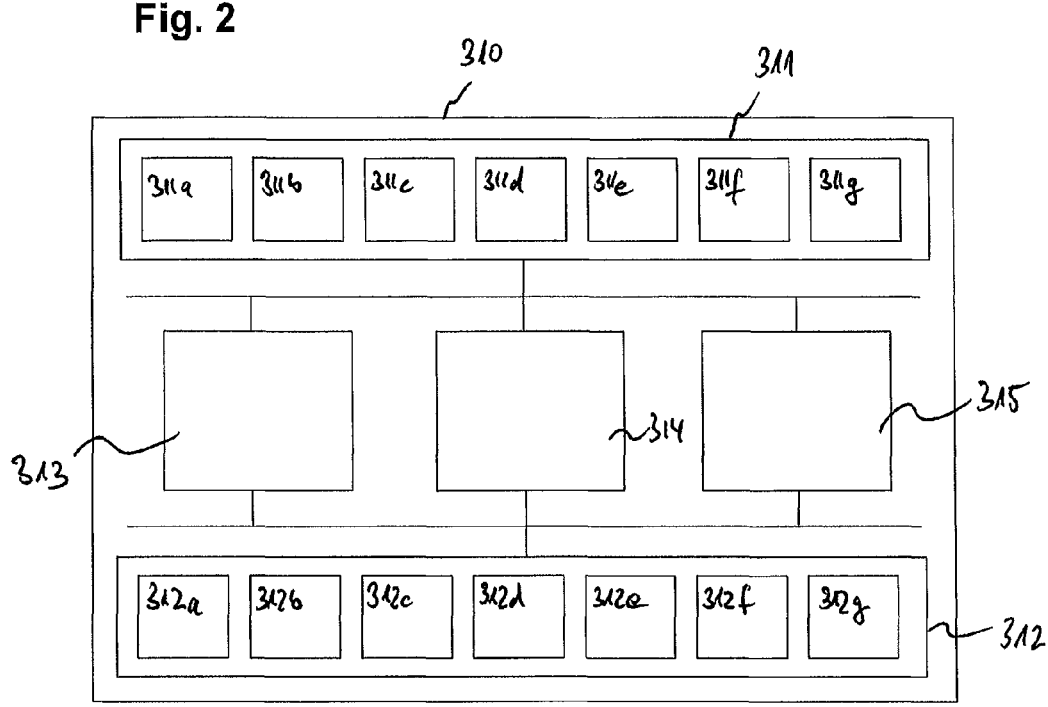
FIG. 2 exemplarily shows a schematic view of the structure of a file system management unit.

FIG. 2 exemplarily shows a schematic view of the structure of the file system management unit 310. The file system management unit 310 comprises a host interface unit 311 comprising a plurality of host interfaces 311a to 311g for connection to plural host devices (such as client computers 100) via the network 200 and a storage interface unit 312 comprising a plurality of storage interfaces 313A to 312g for connection to plural storage devices of the storage units 320 and 330. In addition, the file system management unit 310 comprises a processing unit 313 comprising one or more central processing units, a memory unit 314 for temporarily storing data used for processing including management data, and a storage device 315 for storing application data and management data.

Figure 3:
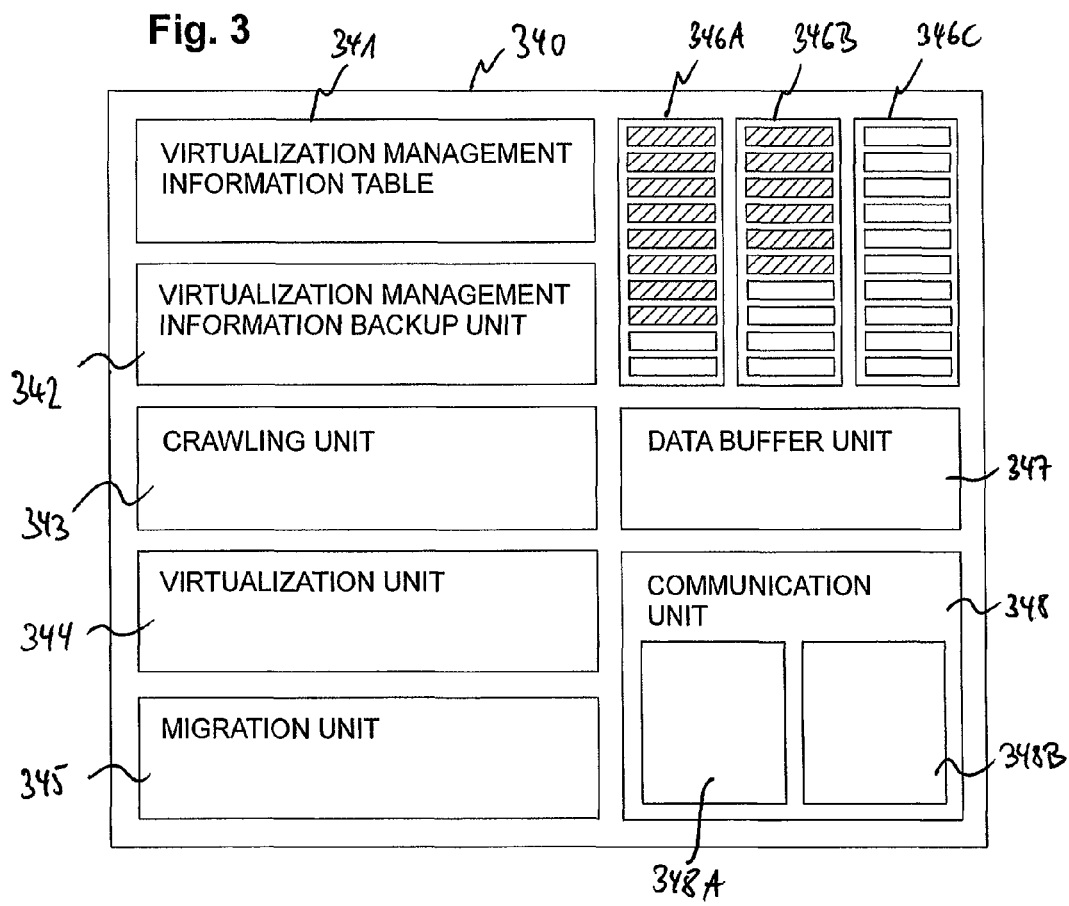
FIG. 3 exemplarily shows a schematic functional view of a virtualization and migration unit.

FIG. 3 exemplarily shows a schematic functional view of a virtualization and migration unit 340 of the file system management unit 310, which can be realized by hardware, software, or a combination thereof.

The virtualization and migration unit 340 comprises a virtualization management information table 341 for managing virtualization management data and migration management data (stored in the memory unit 314 and/or the storage device 315) and a virtualization management information backup unit 342 for performing backup of virtualization management data and migration management data (to the storage device 315 and/or to storage units 320 and/or 330).

For communication purposes, the virtualization and migration unit 340 comprises a communication unit 348 having a client communication unit 348A for receiving access requests from clients 100 and for responding to access requests from clients 100 and a file system communication unit 348B for issuing access requests to the file system management unit 410 of the second storage apparatus 400 and for receiving responses from the file system management unit 410 of the second storage apparatus 400.

For performing virtualization and migration, the virtualization and migration unit 340 comprises a crawling unit 343 for automatically crawling (observing) the file tree structure of the file system(s) managed by the file system management unit 410 of the second storage apparatus 400, and for creating virtualization jobs for instructing virtualization of file system objects discovered in the file system(s) managed by the file system management unit 410 of the second storage apparatus 400.

The virtualization and migration unit 340 further comprises a virtualization unit 344 for executing virtualization jobs for virtualizing file system objects discovered by the crawling unit 343, and for creating migration jobs for instructing migration of virtualized file system objects, and a migration unit 345 for executing migration jobs for migrating file system objects virtualized by the virtualization unit 344.

The virtualization and migration unit 340 further comprises a plurality of job queues 346A, 346B and 346C for subsequently storing jobs for file system crawling, file system object virtualization, and for file system object migration.

For example, the first job queue 346A may hold directory information jobs, the second job queue 346B may hold virtualization jobs and the third job queue 346C may hold migration jobs. That is, the virtualization and migration may be performed in a multi-threaded and/or parallelized manner in that different units are provided for file system crawling (crawling unit 343) based on jobs held in the job queue 346A, for file system object virtualization (virtualization unit 344) based on jobs held in the job queue 346B, and for file system object migration (migration unit 345) based on jobs held in the job queue 346C.

The above-mentioned units may be multi-threaded in that the crawling unit 343 may be adapted to execute plural crawling jobs (e.g. directory information jobs as discussed further below) taken from the job queue 346A in parallel, the virtualization unit 344 may be adapted to execute plural virtualization jobs taken from the job queue 346B in parallel, and the migration unit 345 may be adapted to execute plural migration jobs taken from the job queue 346C in parallel.

The present invention is, however, not limited to the use of three queues as described above, and there may be provided plural job queues for each of directory information jobs, virtualization jobs and migration jobs, or less than three queues, e.g. in that one queue is provided for all of directory information jobs, virtualization jobs and migration jobs. In the latter case of only one queue, the crawling unit 343, the virtualization unit 344, and the migration unit 345 may be realized as a single multi-threaded unit being adapted to execute a plurality of jobs taken from the single job queue, and adding all newly created jobs (including directory information jobs, virtualization jobs and migration jobs to the same queue).

A "directory information job" is a job associated with a certain directory of the file system(s) managed by the file system management unit 410 of the second storage apparatus 400 which has been discovered by the crawling unit 343, the "directory information job" instructing the crawling unit 343 to observe the file system objects (including subdirectories and files) in the certain directory of the file system(s) managed by the file system management unit 410 of the second storage apparatus 400.

A "virtualization job" is a job associated with a certain file system object (such as a file or directory) of the file system(s) managed by the file system management unit 410 of the second storage apparatus 400 which has been discovered by the crawling unit 343, the "virtualization job" instructing the virtualization unit 344 to virtualize the certain file system object on the first storage apparatus 300.

Basically, virtualization of a directory discovered by the crawling unit 343 means that a corresponding directory (having the same name) will be created in the file system(s) managed by the first file system management unit 310, while virtualization of a file or similar object (such as a hard linked file) discovered by the crawling unit 343 means that a virtual object, referred to as external link object (abbreviated as XLO in the following), will be created in the directory of the file system(s) managed by the first file system management unit 310 corresponding to the directory of the file system(s) managed by the second file system management unit 410 having the corresponding file.

An "external link object" is an object existing in the file system(s) managed by the first file system management unit 310 being associated with a file or similar object (such as a hard linked file). An "external link object" does not store any actual user data of the corresponding file but includes an external reference to the corresponding file in the file system(s) managed by the second file system management unit 410 such that the "external link object" of the file system(s) managed by the first file system management unit 310 represents the corresponding file of the file system(s) managed by second file system management unit 410 in the file system(s) managed by the first file system management unit 310 and allows access to the corresponding file.

An "external link object" may at least comprise information on a remote object ID used for the corresponding file in the file system(s) managed by the second file system management unit 410 and information on a remote path of the file in the file system(s) managed by the second file system management unit 410.

A "migration job" is a job associated with a certain file or similar object (such as a hard linked file) of the file system(s) managed by the file system management unit 410 of the second storage apparatus 400 which has been virtualized by the virtualization unit 344, the "migration job" instructing the migration unit 345 to migrate the certain file or similar object to the first storage apparatus 300. That is, by executing the migration job" instructing the migration unit 345 to migrate the certain file, the actual user data as content of the file is transferred to the first storage apparatus 300 to be stored in the storage unit 320.

In case jobs are created while the job queues become occupied with jobs, there is provided a buffer unit 347 for temporarily storing directory information jobs, virtualization jobs and migration jobs when one or more of the job queues 346A to 346C are occupied. When jobs are held by the buffer unit 347, the jobs will be added to the respective job queues once another job is executed and removed from the job queues.

Further exemplary details in connection with terms "virtualization", "migration", "external link object", "directory information job", "virtualization job", and "migration job" will become apparent in the discussion of the more detailed description and examples below.

Figure 4:
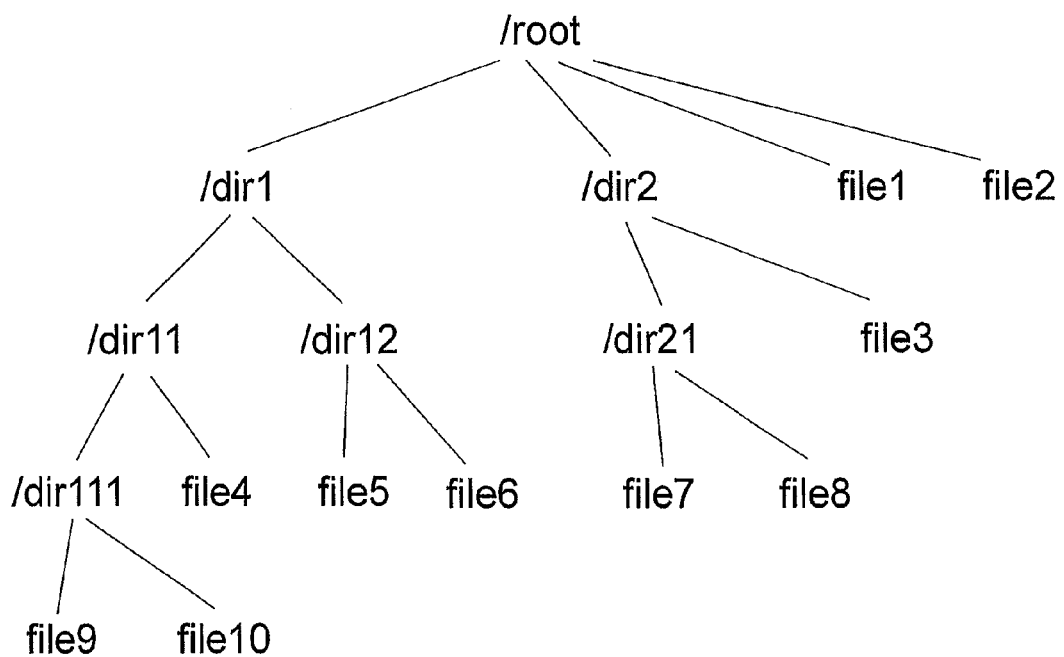
FIG. 4 shows an example of a file system tree structure.

FIG. 4 shows an example of a file system tree structure of a file system as exemplarily managed by the second file system management unit 410 of FIGS. 1A and 1B. Specifically, it is exemplarily assumed that the file system managed by the second file system management unit 410 and stored on the storage unit 420 of FIG. 1A has the structure of FIG. 4 at the time of disconnecting the second storage apparatus 400 and interconnecting the first storage apparatus 300 before start of virtualization of the file system on the first storage apparatus 300 to be managed by the first file system management unit 310.

The exemplary file system of FIG. 4 has a highest order directory /root and plural subdirectories. Specifically, the child directories /dir1 and /dir2 exist in the /root directory in addition to files "file1" and "file2". That is, the /root directory represents the parent directory of the child directories /dir1 and /dir2. The directory /dir1 has child directories /dir11 and /dir12 and the directory /dir2 has one child directory /dir21 and the file "file3". In the child directory /dir111 of directory /dir11, there exist files "file9" and "file10". Further, a file "file4" is stored in directory /dir11, while files "file5" and "file6" exist in the directory /dir12. Finally, the directory /dir21 has files "file7" and "file8".

Once the first storage apparatus 300 is interconnected between the clients 100 and the second storage apparatus 400 as e.g. shown in FIG. 1B, 1C or 1D, virtualization of the file system managed by the second file system management unit 410 and stored on the storage unit 420 of FIG. 1A can be initiated as soon as an initial virtualization path is created, which virtualization path associates one newly created directory in the file system managed by the first file system management unit 310 of the first storage apparatus 300 (e.g. a highest order directory) with a highest order directory of the portion of the file system managed by the second file system management unit 410 of the second storage apparatus 400 to be virtualized and/or migrated.

For example, in case no previous file system exists on the first storage apparatus 300, a new highest order directory /root can be created in the file system managed by the first file system management unit 310 of the first storage apparatus 300 and be associated by a newly established virtualization path with the highest order directory /root of the file system managed by the second file system management unit 410 of the second storage apparatus 400, resulting in virtualization of the tree structure of all file system objects having a lower order than the /root directory.

Figure 5:
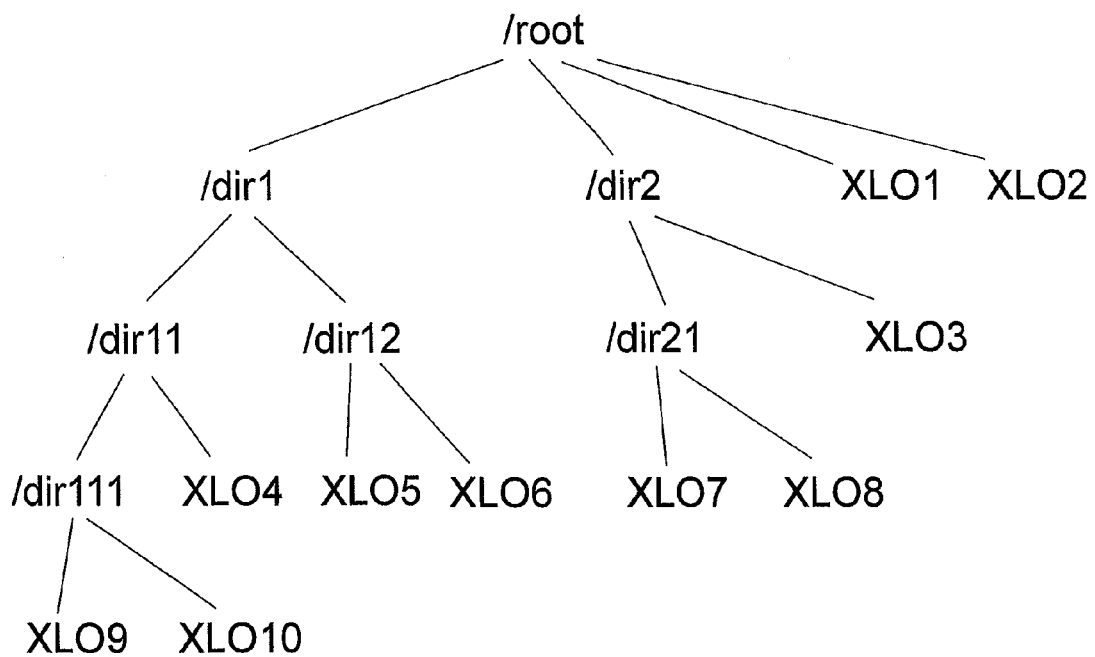
FIG. 5 shows an example of a virtualized file system tree structure based on the tree structure of FIG. 4.

FIG. 5 shows an example of a virtualized file system tree structure based on the tree structure of FIG. 4 in which the highest order directory /root of the file system managed by the first file system management unit 310 is associated with the highest order directory /root of the file system managed by the second file system management unit 410 according to a first virtualization path <storage apparatus 300>:/root→<storage apparatus 400>:/root.

After complete virtualization of the file system of the second file system management unit 410 according to the first virtualization path, the first file system management unit 410 will manage a file system having a tree structure according to FIG. 5 in which each of the directories /dir1, /dir2, /dir11, /dir12, /dir21 and /dir111 of the file system managed by the second file system management unit 410 will have been created also in the file system as managed by the first file system management unit 310, having the same tree structure in that directories /dir1 and /dir2 are created as child directories of the highest order directory /root, directories /dir11 and /dir12 are created as child directories of the directory /dir1 and so on.

However, regarding the files (and similar objects such as hard linked files), the file system managed by the first file system management unit 310 in the first storage apparatus 300 will not have the actual files after virtualization but have a respective external link object XLO for each file of the file system managed by the second file system management unit 410 in the second storage apparatus 300.

Accordingly, after virtualization being completed, the external link objects XLO1, XLO2, XLO3, XLO4, XLO5, XLO6, XLO7, XLO8, XLO9, and XLO10 will exist in the file system managed by the first file system management unit 310 in the first storage apparatus 300 instead of the respective files file1, file2, file3, file4, file5, file6, file7, file8, file9, and file10 of the file system managed by the second file system management unit 410 in the second storage apparatus 400. It is to be noted that the external link objects in the first file system will be presented as files to the clients, i.e., the clients will not be able to see the external link objects in the first file system but will see the actual file names, e.g., "file1", "file2", "file3", "file4", "file5", "file6", "file7", "file8", "file9", and "file10". Each of the respective external link objects will exist in the directory of the file system managed by the first file system management unit 310 in the first storage apparatus 300 that corresponds to the respective directory of the file system managed by the second file system management unit 410 in the second storage apparatus 400 having the respective file.

For example, while file10 exists in the remote path /root/dir1/dir11/dir111/file10 in the file system managed by the second file system management unit 410 in the second storage apparatus 400, the corresponding external link object XLO10 exists in the corresponding local path /root/dir1/dir11/dir111/XLO10 in the first file system management unit 310 of the first storage apparatus 300, and XLO10 represents file10 and allows external access to file10 when a user attempts to access file 10 in the file system at the first storage apparatus 300 by means of an access request. That is, preferably, the local paths names will be the same as the remote paths, and from the viewpoint of the clients, the virtualized first file system will be appearing to the clients undistinguishable from the second file system.

Figure 6A:
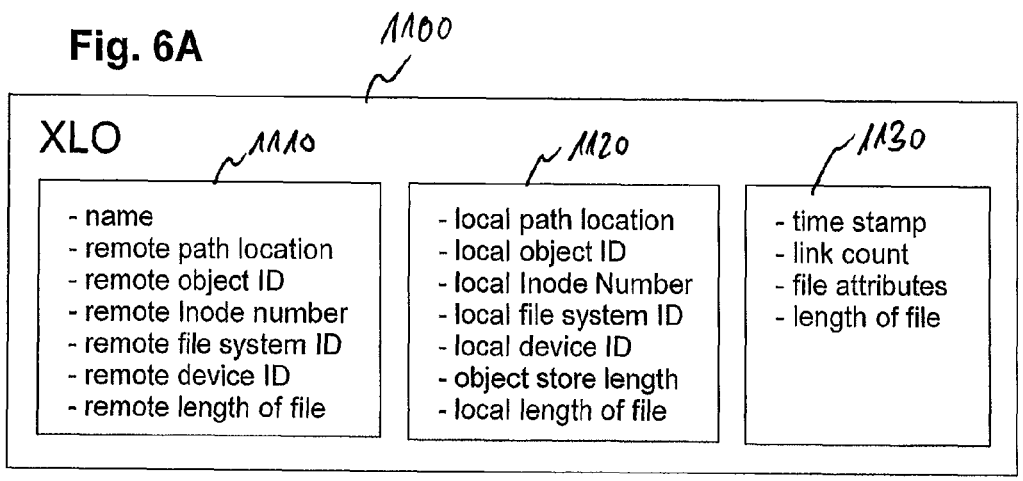
FIG. 6A shows an exemplary schematic data structure of an external link object for a virtualized file.

FIG. 6A shows an exemplary schematic data structure of an external link object 1100 for a file (or hard linked file). The external link object 1100 exemplarily includes a first information section 1110 having metadata on the file regarding the external file system as managed by the second file system management unit 410 including a name as used in the external file system, a remote path location of the file in the external file system, a remote object ID as used in the external file system, a remote Inode number as used in the external file system, a remote file system ID of the external file system (e.g. in case plural file systems are handled by the second file system management unit 410), and a remote device ID indicating the device of the storage unit 420 in which the file data content is stored.

In addition, the first information section 1110 exemplarily further comprises the remote length of the file, which indicates the logical length of the file's user data (data size, file content) in the external (remote) file system as managed by the second file system management unit 410 in the second storage apparatus 400. The length of the file may be given in storage units such as Bytes and KiloBytes or in units of numbers of blocks (provided that the actual data size of data blocks for storing data in the file system managed by the second file system management unit 410 in the second storage apparatus 400 is known or registered).

By referencing the name and the remote path location and/or the remote object ID, the external link object allows access to the file in the external file system, when a user tries to access the file by access request referring to the name and the remote path location and/or the remote object ID as used in the external file system.

The external link object 1100 exemplarily further includes a second information section 1120 having metadata on the file regarding the internal (local) file system as managed by the first file system management unit 310 including a name as used in the local file system, a local path location of the external file object in the internal file system, a local object ID as used in the internal file system, a local Inode number as used in the internal file system, a local file system ID of the internal file system (e.g. in case plural file systems are handled by the first file system management unit 310), and a local device ID indicating the device of the storage unit 320 in which the file data content is stored or in which data blocks may be allocated already for later migration of data.

In addition, the second information section 1120 may indicate an object store length corresponding to the size of stored file content data already transferred to and stored in the storage unit 420 (i.e. when the object store length of the file corresponds to the length of the file on the external file system, this means that all data of the actual file content has been fully migrated). Before initiating migration, since no actual file content data will be transferred, the object store length will remain to be zero during virtualization. The object store length may be given in storage units such as Bytes and KiloBytes or in units of numbers of blocks.

In addition, the second information section 1120 may indicate the local length of the file, which indicates the logical length of the file's user data (data size, file content) in the internal (local) file system as managed by the first file system management unit 310 in the first storage apparatus 300, and which may be equivalent to the logical length of the remote file. The local length of the file may be given in storage units such as Bytes and KiloBytes or in units of numbers of blocks (of course, the actual data size of data blocks for storing data in the file system managed by the first file system management unit 310 is known, it is however to be noted that the block size may be different in the internal and the external file system management).

Regarding the above-mentioned "local length of the file" and the "object store length", it is to be noted that the "local length of the file" indicates the amount of storage space that is logically occupied by the file on the storage unit 320, while the "object store length" indicates how much of the file's user data has been migrated to the storage unit 320.

In the above, it is to be noted that the local "length of the file" represents a logical file length of the file in the first file system, and the remote "length of the file" in the below description represents a logical file length of the file in the second file system, while the local object store length can be used to indicate the progress of data migration for a file in that the local object store length indicates an offset of the next data migration block to be migrated. Detecting whether a file is fully migrated to the first file system (i.e. if it is fully owned by the first file system) can be performed by comparing the remote "logical length of the file" and the local "object store length", while the local "logical length of the file" does not need to be used.

While, the "local length of the file" and the "object store length" may be of equal size, it is to be noted that these parameters may also differ depending on the circumstances. For example, in case a file of data content of 100 kB shall be migrated to the storage unit 320, and the file data content may, for example, be transferred in blocks of 25 kB so that four blocks will eventually be successively migrated until the whole content of 100 kB will have been completely migrated. When receiving the first block of 25 kB and writing the received first block to the storage unit 320, the first file system management unit 310 may already allocate storage space of 100 kB for the whole file content in the storage unit 320, and after writing the content of the first block to the allocated storage space, the respective "object store length" will be of size 25 kB, while the respective "length of the file" will amount to 100 kB already.

The external link object 1100 exemplarily further includes a third information section 1130 having metadata on attributes of the file including a current time stamp (indicating time of last modifying access to the file), a link count of the file, a length of the file (in the external file system, i.e. corresponding to the remote length of the file of section 1110), and further file attributes. Since file attributes are stored with the external link object in the third information section 1130, attribute requests sent from the users via clients 100 can be conveniently and efficiently handled locally by the first file system management unit 310 as soon as the external link object is created, i.e. as soon as the file is virtualized.

Figure 6B:
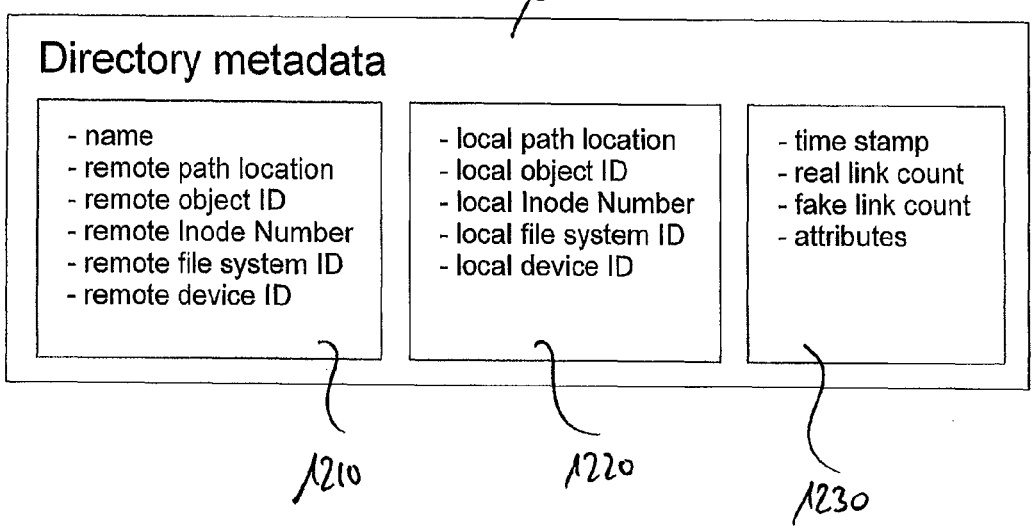
FIG. 6B shows an exemplary schematic data structure of metadata for a virtualized directory.

FIG. 6B shows an exemplary schematic data structure 1200 of metadata for a virtualized directory. The directory metadata 1200 exemplarily includes a first information section 1210 having metadata on the directory regarding the external file system including a name as used in the external file system, a remote path location of the directory in the external file system, a remote object ID as used in the external file system, a remote Inode number as used in the external file system, a remote file system ID of the external file system (e.g. in case plural file systems are handled by the second file system management unit 410), and a remote device ID indicating the device of the storage unit 420 in which the directory is stored.

The directory metadata 1200 exemplarily further includes a second information section 1220 having metadata on the directory regarding the internal (local) file system as managed by the first file system management unit 310 including a name as used in the local file system, a local path location of the directory in the internal file system, a local object ID as used in the internal file system, a local Inode number as used in the internal file system, a local file system ID of the internal file system (e.g. in case plural file systems are handled by the first file system management unit 310), and a local device ID indicating the device of the storage unit 320 in which the directory is stored.

The directory metadata 1200 exemplarily further includes a third information section 1230 having metadata on attributes of the directory including a current time stamp (indicating time of last modifying access to the directory), a real link count of the directory, a fake link count of the directory, and further directory attributes. Since directory attributes are stored with the directory metadata in the third information section 1230, attribute requests sent from the users via clients 100 can be conveniently and efficiently handled locally by the first file system management unit 310 as soon as the directory and its metadata are created, i.e. as soon as the directory is virtualized.

Regarding the attribute of the link count (real and fake link counts) of a directory, it is to be noted that the fake link count is a parameter that is equal to zero once the respective directory is virtualized and all of its child directories are virtualized as well, however, for virtualized directories for which not all of its child directories have been virtualized yet (i.e. in case at least one child directory of the respective directory in the external file system does not have yet a corresponding directory in the respective directory of the local file system), the fake link count will be non-zero and the link count that should be returned to the user in response to a link count attribute request is the sum of the above real and fake link counts.

Specifically, in order to be able to reliably, efficiently and correctly handle attribute request relating to the link count of a virtualized directory locally on the first storage apparatus 300, when creating a directory during virtualization thereof, a self-reference link is created in the respective directory, the fake link count is calculated and written to the directory metadata, a parent directory link is created, and the fake link count in the metadata of the parent directory is decremented by one.

Accordingly, when creating the particular directory in its respective parent directory, the link to the particular directory inside of the parent directory will be automatically created by way of directory creation, and the self-reference link (such as the single-dot-link or /.) will be created, leading to a real link count of 2 (because no child directories with parent directory links / . . . have been created yet), while the underlying actual link count of the corresponding directory in the file system as managed by the second file system management unit 410 is actually N+2, N being the number of child directories of the particular directory.

Therefore, a fake link count may be calculated based on the number N of child directories of the particular directory in the file system as managed by the second file system management unit 410, e.g. by requesting the real link count of the particular directory from the second file system management unit 410 and subtracting 2, and is written to the directory metadata. Then, when a user requests the link number of the particular directory, the first file system management unit 310 can efficiently handle the request locally without requiring further communication with the second storage apparatus 400 by just adding the real link count as observed on the file system as managed by the first file system management unit 310 and the fake link count as stored in the directory metadata, and by returning the sum of the real link count and the fake link count.

For the above procedure, the fake link count stored in the metadata of a virtualized directory needs to be updated whenever child directories thereof are created for purposes of their own virtualization.

FIG. 7 shows an example of the virtualization management information table 341 upon completion of virtualization of the file system tree of FIG. 4. The table is exemplarily divided into four data blocks 341a to 341d, and contains one entry for each of the file system objects of the file system tree structure of FIG. 4. The virtualization management information table 341 is stored in blocks 341a to 341d in order to be able to perform a backup process in which the updated data in the virtualization management information table 341 is backed up in blocks, i.e. the virtualization management information backup unit 342 will repeatedly and successively create backup copies of each of the blocks 341a to 341 stored in the memory 314 and then copy the backup copies block-wise to the storage device 315. When one particular block is copied for backup purposes, the block cannot be updated by units 343, 344 and 345 but all other blocks remain accessible.

Exemplarily, each of the file objects indicated in the table 341 of FIG. 24 has the virtualization status "virtualized" indicating that a respective external link object exists for each of the files of the file system as managed by the second file system management unit 410 according to the structure of FIG. 5, and each file object has the object status "needs migration" indicating that none of the actual file content data has been yet migrated from the storage unit 420 of the second storage apparatus 400 to the storage unit 320 of the first storage apparatus 300.

Each of the directory objects indicated in the table 341 of FIG. 7 has the virtualization status "virtualized" indicating that a respective directory of the same name exists for each of the directories of the file system as managed by the second file system management unit 410 according to the tree structures of both of FIGS. 4 and 5, and each directory object has the object status "Complete" indicating that all child objects thereof have been virtualized as well.

In a second phase of migration, the crawling unit 343 may then re-walk the whole virtualization management information table 341 in order to create a respective migration job for each file object indicated as "needs migration" to be added to the job queue 346C, so that the migration unit 345 may successively execute one or more migration jobs (e.g. in parallel as a multi-threaded migration unit 345) and migrate actual file content data to the storage unit 320 of the first storage apparatus 300.

Alternatively, it is of course possible to initiate the migration phase even before the completion of the virtualization phase. Then, the crawling unit 343 or also the virtualization unit 344 may create migration jobs already during virtualization.

In order to avoid path walking by the migration unit 345 during migration, metadata of files of the second file system discovered during virtualization by the virtualization unit 344 may be stored in a cache memory, preferably including file information such as file handles.

Figure 8A:
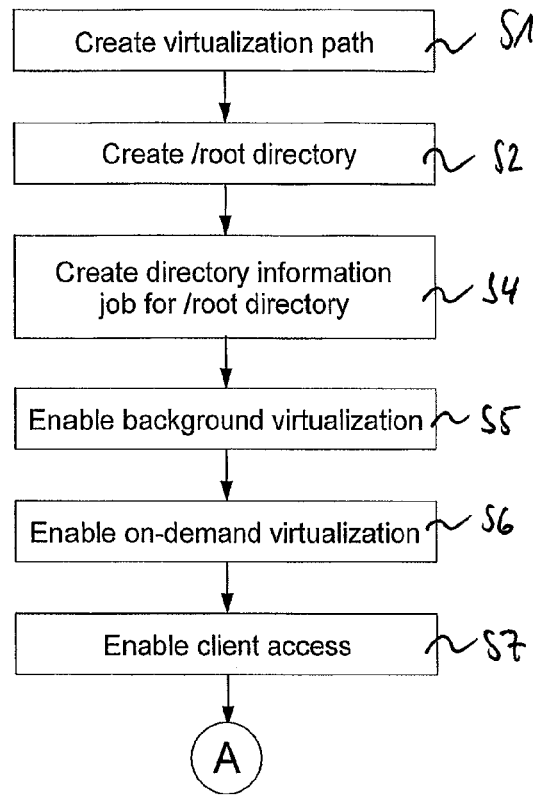
FIGS. 8A, 8B, and 8C show exemplary flow charts of virtualization initialization and migration initialization.
Figure 8B:
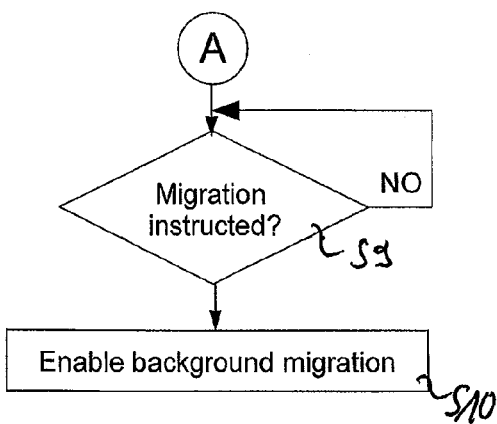
Figure 8C:
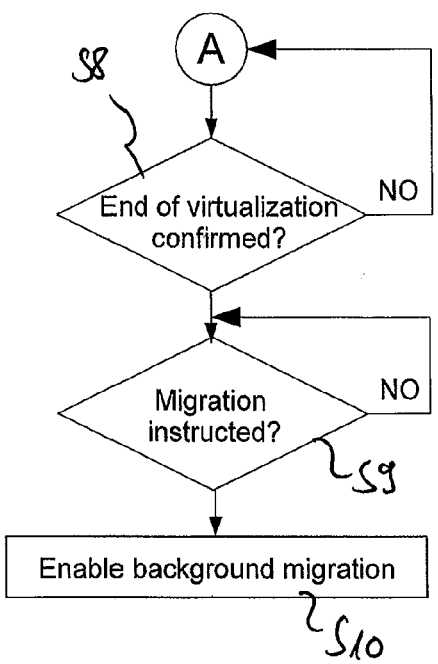

FIGS. 8A, 8B, and 8C show exemplary flow charts of a method for virtualization initialization and migration initialization (according to the combination of FIGS. 8A and 8B or FIGS. 8A and 8C). The method may additionally comprise a step of blocking all user/client access from clients 100 to the second storage apparatus 300 (in a situation similar to e.g. FIG. 1A) and a step of interconnecting the first storage apparatus 300 between the second storage apparatus 400 and the clients 100 before step S1 in FIG. 8A.

The method for virtualization initialization and migration initialization comprises a step S2 of creating a highest order directory in the file system managed by the first file system management unit 310 and a step S1 of creating (setting) a virtualization path associating the highest order directory created in step S2 with a highest order directory of the portion of the file system managed by the second file system management unit 410 that is to be virtualized (e.g. the highest order directory or one of the lower directories as illustrated in connection with FIG. 4).

Furthermore, the method for virtualization initialization comprises a step S4 of creating a directory information job for the highest order directory set in step S2. The method further comprises a step S5 of enabling automatic background virtualization and another step S6 of enabling user access dependent on-demand virtualization before directly enabling client access to the first storage apparatus 300 in step S7. It is to be noted that the order of steps S1 to S7 can be interchanged in plural different manners, with the conditions that steps S5 and S6 are performed after steps S1 and S2, and that step S7 is performed after step S6.

Most importantly, user access to the file system can be enabled (step S7) immediately as soon as the second storage apparatus is interconnected, a virtualization path is set (step S1) and on-demand virtualization is enabled (step S6). Specifically, as soon as a user tries to access a not-yet-virtualized file system object in the file system, the respective file system object will be virtualized by means of the enabled on-demand virtualization (as exemplarily described in more detail below) so as to allow access to the file system object via the virtualized file system object, and in case the user tries to access an already virtualized file system object, the respective file system object can be accessed via the respective virtualized file system object.

Accordingly, a data storage system according to the above aspect can immediately enable user access to the file system very shortly after interconnecting the first storage apparatus 300 under the condition that a virtualization path has been created and on-demand virtualization has been enabled independent of whether automatic background virtualization (as exemplarily described in more detail below) has yet begun and independent of the status of automatic background virtualization. That is, access to the file system by clients 100 can be enabled again advantageously very shortly after the single interruption for interconnecting the first storage apparatus 300 in between the clients 100 and the second storage apparatus 400.

The automatic background virtualization is performed automatically and will lead to a result that the complete file tree structure of the file system(s) managed by the second file system management unit 410 of the second storage apparatus 400 will be virtualized completely (i.e. will be reconstructed completely in the virtualized manner as described in connection with FIG. 5 above) on the first storage apparatus 400. The on-demand virtualization is performed on the basis of user access in that each file system object that is tried to be accessed by the user but has not yet been virtualized, the file system object is first virtualized, and then user access is executed as described in the following with respect to FIGS. 11A to 11H below.

After enabling client access in step S7, it is possible to wait until virtualization is ended in that the complete file system tree structure existing in the file system of the second storage apparatus 400 exists in a virtualized manner in the file system of the first storage apparatus 300, i.e. when each file existing in the file system of the second storage apparatus 400 has a corresponding external link object existing in the file system of the first storage apparatus 300 and each directory existing in the file system of the second storage apparatus 400 has a corresponding directory existing in the file system of the first storage apparatus 300, similar to the exemplary situation in FIGS. 4 and 5.

Then, when the end of virtualization is confirmed (step S8 in FIG. 8C returns YES) and start of migration is instructed by an administrator (step S9 in FIG. 8C returns YES), the method continues with enabling background migration in step S10 of FIG. 8C. Alternatively, in other embodiments, step S9 can be skipped and background migration can be automatically enabled (step S10) as soon as end of virtualization is confirmed (step S8 in FIG. 8C returns YES).

While the migration phase is not started before virtualization has ended in the above embodiments, according to other embodiments, the migration phase may be initiated already when virtualization is still ongoing such as, for example, shown in FIG. 8B. When virtualization and client access is enabled (steps S5, S8 and S7 in FIG. 8A), and migration is instructed (step S9 of FIG. 8B returns YES), the method continues with enabling background migration in step S10 of FIG. 8B independent of whether virtualization is ended or not.

In principle, background migration can be initiated as follows. As soon as background migration is enabled (step S10), the crawling unit 343 may walk through the virtualization management information table 341 and create a migration job for each file having the object status "needs migration" and include the migration job to the queue 346C, and the migration unit 345 may execute the migration jobs (e.g. in parallel as a multi-threaded parallelized process). In addition, the virtualization means 344 may create a migration job for each created external link object after creation thereof. When executing the migration job for a certain file, the migration unit 345 transfers the whole data content of the file from the second storage apparatus 400 to the first storage apparatus.

FIG. 9A shows an example of a flow chart of background migration management. The crawling unit 343 (or the migration unit 345) checks the virtualization management information table 341 in step S1001 as to whether there exists any entry relating to a file having an object status "needs migration". If no such entry exists (step S1002 returns NO), the process will end (step S1003) or it may wait and repeat step S1001 later again.

However, if at least one entry relating to a file having an object status "needs migration" exists in the virtualization management information table 341 (step S1002 returns YES), the method continues with a next one of the one or more entries relating to a file having an object status "needs migration" exists in the virtualization management information table 341 in step S1004.

In a next step S1005, the method continues with determining a group of migration data blocks on the basis of the size of the file (i.e. the remote length of the file) and a pre-determined size of the migration data blocks. According to some embodiments, it is intended that the data of the file is then not transferred as a whole but in migration data blocks so that the file content is successively transferred from the first storage apparatus 300 to the second storage apparatus 400 migration data block by migration data block.

In some aspects, the size of the migration data blocks may be determined on the basis of the maximal receiving block size as supported by the first file system management unit 310 and/or the maximal receiving block size as supported by the second file system management unit 410. Specifically, in some embodiments, the size of the migration data blocks may be set as the minimum of the maximal receiving block size as supported by the second file system management unit 410 and the maximal receiving block size as supported by the first file system management unit 310.

For example, when the first file system management unit 310 is adapted to receive data blocks of size from equal to or larger than 75 kB up to equal to or smaller than 175 kB (as an exemplary maximal receiving block size as supported by the first file system management unit 310) and the second file system management unit 410 is adapted to send data blocks of size from equal to or larger than 50 kB up to equal to or smaller than 150 kB (as an exemplary maximal sending block size as supported by the second file system management unit 410), the size of the migration data blocks can be determined as the minimal value of 150 kB and 175 kB, i.e. as 150 kB.

When a file for which the actual file data content has a size of 1500 kB shall be migrated by using a size of the migration data blocks of 150 kB, for example, the file content will be divided into 10 migration data blocks that are determined in step S1005.

In the next step S1006, a respective migration job is created for each of the migration data blocks determined in step S1005 and added to the job queue 346C, where it can be obtained by the migration unit 345 for executing the migration job and transferring the data from the second storage apparatus 400 to the first storage apparatus 300 and storing the data of the migration data block to the storage unit 320. Preferably, the migration jobs of the group of migration data blocks associated with one particular file are added to the job queue 346C in the correct order, starting with a first block and ending with a last block of the group of migration data blocks associated with the particular file so that migration blocks are migrated in the right order and stored to the storage unit 320 in the right order.

In the next step S1007, after creating migration jobs for each of the group of migration data blocks associated with the one particular file selected in step S1004, the respective entry in the virtualization management information table 341 is updated, and the object status is changed to "migrating".

In the embodiment of FIG. 9A, a migration job has been exemplarily created for each data migration block to be migrated for a certain file. However, especially for file systems with large files, the plural migration jobs for each file may overpopulate the job queues due to the potentially large number of migration data blocks. For avoiding such circumstances, it may be desirable to provide an embodiment in which one single migration job is created for each file as, for example, described with reference to FIG. 9B below. Such embodiment may be implemented in view of all files of the file system or in view of files which have a file size above a certain threshold.

FIG. 9B shows another example of a flow chart of background migration management in which one single virtualization job is created for each file. Steps S1001, S1002, S1003, S1004 and S1007 may be performed similar as described above in connection with FIG. 9A. However, in step S1008, a single migration job is created for the certain file selected in step S1004 instead of migration jobs for each migration data block. In step S1004, a respective migration job is created for the certain file and added to the job queue 346C, where it can be obtained by the migration unit 345 for executing the migration job and successively transferring the data of all data migration blocks from the second storage apparatus 400 to the first storage apparatus 300 and storing the data of the migration data blocks to the storage unit 320.

Figure 10A:
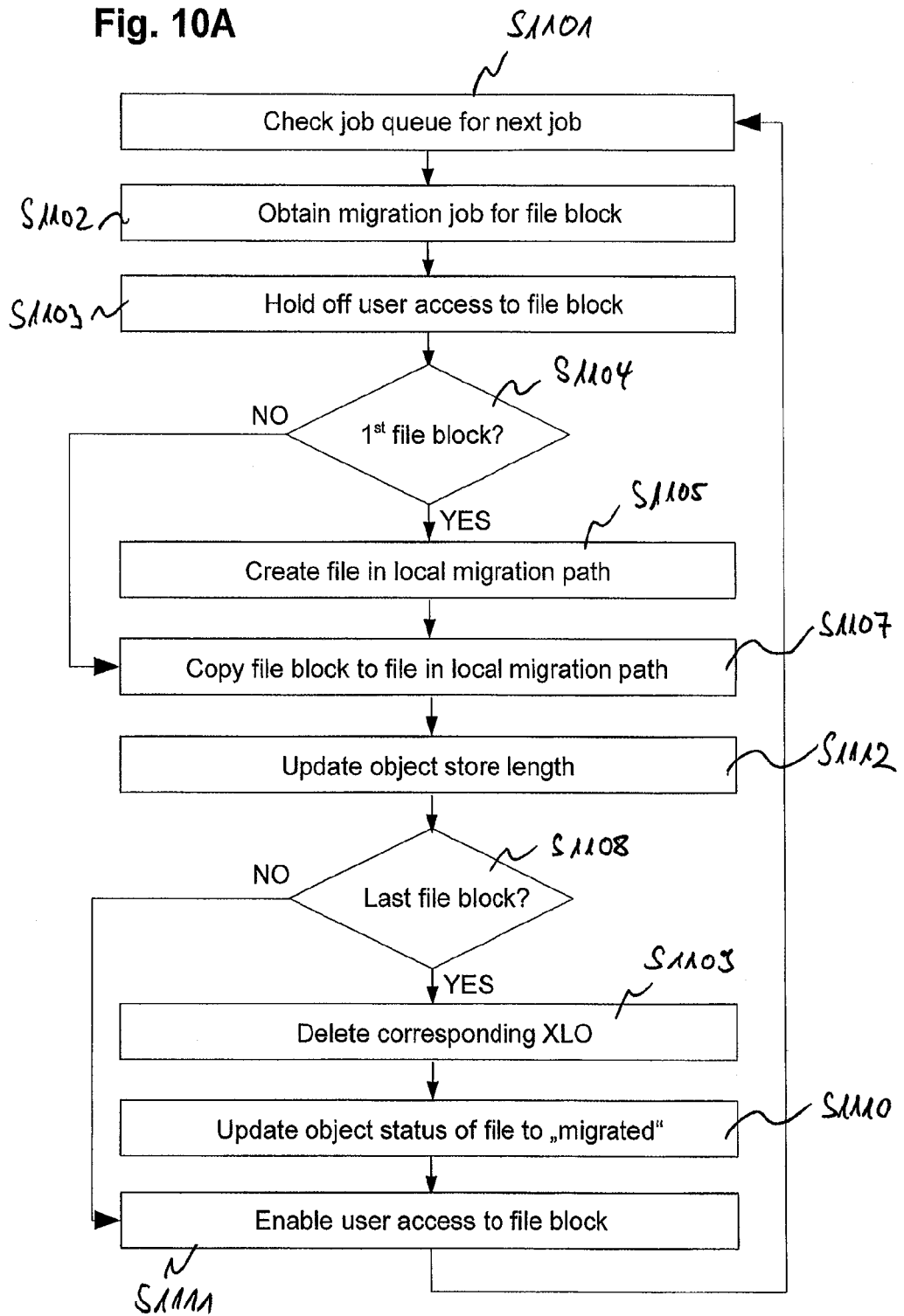
FIG. 10A shows an example of a flow chart of file data migration.

FIG. 10A shows an example of a flow chart of file data migration. The migration unit 345 checks the job queue 346C for the next migration job in step S1101 and obtains the next migration job in step S1102, the migration job instructing execution of migration in connection with a particular migration data block as determined in step S1005 of FIG. 9A.

Then, user access to the file data content of the migration data block is held off (queued) in step S1103 so that clients temporarily cannot access the file data content of the migration data block during migration (i.e. such that client access to the file data content of the migration data block is held off or queued during its migration). This has the advantage that other data portions of the same file, i.e. data of other data migration blocks of the same file (which have been migrated already previously or have not yet started migration) can still be access by users of clients 100 even during migration of the currently migrating migration data block.

It is to be noted that the client access trying to access the respective file block in between the times of execution of steps S1103 and S1111 described below, when client access is enabled again, is preferably only temporarily held off (or blocked, queued) in a sense that the client observes a delay until step S1111 is executed, and the queued access is executed after step S1111 so that the client only observes the small latency in the execution of the write request and, preferably, no error response is returned to the access attempting client. That is, one or more write requests received after step S1103 involving the migration data block of the migration job as a target block are queued and executed after step S1111.

In alternative embodiments, step S1103 may hold off (queue) user access to the file data of the certain file being associated with the data block to be migrated. In such embodiments, at least user access to all other files can be kept enabled during migration of the data blocks of a certain file. Then, step S1111 described below will enable user access to the file again in such embodiments. That is, one or more write requests received after step S1103 involving the file data of the target file are queued and executed after step S1111.

In step S1104, it is checked whether the particular migration data block is the first migration block to be migrated in connection with the particular file associated with the particular migration data block. For example, the migration job data may be indicative of the total number of migration data blocks and the number of the particular migration data block. Alternatively, the migration unit 345 can check whether a corresponding file (in addition to the associated external link object thereof) already exists in the file system of the first file system management unit 310.

If step S1104 returns YES, the migration unit 345 creates the corresponding file in a local migration path indicated in the migration job and copies the data content of the migration data block, which is received from the second storage apparatus 400, to the file in the local migration path in step S1107. Otherwise, if step S1104 returns NO, the migration unit 345 directly copies the data content of the migration data block, which is received from the second storage apparatus 400, to the (already existing) file in the local migration path in step S1107.

After writing the data content of the migration data block to the storage unit 320 in step S1107, metadata related with the file is updated in that the (local) object store length of the file in the first file system is updated in step S1112, e.g., by adding the block size of the migrated migration data block to the previous object store length. In principle, the object store length can be updated within the write operation of step S1107. Also, it is to be noted that the migration procedure does not involve updating any other metadata such as access or modification times (e.g. time stamps), as the migration writes shall remain seamless to clients.

When the then migrated migration data block was the last migration data block to be migrated because all other migration data blocks associated with the same file had been previously migrated already (step S1108 returns YES), the external link object being associated with the same file is deleted in the local path location thereof in step S1109, i.e. the link between the file system managed by the second file system management unit 410 and the file system managed by the first file system management unit 310 for this particular file will be deleted. Then, the object status of the corresponding file in the virtualization management information table 341 is updated to "migrated" in step S1110, and one or more flags in the metadata of the file can be updated so as to indicate that the file has been fully migrated.

In the above step S1108, it is basically checked whether all of the file content of the particular file has been migrated already so that the data content of the file is already fully held on the storage unit 320 and the data content of the particular file exists completely in the file system managed by the first file system management unit 310. According to some preferred embodiments, the determination of step S1108 as to whether the file data content of the particular file has been fully migrated from the second storage apparatus 400 to the first storage apparatus 300 is performed on the basis of a comparison of the object store length of the particular file in the file system managed by the first file system management unit 310 and the length of the file of the particular file in the file system managed by the second file system management unit 410 (see FIG. 6A and the description thereof above).

Specifically, according to some embodiments, step S1108 will return NO as long as the object store length of the particular file in the file system managed by the first file system management unit 310 is smaller than the length of the file of the particular file in the file system managed by the second file system management unit 410, and step S1108 will return YES when the object store length (as updated in step S1112) of the particular file in the file system managed by the first file system management unit 310 is equal to the length of the file of the particular file in the file system managed by the second file system management unit 410.

Upon performing steps S1109 and S1110 above, the corresponding file represents a regular file of the file system managed by the first file system management unit 310, and all user access to the file can be handled locally by the first file system management unit 310 as soon as user access to the data of the final migrated migration data block is enabled again in step S1111, and the method then yields in order to allow for one or more queued write requests received after step S1103 involving the file data of the target file to be executed after step S1111 and, then, continues with the next migration job in step S1101, if any.

Otherwise, in case step S1108 returns NO, i.e. when there are still further migration data blocks to be migrated for the particular file, the method will directly continue with steps S1111 of enabling user access again to the data of the particular migrated migration data block, and the method then yields in order to allow for one or more queued write requests received after step S1103 involving the file data of the target file to be executed after step S1111 and, then, continues with the next migration job in step S1101, if any.

Figure 10B:
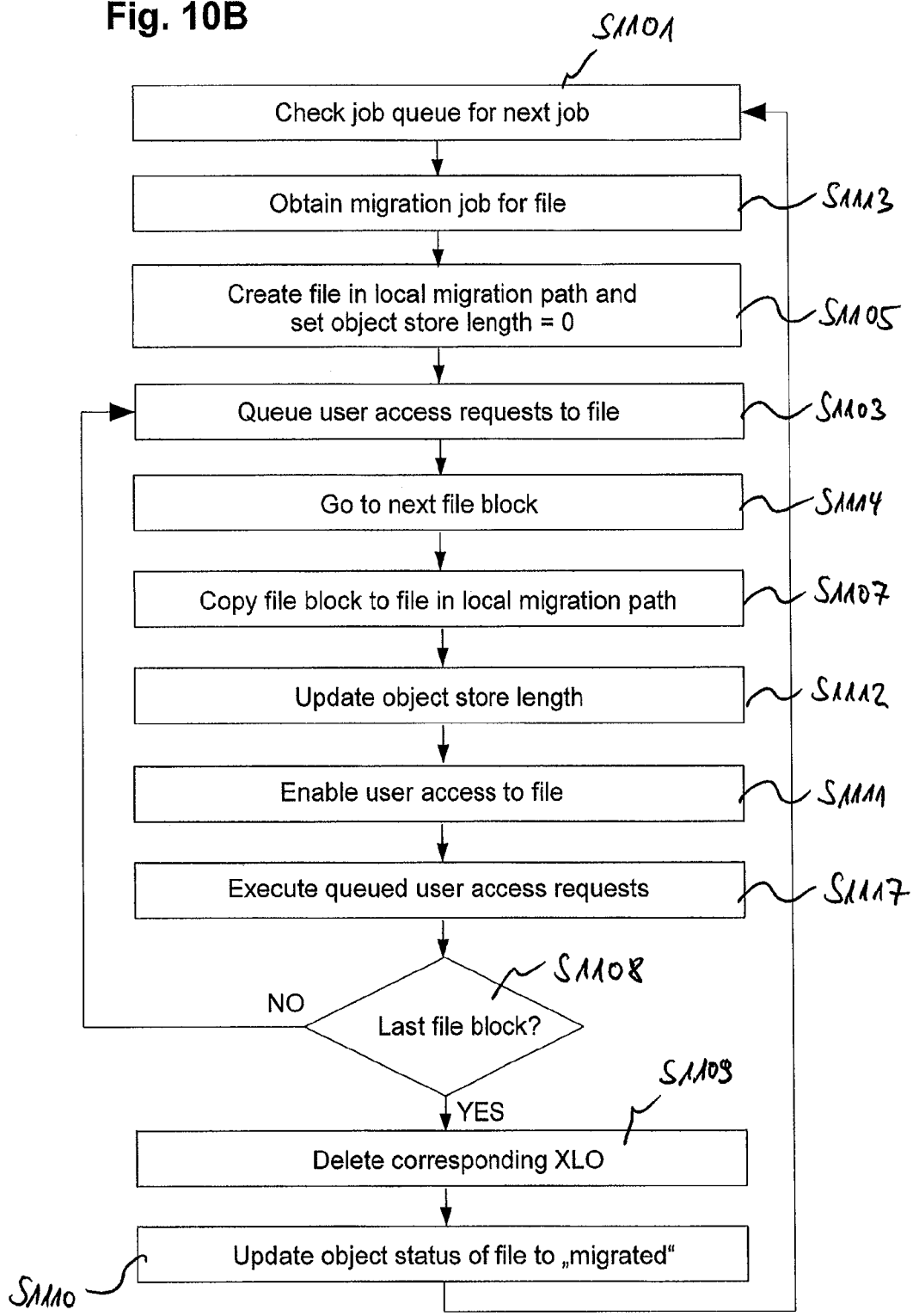
FIG. 10B shows another example of a flow chart of file data migration.

FIG. 10B shows another example of a flow chart of file data migration in an exemplary embodiment in which one single migration job is created for a file to be migrated. The migration unit 345 checks the job queue 346C for the next migration job in step S1101 and obtains the next migration job in step S1113, the migration job instructing execution of migration in connection with a particular file to be migrated as determined in step S1004 of FIG. 9B.

In step S1105, the migration unit 345 creates the corresponding file in a local migration path indicated in the migration job and sets the (local) object store length thereof to zero in metadata of the file in the first file system.

Then, user access requests to the file data content of the migration data block are queued (temporarily held off) in step S1103 so that clients temporarily cannot access the file data content of the file to be migrated during migration of migration data blocks thereof. Ft is to be noted that the client access requests trying to access the respective file in between the times of execution of steps S1103 and S1111, when client access is enabled again, is preferably queued (or blocked, temporarily held off) in a sense that the client observes a delay until step S1111 is executed, and preferably no error response is returned to the access attempting client. That is, one or more access requests received after step S1103 involving the current migration data block as a target block are queued and executed after step S1111.

Then, in step S1114 the method goes to the next migration data block which is determined based on the object store length. In case the object store length is zero, the first migration data block is selected. The determination of data migration blocks and the size thereof may be performed similar to step S1005 of FIG. 9A described above. On the other hand, if the object store length is non-zero and has a length of N times the data migration block size, the data migration block N+1 is selected in step S1114.

In step S1107, the data content of the migration data block, which is received from the second storage apparatus 400, is copied to the file in the local migration path. In connection with writing the data content of the migration data block to the storage unit 320 in step S1107, metadata related with the file is updated in that the (local) object store length of the file in the first file system is updated in step S1112, e.g., by adding the block size of the migrated migration data block to the previous object store length. In principle, the object store length can be updated within the write operation of step S1107. Also, it is to be noted that the migration procedure does not involve updating any other metadata such as access or modification times (e.g. time stamps), as the migration writes shall remain seamless to clients.

After writing the data content of the migration data block to the storage unit 320 in step S1107 and updating the object store length in step S1112, user access is enabled in step S1111, and all user access requests to the file block which have been received since step S1103 and have been queued are executed in step S1117. This has the advantage that queued access requests sent from clients can be executed (serviced) after each migration of a block and do not need to be held off until full migration of the file. Thus, it can be avoided to hold off user access for too long time periods, especially when migrating large files.

When the then migrated migration data block was the last migration data block to be migrated because all other migration data blocks associated with the same file had been previously migrated already (step S1108 returns YES), steps S1109 and S1110 are performed similar to FIG. 10A described above. Otherwise, in case step S1108 returns NO, i.e. when there are still further migration data blocks to be migrated for the particular file, the method will directly continue with repeating step S1103 of queuing (temporarily holding off) user access requests to the file and step S1114 in which the method goes to the next migration data block which is determined based on the object store length as updated in step S1112.

In contrast to FIG. 10A, the method of FIG. 10B exemplarily assumes that step S1103 holds off the client access to the whole file while in FIG. 10A step S1103 only holds off the client access to the actually migrating data migration block where the other blocks remain seamless accessible. In further embodiments, it is possible to further improve client access in the method of FIG. 10B in that step S1103 may be performed in the loop for data blocks after step S1114 only for holding off temporarily client access requests to the current data migration block so that client access to all other blocks (which have been migrated already and which have not been migrated yet) may remain enabled seamlessly. Then, step S1111 may be performed after step S1112 for enabling again user client access to the then migrated data migration block.

Figure 10C:
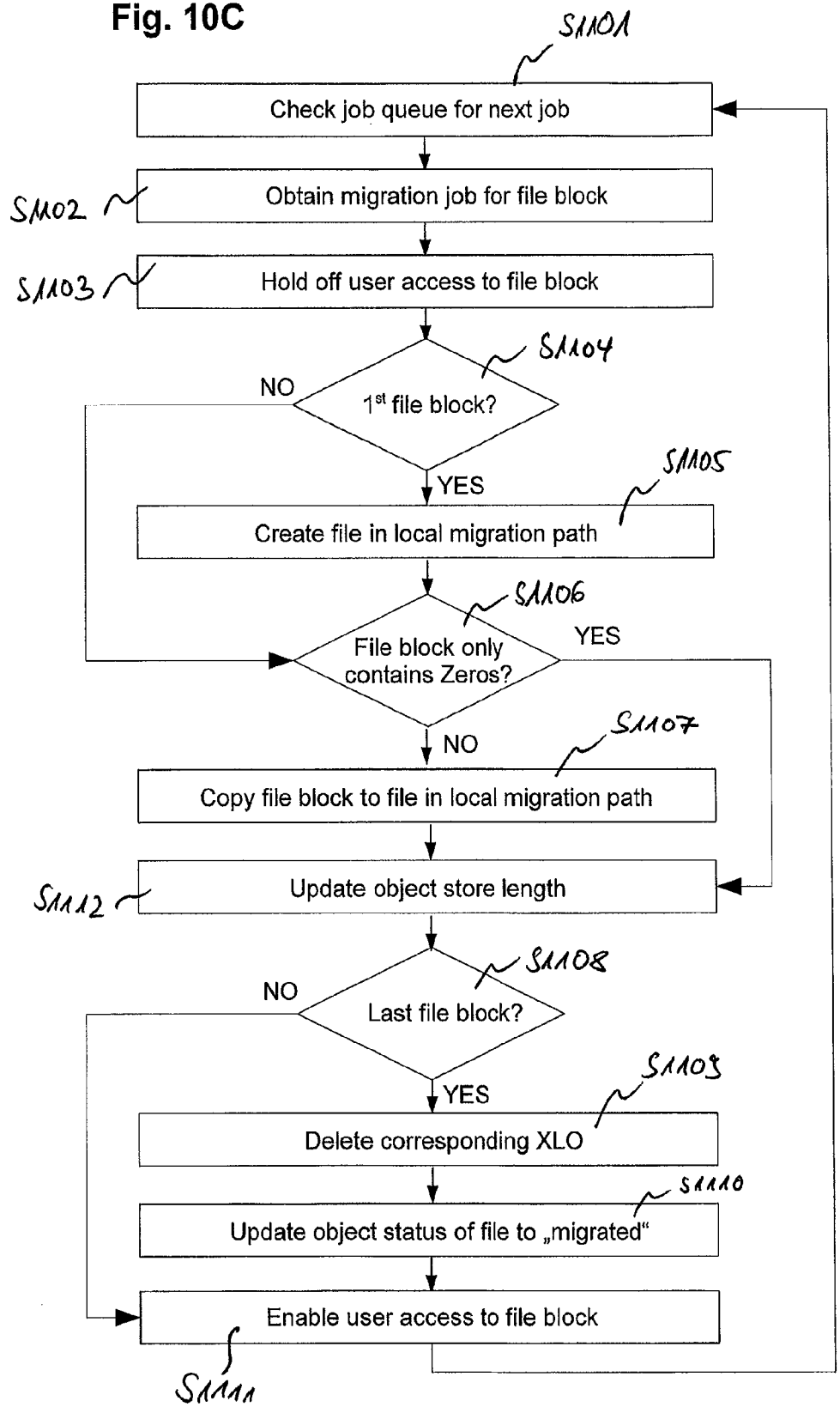
FIG. 10C shows another example of a flow chart of file data migration.

FIG. 10C shows another example of a flow chart of file data migration which improves migration and storage efficiency compared to the method of FIG. 10A. The method of FIG. 10O is similar to the one described with reference to FIG. 10A above, however, having an additional step S1106 of checking for the particular migration data block as to whether the migration data block contains only bits of zeros. Only if the migration data block contains at least one 1 in any bit thereof (non-zero bit), the method will continue with step S1107 of actually copying the respective migration data block to the file in the local migration path and step S1112 of updating the object store length.

Otherwise, if the migration data block contains only bits of zeros, the method will refrain from migrating the migration data block and will refrain from actually writing the migration data block to the storage unit 320 and step S1107 is omitted. Instead, the method may directly update the object store length, e.g. by incrementing the local object store length (onode length as indicator of the end-of-migration region) by the size of the data block without writing the actual data containing only zeros (step S1112). This has the advantage that inefficiently writing data portions which contain only zeros of a high sparseness file in the storage unit 310 can be avoided, while data sparseness in the storage unit 410 is reflected in the storage unit 310. For indicating that the respective block shall contain only bits of zeros, a flag in metadata of the file or block may be set to indicate that the block contains only zeros.

Preferably, the step S1106 is not performed by a central processing unit (CPU) of the first file system management unit 310 but by other means such as by being offloaded to FPGAs (Field Programmable Gate Array) of the first file system management unit 310. In other embodiments, in a hardware-based file system such as described e.g. in U.S. Pat. No. 7,457,822 B1, which is herein incorporated by reference, a hardware network stack of the first file system management unit 310 may inspect the data block for step S1106 whilst reassembling a remote procedure call (RPC) of a file system protocol such as e.g. NFS and to pass to software the first offset after an NFS header that contains non-zero data, or, the offset to the end of the request when no zeros are found. Such offsets may be indicators of a first non-zero bit in a header of a response of the file system protocol such as NFS.

The inspection may be made also during background migration on write user data (such as user data from a read request) when the user data is logged into NVRAM, when the write fails with a specific error if it detects that only zeros are being written. Then, the object store length of the respective file may be incremented depending on the size of the user data content having only zeros instead of actually writing the data containing only zeros (i.e. incrementing the object store length by an amount corresponding to the number of zeros that were attempted to be written but failed).

In some embodiments, the check of step S1106 may be performed by analyzing the data of the migration data block bit by bit, however, preferably, such complete analysis is not performed by a central processing unit of the processing unit 313 of the file system management unit 310. For improving efficiency, the byte-by-byte analysis check may be interrupted as soon as a non-zero bit is detected, and as soon as a non-zero bit is detected, the step S1106 may return NO without checking the bits of the rest of the migration data block.

Also, in case the data of the migration data block is analyzed bit by bit, for further improvement of efficiency, it may be desirable that the step S1106 is only performed for some of the files for which there is a high chance that blocks contain only bits of zeros. For example, the method may include another step of checking attributes of the particular file associated with the particular migration data block in order to determine whether step S1106 shall be carried out or not for the particular migration data block.

In some embodiments, when the file attribute relating to the percentage of storage usage of the allocated storage space falls below a predetermined threshold (indicating high sparseness in the file data content), step S1106 is carried out, and when the percentage of storage usage of the allocated storage space exceeds the predetermined threshold, step S1106 is not carried out and the method immediately continues with step S1107. This has the advantage that the step S1106 is carried out for migration data blocks having a higher risk of high sparseness when the percentage of storage usage of the allocated storage space of the particular underlying file is low, and the step S1106 is not carried out for migration data blocks having a lower risk of high sparseness when the percentage of storage usage of the allocated storage space of the particular underlying file is high.

It is to be noted that a risk of high sparseness in a block of data of a file of a certain percentage of usage of storage space is higher for files having a longer length of file. Therefore, in some embodiments, when the ratio of the percentage of storage usage of the allocated storage space to the (remote) length of the file falls below a predetermined threshold (indicating high sparseness in the file data content), step S1106 is carried out, and when the ratio of percentage of storage usage of the allocated storage space to the (remote) length of the file exceeds the predetermined threshold, step S1106 is not carried out and the method immediately continues with step S1107. This has the advantage that the step S1106 is carried out for migration data blocks having a higher risk of high sparseness when the ratio of the percentage of storage usage of the allocated storage space to the length of the file of the particular underlying file is low, and the step S1106 is not carried out for migration data blocks having a lower risk of high sparseness when the ratio of the percentage of storage usage of the allocated storage space to the length of the file of the particular underlying file is high.

Furthermore, in file system communication protocols such as NFS-based communication protocols, it is possible to make use of a read response structure of read responses of the NFS-based communication protocols in which a read response for a particular file may include metadata indicating a position of a first non-zero bit. It is possible to add metadata to an NFS read response (or any other protocol message, i.e. not limited to NFS) indicating the offset of the first non-zero byte in the section of the response/message that contains the user data. Such function may be performed by a hardware unit of the first file system management unit 310 (e.g. by a hardware network stack thereof).

Therefore, in some embodiments, it is possible to avoid cumbersome byte-by-byte analysis of the data of the migration data block by performing step S1106 on the basis of data indicating a position of a first non-zero bit in the file content of the particular file. For example, if step S1106 is performed for a migration data block including data of a front portion or an intermediate portion of the file data content of a particular file, and the position of a first non-zero bit in the file data content of a particular file is indicated to be in an end portion of the file data content of a particular file close to the end of the file, it can be easily and efficiently determined that the respective migration data block only contains bits of zeros, and step S1106 returns YES.

Figure 10D:
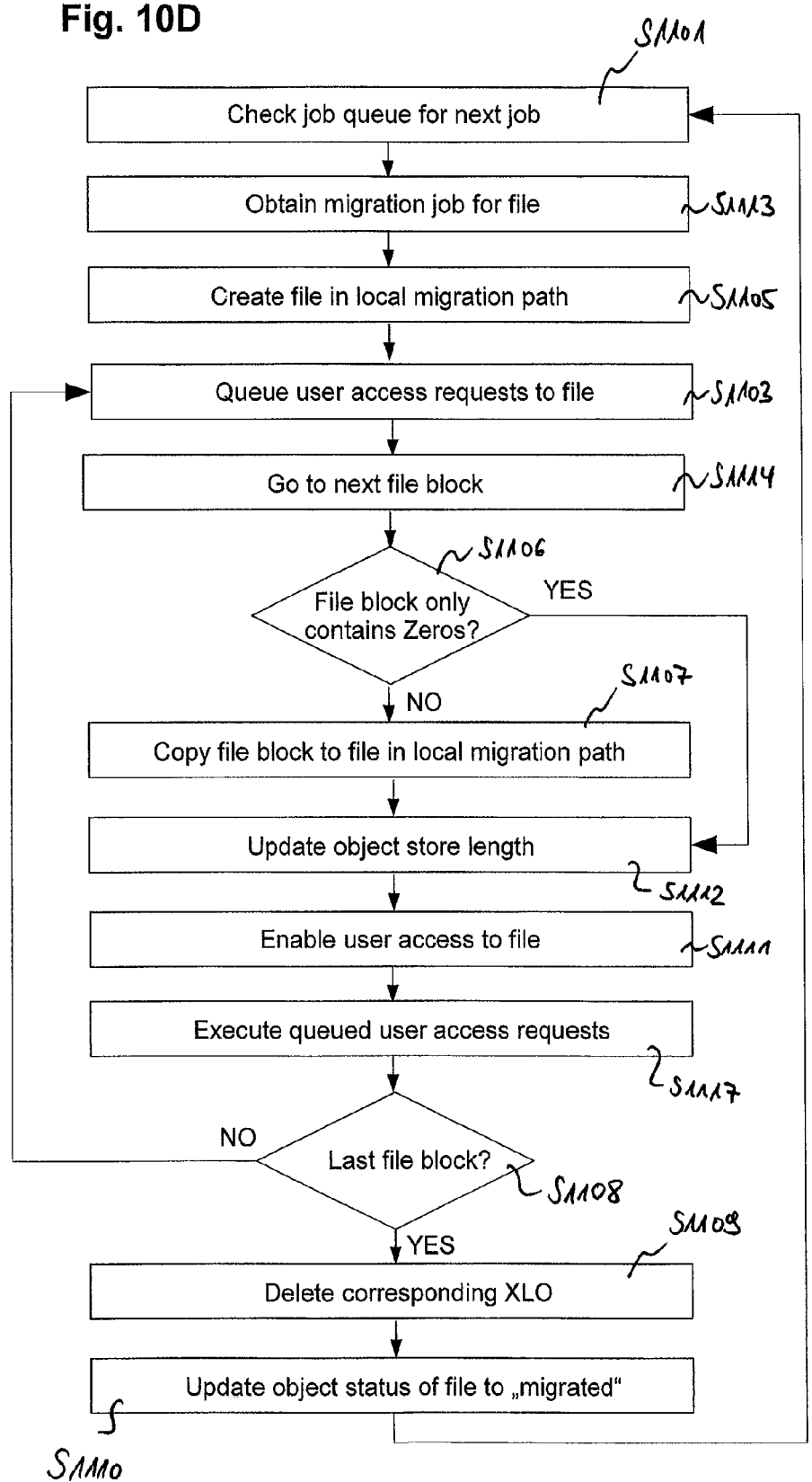
FIG. 10D shows another example of a flow chart of file data migration.

FIG. 10D shows another example of a flow chart of file data migration. FIG. 10D corresponds to a method in which one single migration job is created for a file similar to FIG. 10B above, having an additional step S1106 as described above in connection with FIG. 10C in the loop of successively migrating data migration blocks of the file between steps S1114 and S1107.

Figure 10E:
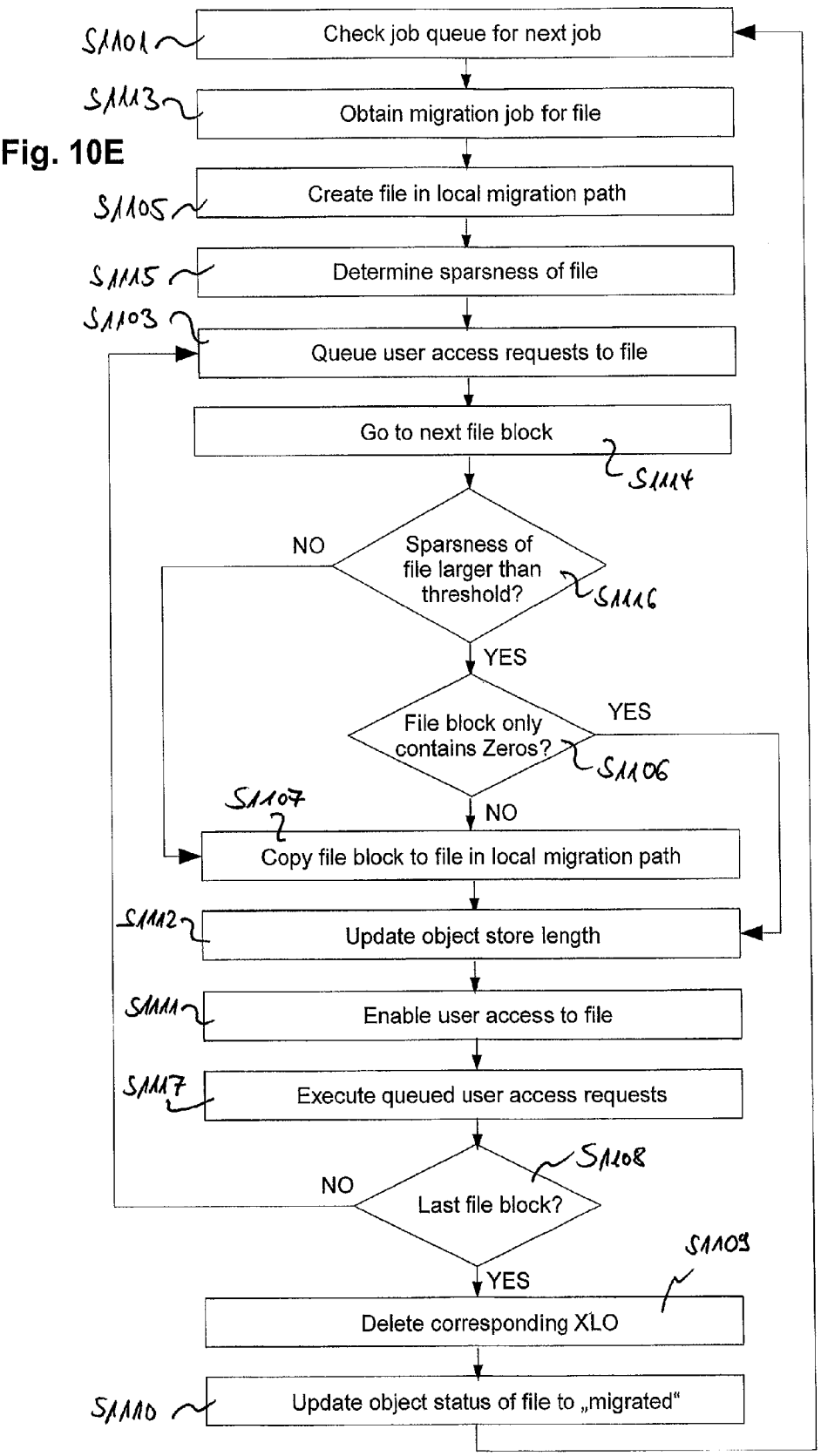
FIG. 10E shows another example of a flow chart of file data migration.

FIG. 10E shows another example of a flow chart of file data migration. FIG. 10E corresponds to a method in which one single migration job is created for a file similar to FIG. 10D above, However, the method of FIG. 10 comprises an additional step S1115 in which the sparseness of the file is determined, and in step S1116 it is determined whether the sparseness of the file determined in step S1115 is above a threshold.

In some embodiments, when the file attribute relating to the percentage of storage usage of the allocated storage space falls below a predetermined threshold (indicating high sparseness in the file data content), step S1116 may return YES, and when the percentage of storage usage of the allocated storage space exceeds the predetermined threshold, step S1106 may return NO. It is to be noted that a risk of high sparseness in a block of data of a file of a certain percentage of usage of storage space is higher for files having a longer length of file. Therefore, in some embodiments, when the ratio of the percentage of storage usage of the allocated storage space to the (remote) length of the file falls below a predetermined threshold (indicating high sparseness in the file data content), step S1116 may return YES, and when the ratio of percentage of storage usage of the allocated storage space to the (remote) length of the file exceeds the predetermined threshold, step S1116 may return NO.

If step S1116 returns NO, and sparseness of the file is not above a certain threshold, for increasing efficiency, step S1106 is not carried out and the method directly continues with step S1107 of migrating the data content and writing it to the storage unit 320. If step S1116 returns YES, step S1106 is carried out for all data blocks of the particular file similar to FIG. 10D above.

In the above with reference to FIGS. 10C to 10E, different advantageous approaches have been described for detecting whether a data migration block has only bits of zeros (i.e. a sparse block), or for detecting whether a data migration block has a high likelihood of having only bits of zeros for deciding of whether to check whether the data migration block has only bits of zeros or not in connection with the particular migration method above. It is however to be noted that the above described approaches for sparse-block detection and checking the likelihood of a data block being sparse (i.e. having a large amount of successive zero bits, e.g. a block having only zeros) can be applied independently of the above migration method for any method relating to reading, writing, moving, sending, and/or analyzing one or more data blocks in a file system management, e.g. for each step of detecting/checking whether a certain region of user data contains only zeros or at least one non-zero bit.

During virtualization (in the virtualization phase) and for virtualized file system object that have not yet been migrated (in the migration phase), user access to the file system(s) handled by the second storage apparatus 400 can be indirectly enabled through the first storage apparatus 300. User access to virtualized objects may be enabled as discussed in the following in connection with FIGS. 11A to 11H below.

Specifically, during the migration phase, the user access can be handled as shown in FIGS. 11A to 11H for all files which have not started migration yet (independent of whether migration jobs have been created yet or not) and for all directories which still include files that have not yet been migrated, with the exception that creation of new directories and new files may be performed on the file system managed by the first file management unit 310 only (and not on the file system managed by the second file management unit 410).

It is to be noted that, once the data of a particular file has been fully migrated in that all migration data blocks associated with the particular file have been migrated to the first storage apparatus 300 and the corresponding external link object has been removed, the file will be a regular file of the file system of the file system management unit 310 and the file will, therefore, be handled only locally on the file system of the file system management unit 310. The corresponding file in the file system of the second file system management unit 410 may therefore start differing from the file in the file system of the first file system management unit 310 due to user access to the file, and the corresponding file may therefore be deleted or be kept for reference.

Figure 11A:
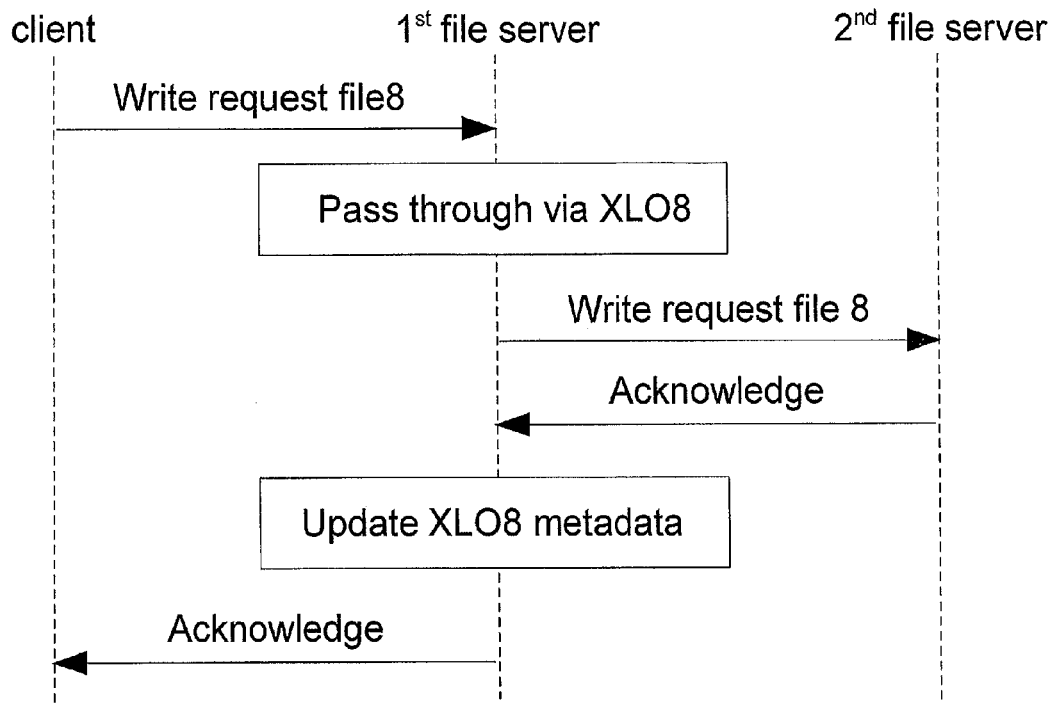
FIG. 11A shows an illustration of information exchange for write access to a virtualized file during the virtualization phase.

FIG. 11A shows an illustration of information exchange between a client 100, the first and second file system management units 310 and 410 for write access to a virtualized file for which migration has not yet started. When a write request is received for a target file (e.g. file8 of FIG. 4) at the first file system management unit 310, the write request is passed through via the corresponding external link object (e.g. XLO8 of FIG. 5) by issuing a corresponding write request for the target file from the first file system management unit 310 to the second file system management unit 410.

Upon receipt of the write acknowledgement from the second file system management unit 410 at the first file system management unit 310, the metadata of the corresponding external link object is updated (e.g. by updating the length of the file, the time stamp or other file attributes that changed by the write operation), and then the write is acknowledged to the client 100.

Figure 11B:
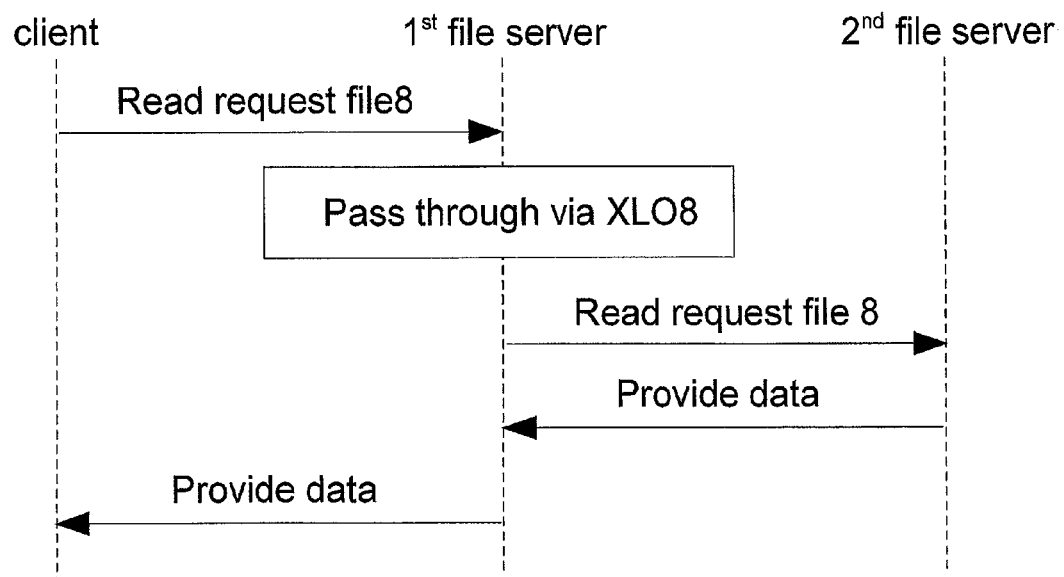
FIG. 11B shows an illustration of information exchange for read access to a virtualized file during the virtualization phase.

FIG. 11B shows an illustration of information exchange between a client 100, the first and second file system management units 310 and 410 for read access to a virtualized file for which migration has not yet started. When a read request is received for a target file (e.g. file8 of FIG. 4) at the first file system management unit 310, the read request is passed through via the corresponding external link object (e.g. XLO8 of FIG. 5) by issuing a corresponding read request for the target file from the first file system management unit 310 to the second file system management unit 410.

Upon receipt of the read response (including the read data) from the second file system management unit 410 at the first file system management unit 310, the received read data is transferred to the client 100 in response to the read request.

Figure 11C:
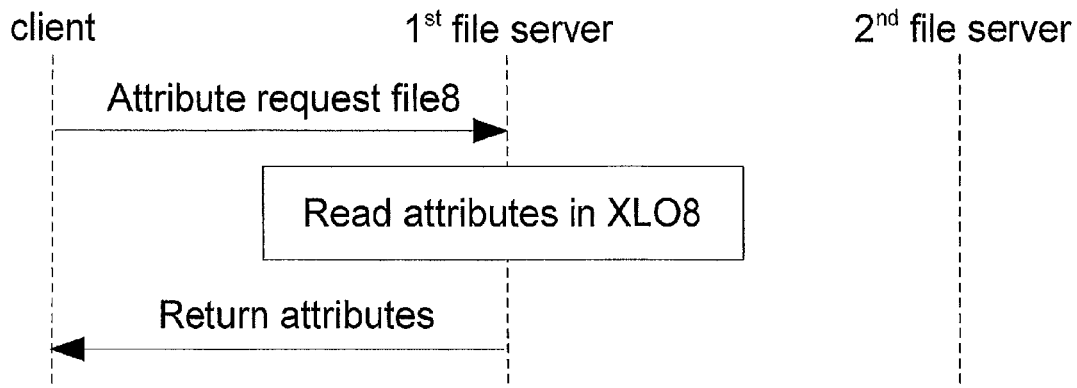
FIG. 11C shows an illustration of information exchange for attribute access to a virtualized file or directory during the virtualization phase.

FIG. 11C shows an illustration of information exchange between a client 100, the first and second file system management units 310 and 410 for attribute access to a virtualized file, for which migration has not yet started, or a directory. It is to be noted that the same procedure can be applied also for attribute access to a virtualized file which is undergoing migration but for which step S1109 above has not yet been executed.

When a read attribute request is received for a target file (e.g. file8 of FIG. 4) at the first file system management unit 310, the corresponding attributes are read locally from the corresponding external link object (e.g. XLO8 of FIG. 5), and the requested attributes are efficiently and conveniently returned to the client 100 in response to the client's read attributes request without any delays from communication with the second file system management unit 410.

For directories, read attribute requests are similarly handled locally at the first file system management unit 310 by reading the corresponding attributes from the directory metadata, and the read attributes are efficiently and conveniently returned to the client 100 in response to the client's read attributes request without any delays from communication with the second file system management unit 410.

In case of an inquiry on the link count of the directory, the first file system management unit 310 does not return the actual link count of the corresponding directory on the file system as managed by the first file system management unit 310 but returns the actual link count of the corresponding directory on the file system as managed by the second file system management unit 410 by returning the sum of the real link count and the fake link count as described above.

Figure 11D:
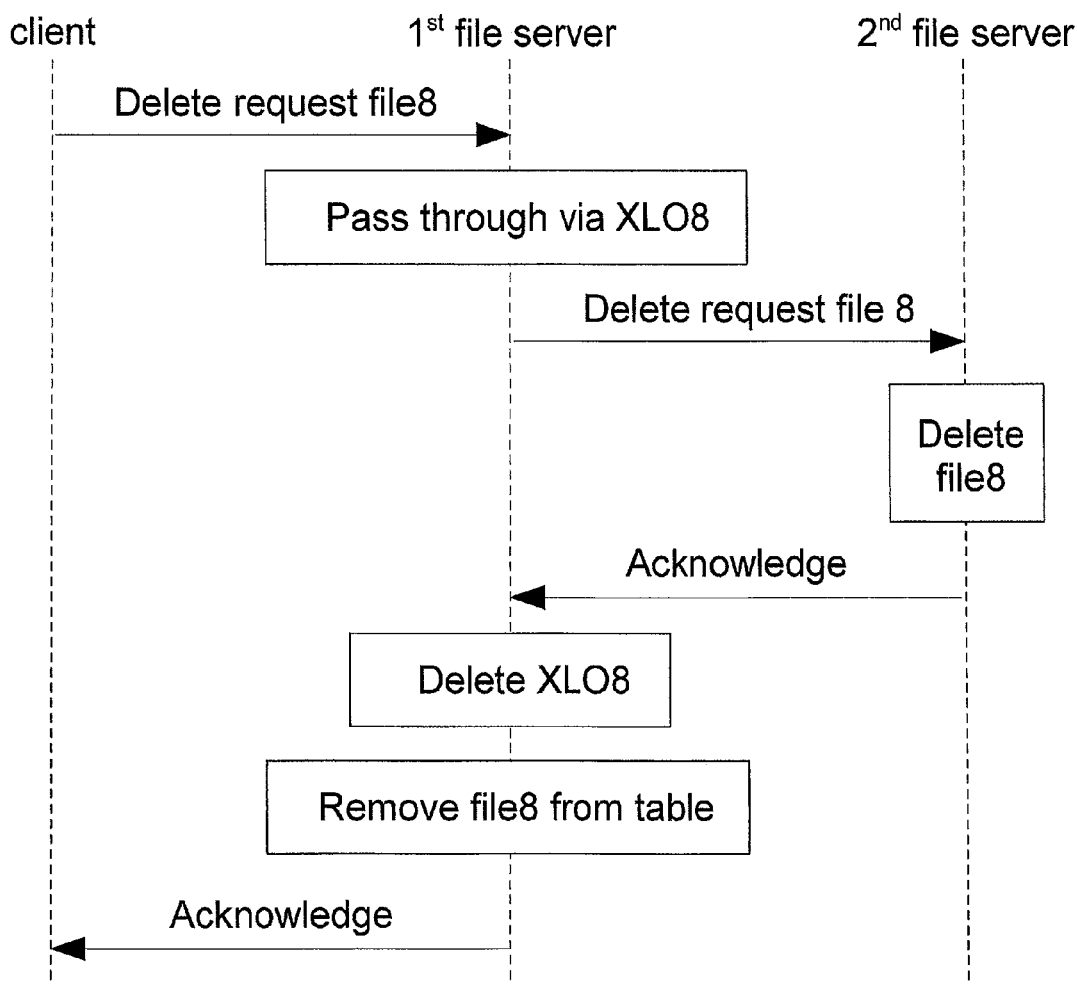
FIG. 11D shows an illustration of information exchange for deleting a virtualized file.

FIG. 11D shows an illustration of information exchange between a client 100, the first and second file system management units 310 and 410 for deleting a virtualized file for which migration has not yet started. When a delete request is received for a target file (e.g. file8 of FIG. 4) at the first file system management unit 310, the delete request is passed through via the corresponding external link object (e.g. XLO8 of FIG. 5) by issuing a corresponding delete request for the target file from the first file system management unit 310 to the second file system management unit 410.

Upon deletion of the target file (e.g. file8) by the second file system management unit 410 and receipt of the deletion acknowledgement from the second file system management unit 410 at the first file system management unit 310, the corresponding external link object (e.g. XLO8) is deleted and the corresponding entry in the virtualization management information table 341 is removed in order to avoid creation of a migration job for the deleted file, and then the deletion of the target file is acknowledged to the client 100.

In case the user attempts to delete a file which has not yet been fully migrated but has started migration already so that one or more migration data blocks have been migrated yet, the deletion can be performed as described above but the data of the already migrated migration data blocks that exists in the storage unit 310 can be deleted as well.

Figure 11E:
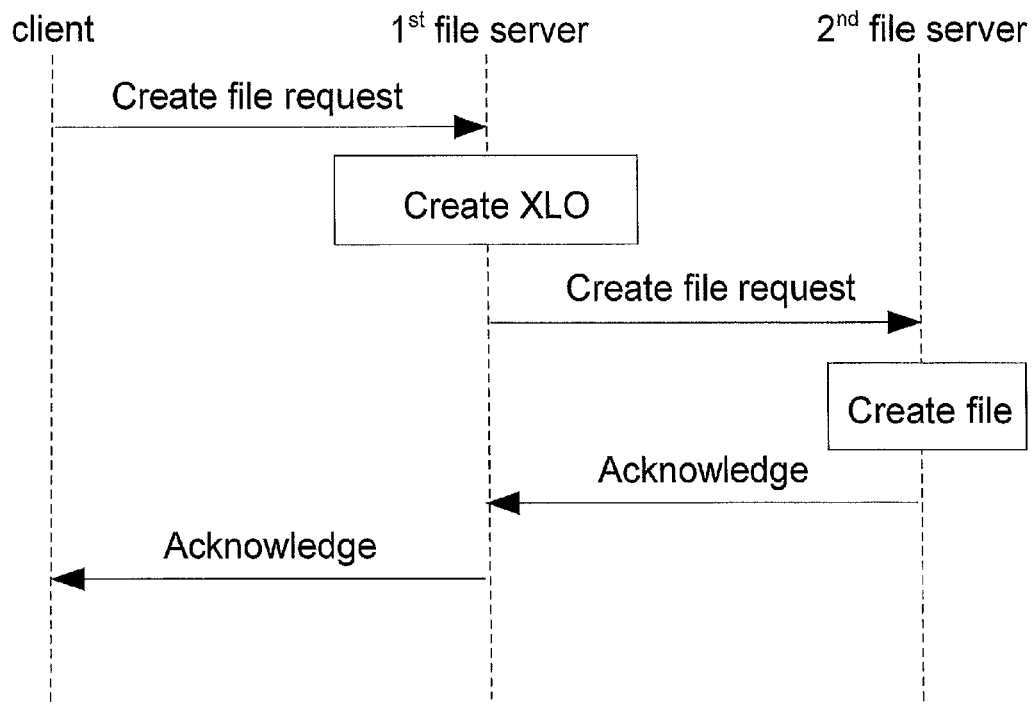
FIG. 11E shows an illustration of information exchange for file creation during the virtualization phase.

FIG. 11E shows an illustration of information exchange between a client 100, the first and second file system management units 310 and 410 for file creation during virtualization only.

When a file creation request is received at the first file system management unit 310 for creating a new file in a target path location, a corresponding new external link object is created in the local path corresponding to the target path location, and the file creation request is passed through by issuing a corresponding file creation request for the target file in the target path location from the first file system management unit 310 to the second file system management unit 410.

Upon creation of the new file in the remote path corresponding to the target path location and receipt of the file creation acknowledgement from the second file system management unit 410 at the first file system management unit 310 (and potentially after updating the metadata of the corresponding external link object), the file creation of the target file is acknowledged to the client 100.

While the file creation requests during migration can be handled similarly as discussed above, in order to reduce migration burden, it is preferable for the migration phase (i.e. in case migration has been initiated independent of whether virtualization is still ongoing or has ended already) that the file creation requests are handled differently, and that a file is created in response to the file creation request only in the file system managed by the first file system management unit 310 but is not passed through to the file system managed by the second file system management unit 410.

Figure 11F:
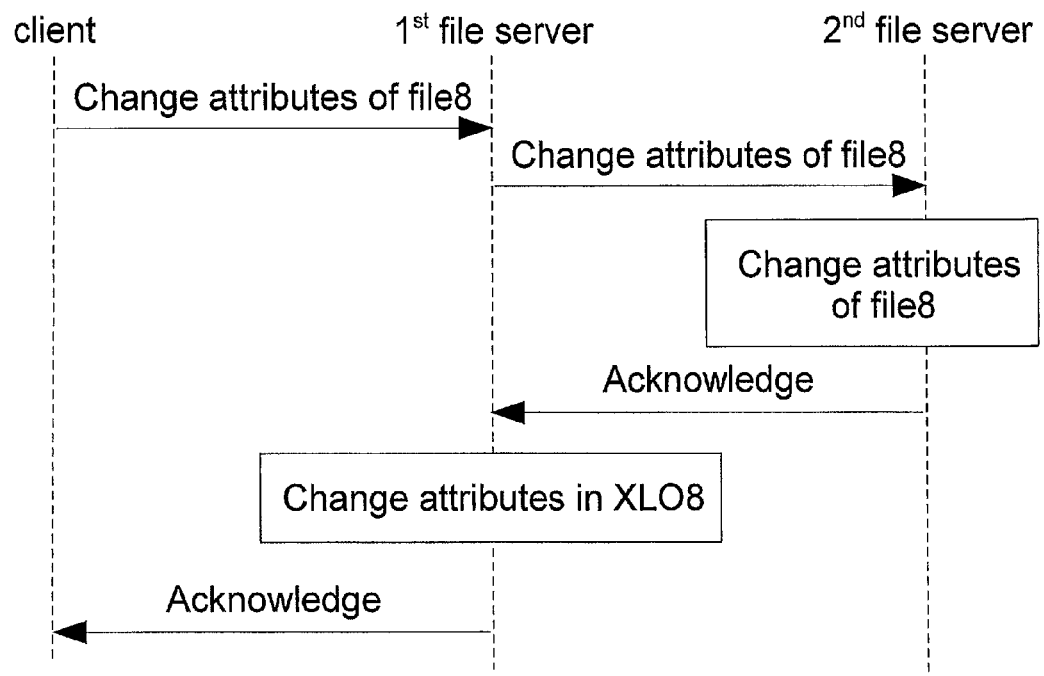
FIG. 11F shows an illustration of information exchange for changing attributes of a virtualized object.

FIG. 11F shows an illustration of information exchange between a client 100, the first and second file system management units 310 and 410 for changing attributes (during virtualization and during migration for files which have not yet been fully migrated). When a change attribute request is received for a target file (e.g. file8 of FIG. 4) at the first file system management unit 310, the change attribute request is passed through via the corresponding external link object (e.g. XLO8) by issuing the corresponding change attribute request for the target file (e.g. file 8) from the first file system management unit 310 to the second file system management unit 410, and then the change attribute request is executed at the first file system management unit 310 in that the attributes in the corresponding external link object (e.g. XLO8 of FIG. 5) are changed according to the change attribute request. When applying the change attribute request at the first file system, in case the attribute change is a set length from file-length to new-file-length, the object store length is only updated if the object store length is larger than the new-file-length.

Upon change of the attributes of the target file by the second file system management unit 410 and receipt of the attribute change acknowledgement from the second file system management unit 410 at the first file system management unit 310, the attribute change is acknowledged to the client 100. Similarly, when receiving a change attribute request for a target directory at the first file system management unit 310, the directory metadata of the virtualized directory is updated for changing the attributes according to the request, and then the change attribute request is transferred to the second file system management unit 410.

Figure 11G:
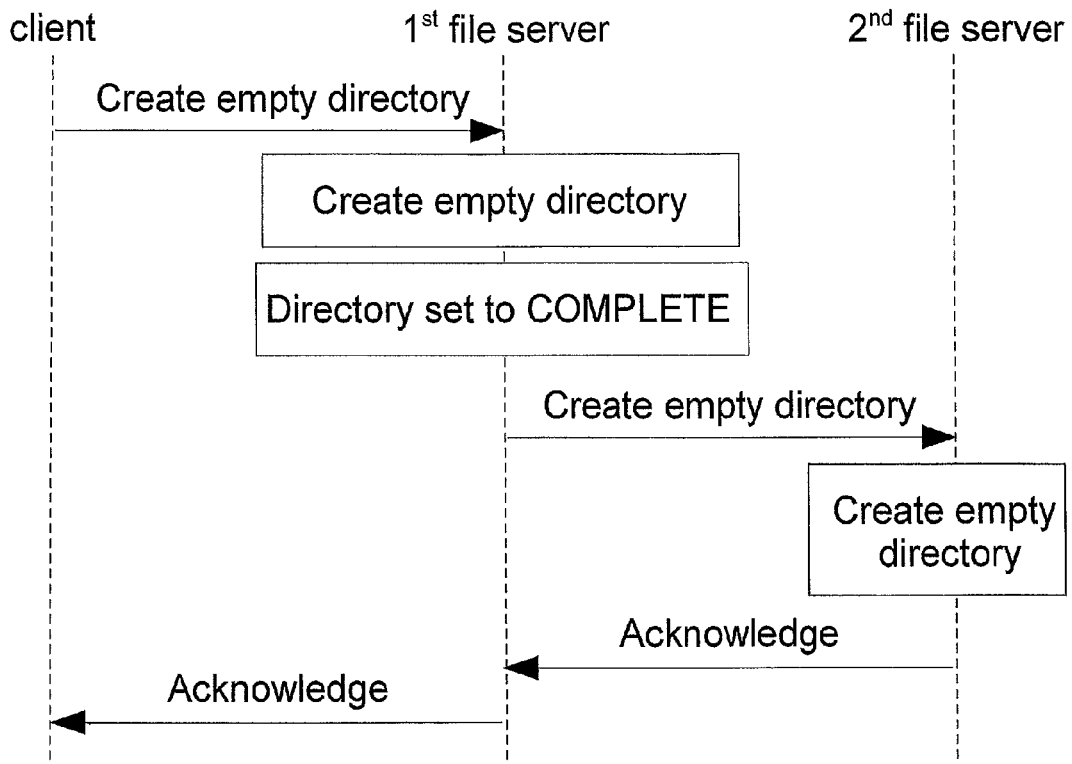
FIG. 11G shows an illustration of information exchange for directory creation during the virtualization phase.

FIG. 11G shows an illustration of information exchange between a client 100, the first and second file system management units 310 and 410 for directory creation during virtualization only. When a directory creation request is received at the first file system management unit 310 for creating a new empty directory in a target path location, a corresponding new empty directory and its directory metadata is created in the local path corresponding to the target path location and the new directory is indicated as being COMPLETE, and the directory creation request is passed through by issuing a corresponding directory creation request for the target directory in the target path location from the first file system management unit 310 to the second file system management unit 410.

Upon creation of the new empty directory in the remote path of the file system managed by the second file system management unit 410 corresponding to the target path location and receipt of the directory creation acknowledgement from the second file system management unit 410 at the first file system management unit 310 (and potentially after updating the metadata of the corresponding directory metadata), the directory creation of the target directory is acknowledged to the client 100.

While the directory creation requests during migration can be handled similarly as discussed above, in order to reduce migration burden, it is preferable for the migration phase (i.e. in case migration has been initiated independent of whether virtualization is still ongoing or has ended already) that the directory creation requests are handled differently, and that a directory is created in response to the directory creation request only in the file system managed by the first file system management unit 310 but is not passed through to the file system managed by the second file system management unit 410.

Figure 11H:
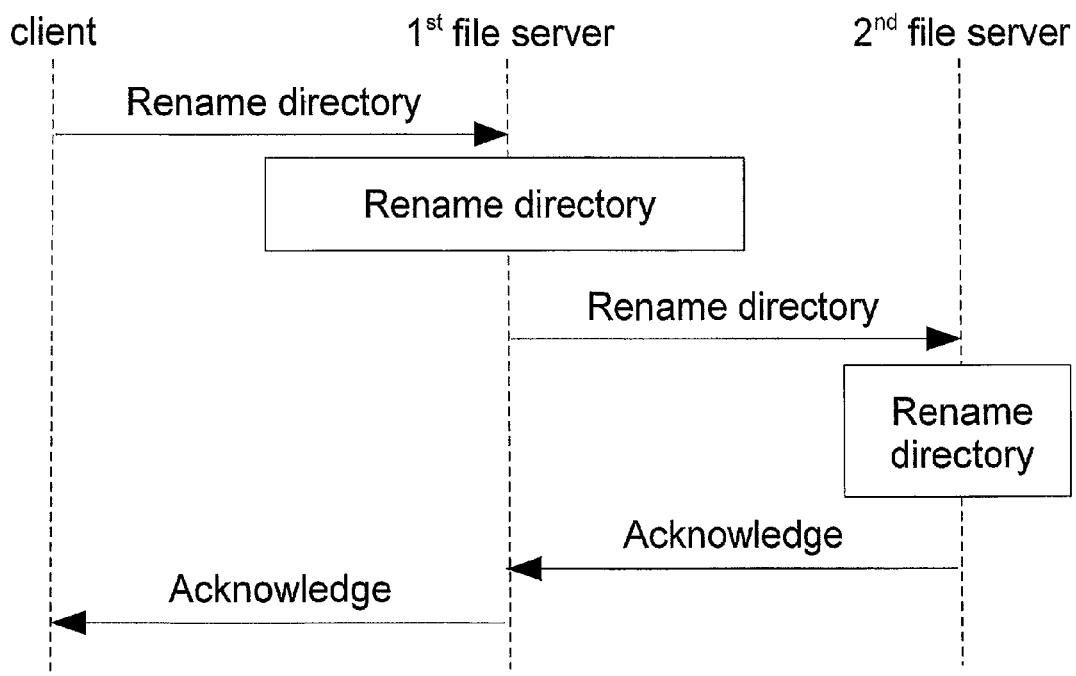
FIG. 11H shows an illustration of information exchange for directory renaming during the virtualization phase.

FIG. 11H shows an illustration of information exchange between a client 100, the first and second file system management units 310 and 410 for directory renaming. When a directory rename request (changing name and/or path location of the directory) is received at the first file system management unit 310 for renaming an existing directory, the corresponding directory is renamed in accordance with the directory rename request in the file system as managed by the first file system management unit 310, and the directory rename request is passed through by issuing a corresponding directory rename request for the target directory from the first file system management unit 310 to the second file system management unit 410.

Upon renaming the target directory in accordance with the directory rename request in the file system as managed by the second file system management unit 410 and upon receipt of the rename acknowledgement at the first file system management unit 310 from the second file system management unit 410, the directory renaming of the target directory is acknowledged to the client 100.

While the above description relates to user access to file system objects in the virtualized file system during the virtualization phase and during the migration phase for file system object for which migration has not yet begun, the following description relates to more general examples of enabling user access to files including files which are currently migrating, i.e. including files for which a plurality of migration jobs exists, each being directed to a migration data block of a group of migration data blocks being associated with the file content of the particular file. As discussed above in connection with FIGS. 10A to 10E, user access will be temporarily held off to the data of files or data migration blocks that are currently migrated, but all other files or migration data blocks, which have been migrated already or which have not yet started migration, can still be user accessible. This means that all client access attempts will still be processed (serviced) eventually, the only noticeable effect on the client side may be an additional latency.

Figure 12A:
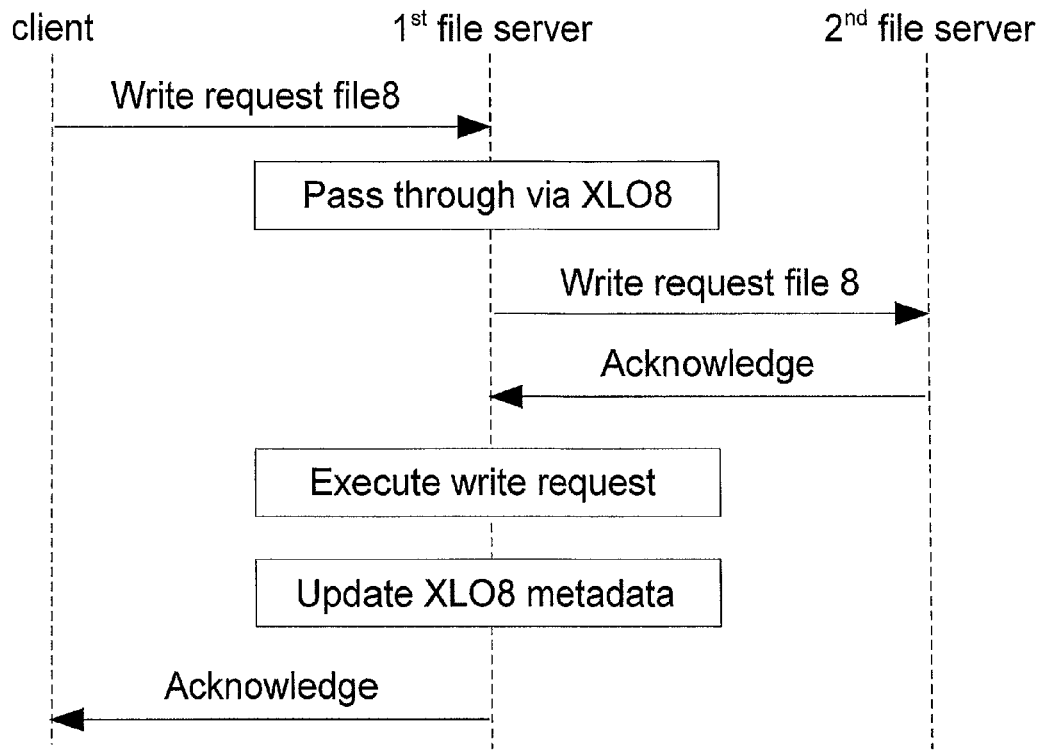
FIG. 12A shows an illustration of information exchange for write access to a virtualized file during the migration phase.

FIG. 12A shows an illustration of information exchange between a client 100, the first and second file system management units 310 and 410 during the migration phase for write access to a file for which migration has started and is ongoing. When a write request is received for a target file (e.g. file8 of FIG. 4) at the first file system management unit 310, while migration of the file has started and is ongoing, the write request is passed through via the corresponding external link object (e.g. XLO8 of FIG. 5) by issuing a corresponding write request for the target file from the first file system management unit 310 to the second file system management unit 410. Upon receipt of the write acknowledgement from the second file system management unit 410 at the first file system management unit 310, the write request may additionally be executed also to the migrated portions of the target file in the first file system and metadata of the corresponding external link object is updated (e.g. by updating the length of the file, the time stamp or other file attributes that changed by the write operation), and then the write is acknowledged to the client 100. If regions of the file have been migrated already but all of the regions which are targeted by the write access have not been migrated yet, the write access may be processed according to FIG. 12A in embodiments or according to FIG. 11A in other embodiments.

Figure 12B:
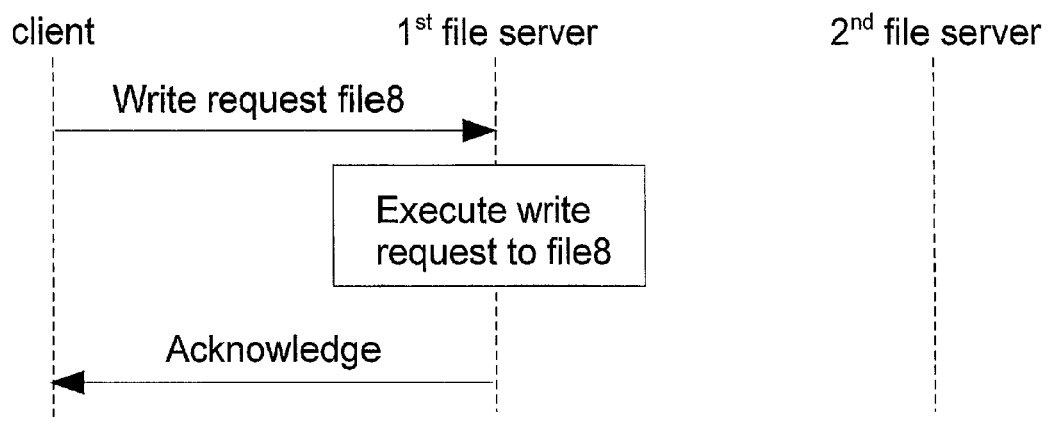
FIG. 12B shows an illustration of information exchange for write access to a migrated file during the migration phase.

FIG. 12B shows an illustration of information exchange between a client 100, the first and second file system management units 310 and 410 during the migration phase for write access to a file for which migration has been completed (i.e. when all target blocks of the target file have been migrated already and the actual user data thereof exists in the first file system stored in the storage unit 320). When a write request is received for a target file at the first file system management unit 310, for which migration of the file has been completed, the write request is executed only in the first file system. The metadata of the corresponding file is updated (e.g. by updating the length of the file, the time stamp or other file attributes that changed by the write operation), and then the write is acknowledged to the client 100.

In the embodiments of FIGS. 12A and 12B above, during migration phase, a write request to a target file is either applied to both file systems in case the file is only partially migrated yet or has not yet started migrating (FIG. 12A) or the write request is applied only to the first file system after the target file has been fully migrated already. Passing through write requests for a target file to the second file system management unit 410 until the target file is fully migrated keeps a canonical version of the target file in the second file system until the target file is fully migrated, i.e. the file is kept as a reference in the second file system. This has an advantage of simplifying failure handling because the file can be restored fully from a backup of the second file system as long as it is not fully migrated.

In other embodiments as described further below with reference to FIGS. 13A and 13B, for a partially migrated target file, write requests may be executed in the first file system only, if the target blocks of the write request have been migrated already, and write requests may be executed in the second file system only, if the target blocks of the write request have not yet been migrated. In such embodiments, neither the first nor the second file system may have the canonical version of the entire target file, but the first file system has the canonical data for blocks before the object store length and the second file system has the canonical data for blocks after the object store length.

While such embodiments may help optimize efficiency in handling user write access during migration, such conditions need to be considered in case of data recovery in that blocks before the object store length are restored from a backup copy of the first file system and blocks after the object store length are restored from a backup copy of the second file system.

Figure 12C:
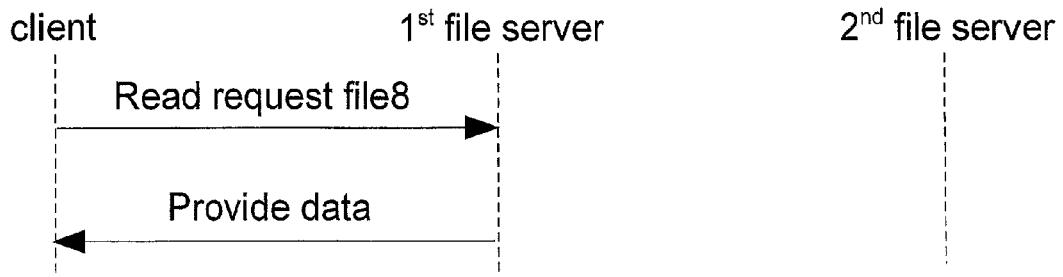
FIG. 12C shows an illustration of information exchange for read access to a migrated (or partially) file during the migration phase.

FIG. 12O shows an illustration of information exchange for read access to a migrated (or partially) file during the migration phase. FIG. 12C shows an illustration of information exchange between a client 100, the first and second file system management units 310 and 410 for read access to a migrated (or partially) file during the migration phase. When a read request is received for a target file (e.g. file8 of FIG. 4) at the first file system management unit 310, and the migration of the file has been completed already, the read request is executed locally by the first file system management unit 310 based on data stored in the storage unit 320, and the read data is transferred to the client 100 in response to the read request, without communication with the second file system management unit 410. Also, in case the file has been migrated only partially in that plural data migration blocks have been migrated already, but one or more data migration blocks need still to be migrated, and the read request only addresses user data of already migrated blocks, the read request is preferably handled locally by the first file system management unit 310 as described in FIG. 12C. On the other hand, if the read request as a whole or partially addresses user data of data migration blocks that still need to be migrated, the read request is preferably handled as described in FIG. 11B.

Figure 12D:
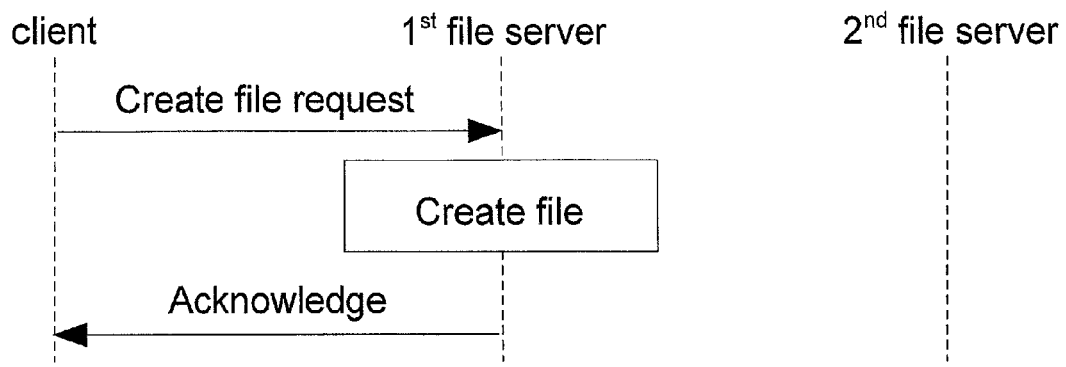
FIG. 12D shows an illustration of information exchange for file creation during the migration phase.

FIG. 12D shows an illustration of information exchange between a client 100, the first and second file system management units 310 and 410 for file creation during the migration phase. When a file creation request is received at the first file system management unit 310 for creating a new file in a target path location, in order to reduce migration burden, the corresponding file is created in the local path corresponding to the target path location only locally in the first file system by the first file system management unit 310, without passing the file creation request to the second file system management unit 410. Upon creation of the new file in the local path corresponding to the target path location, the file creation of the target file is acknowledged to the client 100.

This means that the file systems will start to differ during migration phase because new files are created only in the first file system without being reflected also in the second file system.

Figure 12E:
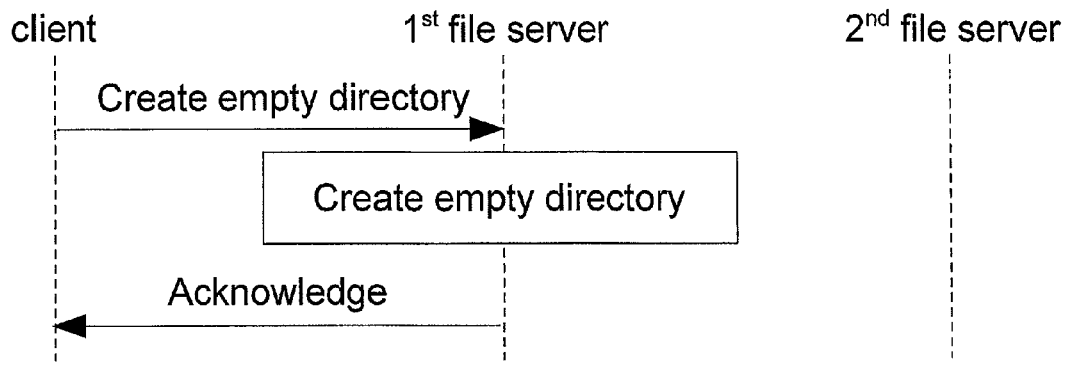
FIG. 12E shows an illustration of information exchange for directory creation during the migration phase.

FIG. 12E shows an illustration of information exchange between a client 100, the first and second file system management units 310 and 410 for directory creation during the migration phase. When a directory creation request is received at the first file system management unit 310 for creating a new empty directory in a target path location, the corresponding empty directory is created in the local path corresponding to the target path location only locally in the first file system by the first file system management unit 310, without passing the file creation request to the second file system management unit 410. Upon creation of the new empty directory in the local path corresponding to the target path location, the directory creation is acknowledged to the client 100.

This means that the file systems will start to differ during migration phase because new directories are created only in the first file system without being reflected also in the second file system. Creating new files on the first file system only has the advantage that overhead processing can be avoided, namely, overhead induced by transmitting access to the file's data to the second file system, the file's migration, and not benefiting from the hardware acceleration of the first file system can be avoided.

FIG. 13A shows an example of a flow chart of write access management during migration. In step S1201 a user write request is received for writing to a particular target file and it is checked in step S1202 whether the particular target file has been migrated yet or not, and if step S1202 returns YES, the write request is executed on the file system of the first file system management unit 310 in step S1206. Step S1202 will return YES for any target file which has the object status "migrated". Otherwise, if step S1202 returns NO, it is checked whether any migration data block has yet been migrated for the target file in step S1204. Step S1204 will return NO for any target file which has the object status "needs migration" or for any target file which has the object status "migrating" but all associated migration jobs are still held in the job queue 346C.

If step S1204 returns NO, the write request is executed on the file system of the second file system management unit 410 through the corresponding external link object associated with the target file in step S1207 (e.g. according to FIG. 11A above). Otherwise, if step S1204 returns YES, i.e. when one or more data migration jobs have been executed already and one or more migration data blocks have been migrated already, it is checked in step S1205 whether at least one data migration block of the one or more target blocks, which are affected by the data write according to the write request, has been migrated yet.

If step S1205 returns NO (i.e. the write only affects data blocks that have not yet been migrated), the write request is executed on the file system of the second file system management unit 410 through the corresponding external link object associated with the target file in step S1206 (e.g. according to FIG. 11A above). Otherwise, if step S1205 returns YES (i.e. the write also affects at least one data block that has been migrated already), and the write request is executed on the file system of the first file system management unit 310 in step S1206, but it may further be executed additionally on the file system of the second file system management unit 410 through the corresponding external link object associated with the target file in step S1207 such as via the dashed arrow (please see more specific examples for write access execution below).

In embodiments, in which steps S1207 and S1206 are both performed, when step S1205 returns YES (i.e. the write also affects at least one data block that has been migrated already) and e.g., especially even when the write also affects only data blocks that have been migrated already, the second file system remains to have the canonical data of the respective file until the file has been fully migrated, and in case of failure before the file has been fully migrated, the file can be fully re-migrated (be migrated again) from the canonical version in the second file system (or even truncated and fully migrated).

Figure 13B:
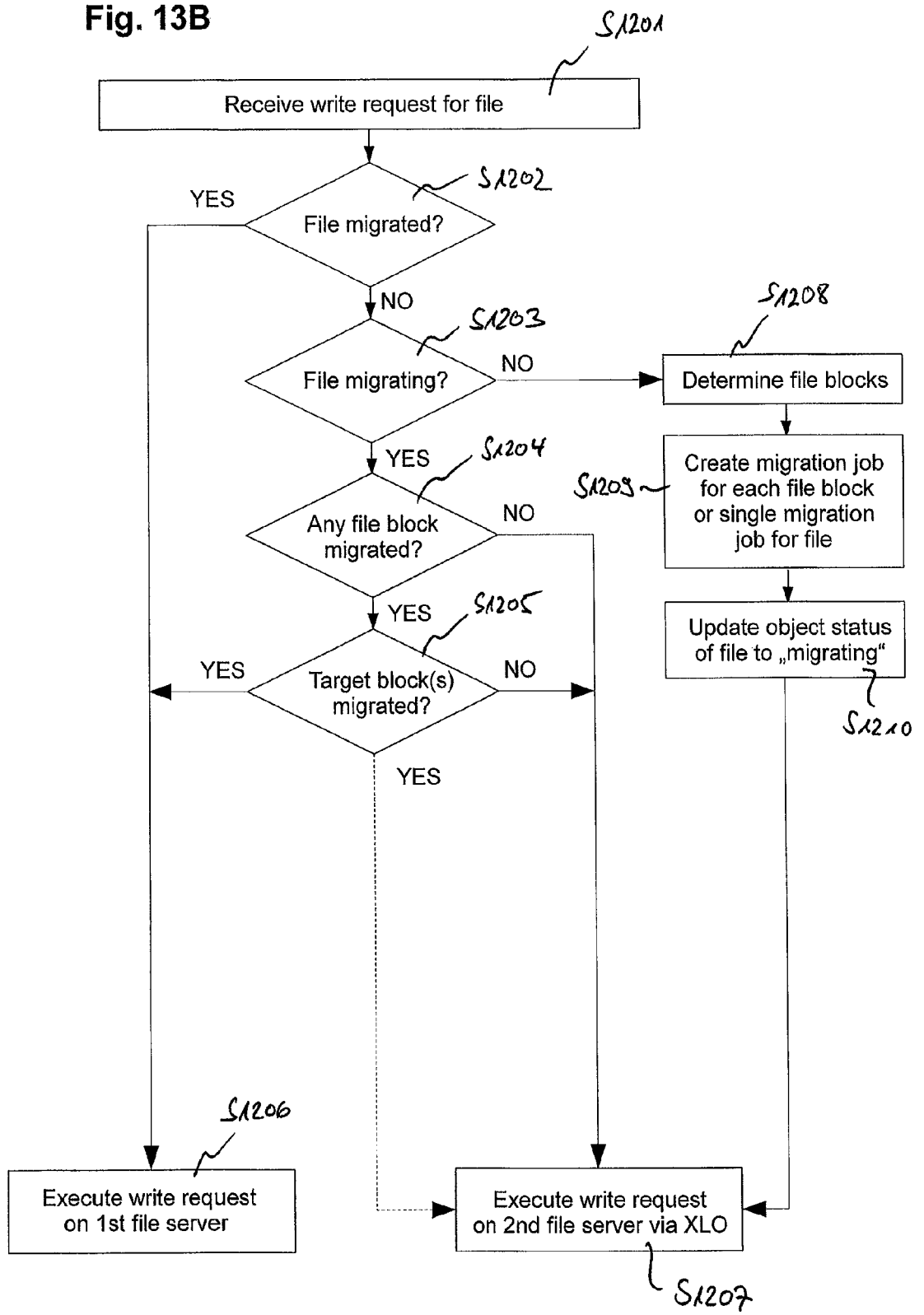
FIG. 13B shows another example of a flow chart of write access management during migration.

FIG. 13B shows another example of a flow chart of write access management during migration including on-demand migration initiation. Write requests will be handled similar to the method according to FIG. 13A above, however, with one additional step S1203 between steps S1202 and S1204 in which it is checked whether the target file is already migrating or not, i.e. whether the object status of the target file is "migrating". If step S1203 returns YES, the method will continue similar to the method of FIG. 13A above.

However, if step S1203 returns NO, on-demand migration of the target file will be triggered by the write request, and the method will continue with step S1208 of determining the migration data blocks of the target file, step S1209 of creating a migration job for each determined migration data block (or only one migration job for the file as in embodiments described above), and step S1210 of updating the object status of the target file to "migrating" similar to steps S1005, S1006, and S1007 described above for FIG. 9A. Then, the write request is executed on the file system of the second file system management unit 410 through the corresponding external link object associated with the target file in step S1207 (e.g. according to FIG. 11A above).

FIG. 14A shows an example of a flow chart of read access management during migration. In step S1301 a user read request is received for reading a particular target file and it is checked in step S1302 whether the particular target file has been migrated yet or not, and if step S1302 returns YES, the read request is executed on the file system of the first file system management unit 310 in step S1306. Step S1302 will return YES for any target file which has the object status "migrated". Otherwise, if step S1302 returns NO, it is checked whether any migration data block has yet been migrated for the target file in step S1304. Step S1304 will return NO for any target file which has the object status "needs migration" or for any target file which has the object status "migrating" but all associated migration jobs are still held in the job queue 346C.

If step S1304 returns NO, the read request is executed on the file system of the second file system management unit 410 through the corresponding external link object associated with the target file in step S1307 (e.g. according to FIG. 11B above). Otherwise, if step S1304 returns YES, i.e. when one or more data migration jobs have been executed already and one or more migration data blocks have been migrated already, it is checked in step S1305 whether the one or more target blocks, which are targeted by the data read according to the read request, have been migrated yet.

If step S1305 returns NO (i.e. the read at least one target data blocks that has not yet been migrated), the read request is executed on the file system of the second file system management unit 410 through the corresponding external link object associated with the target file in step S1306 (e.g. according to FIG. 11B above). Otherwise, if step S1305 returns YES (i.e. the read targets only data blocks that have been migrated already), and the read request is executed on the file system of the first file system management unit 310 in step S1306.

Figure 14B:
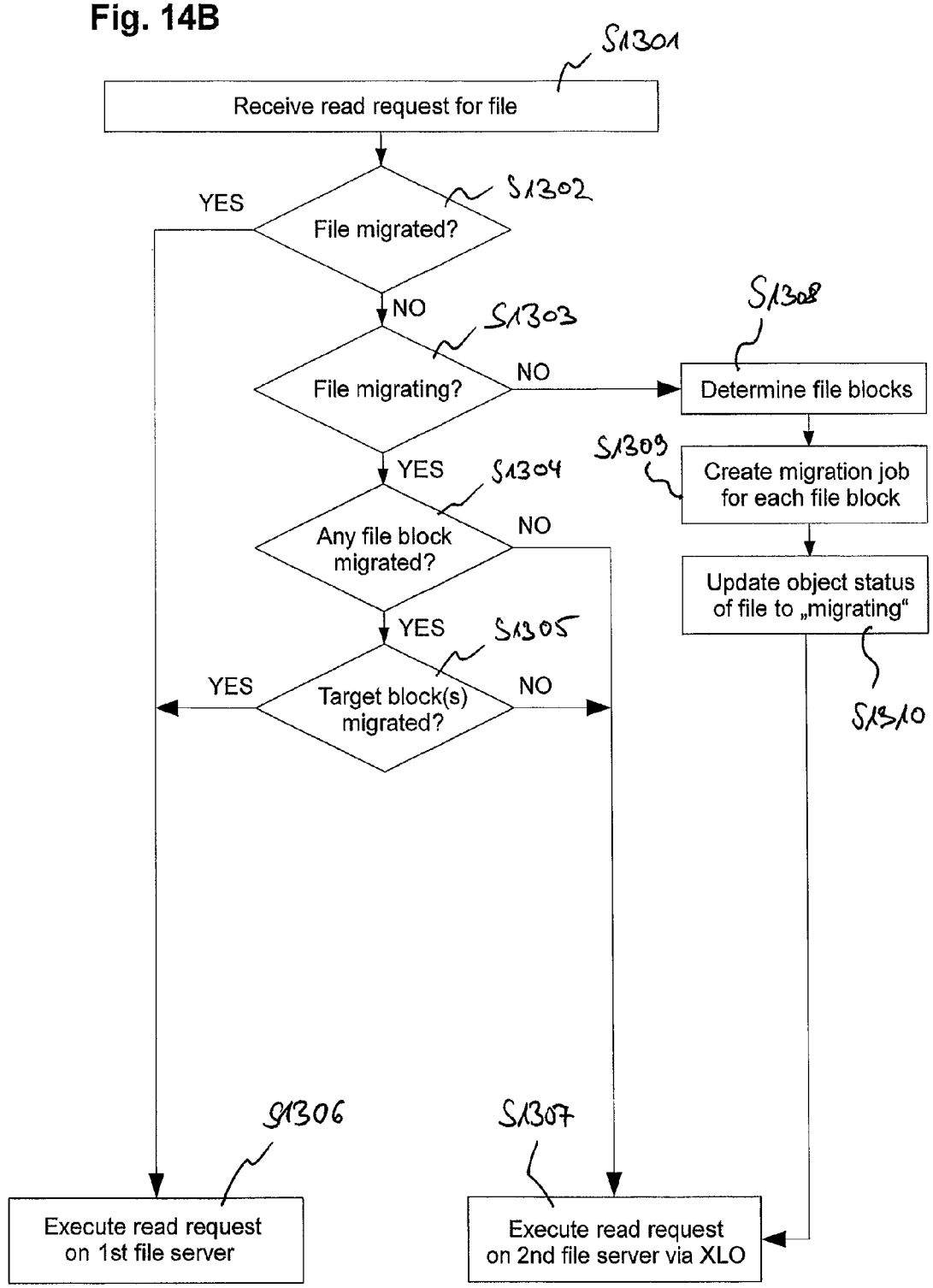
FIG. 14B shows another example of a flow chart of read access management during migration.

FIG. 14B shows another example of a flow chart of read access management during migration including on-demand migration initiation. Reads requests will be handled similar to the method according to FIG. 14A above, however, with one additional step S1303 between steps S1302 and S1304 in which it is checked whether the target file is already migrating or not, i.e. whether the object status of the target file is "migrating". If step S1303 returns YES, the method will continue similar to the method of FIG. 14A above.

However, if step S1303 returns NO, on-demand migration of the target file will be triggered by the read request, and the method will continue with step S1308 of determining the migration data blocks of the target file, step S1309 of creating a migration job for each determined migration data block, and step S1310 of updating the object status of the target file to "migrating" similar to steps S1005, S1006, and S1007 described above for FIG. 9A. Then, the read request is executed on the file system of the second file system management unit 410 through the corresponding external link object associated with the target file in step S1307 (e.g. according to FIG. 11B above).

In some embodiments, it is further desirable to avoid accidental resurrection of deleted files (or directories) from the file system of the second storage apparatus 400. For example, when a file or directory is deleted by a user in the file system at the first storage apparatus 400 but is remained at the file system of the second storage apparatus 400, it is possible that the respective file or directory may be accidentally resurrected by way of virtualization and subsequent migration from the second storage apparatus 400 thereof although it has been deleted by the user. Therefore, in order to avoid such accidental resurrection of previously deleted files or directories, file deletion requests and directory deletion requests may be passed through to the second storage apparatus 400 during virtualization, migration and even after migration of files and directories.

In some embodiments, it is further desirable to avoid accidental resurrection of renamed files or directories from the file system of the second storage apparatus 400. For example, when a file or directory is renamed by a user in the file system at the first storage apparatus 400 but is remained unchanged at the file system of the second storage apparatus 400, it is possible that the respective renamed file or directory may be accidentally resurrected by way of virtualization and subsequent migration from the second storage apparatus 400 thereof although it has been renamed by the user. Therefore, in order to avoid such accidental resurrection of previously renamed files or directories, rename requests may be executed at the file system of the first file system management unit 310 by way of creating a hard link to the file or directory before executing the renaming on only one of the two hard linked objects.

In some embodiments, it is further desirable to avoid accidental resurrection of end portions of previously truncated files from the file system of the second storage apparatus 400. For example, when a file is truncated by a user in the file system at the first storage apparatus 400 but is remained unchanged at the file system of the second storage apparatus 400, it is possible that the respective truncated end portion of the file may be accidentally resurrected by way of virtualization and subsequent migration from the second storage apparatus 400 thereof although it has been truncated by the user. Therefore, in order to avoid such accidental resurrection of end portions of previously truncated files, file truncation requests may be passed through to the second storage apparatus 400 during virtualization, migration and even after migration of files.

Figure 15A:
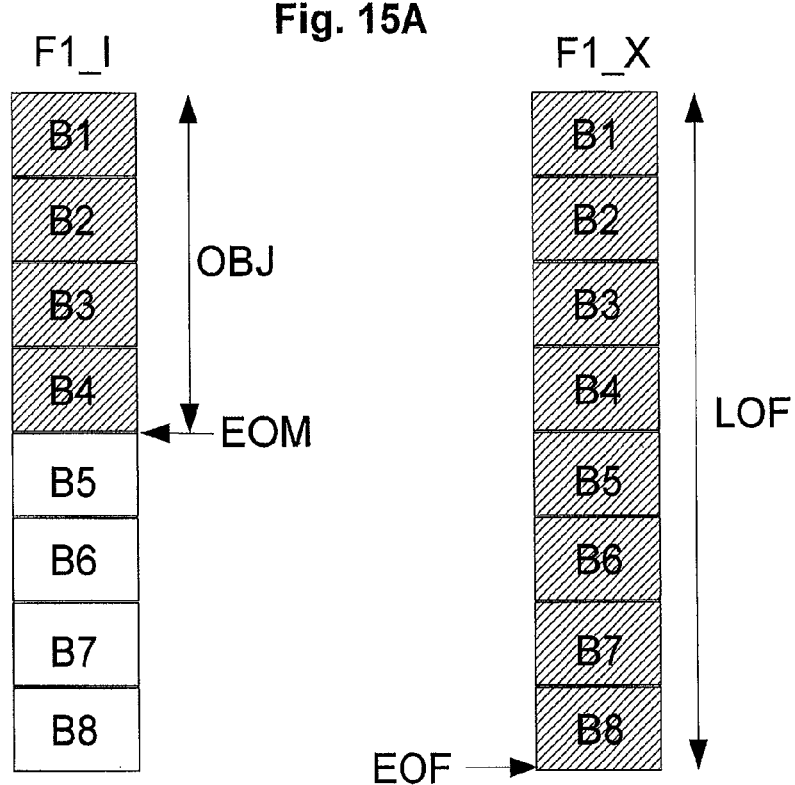
FIGS. 15A and 15B show an exemplary schematic view of file content of a file during migration and after migration.
Figure 15B:
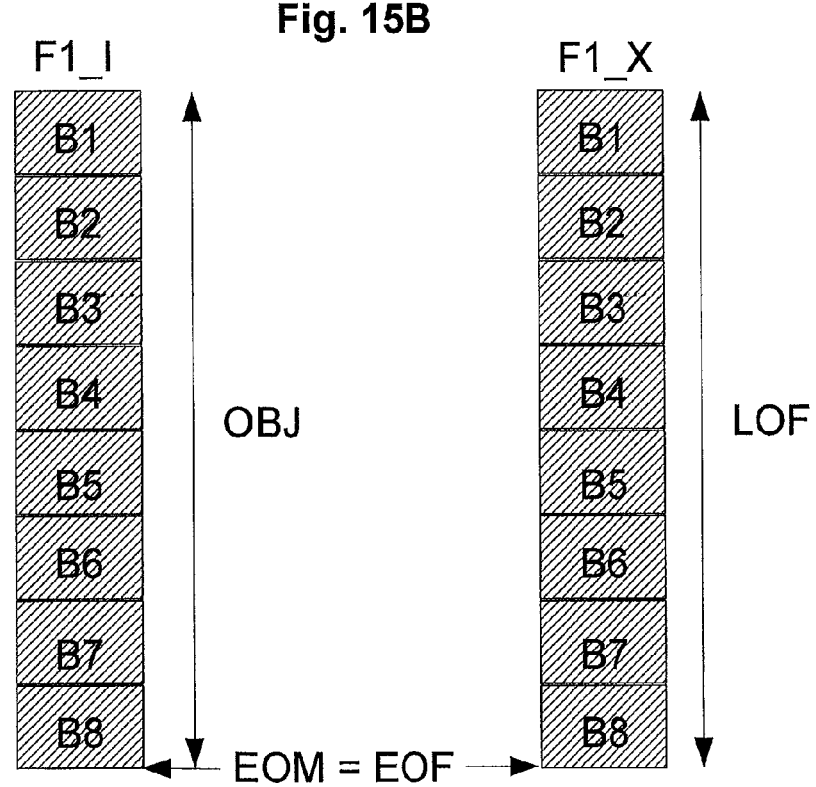

FIGS. 15A and 15B show an exemplary schematic view of file content of a file during migration and after migration. In FIG. 15A, a file content of a file F1_I is illustrated as it exists in the file system managed by the first file system management unit 310 on the left-hand side and a file content of the corresponding file F1_X is illustrated as it exists in the file system managed by the second file system management unit 410 on the right-hand side.

The corresponding file is currently migrated from the second storage apparatus 400 to the first storage apparatus 300 as described above. The file content F1_X is divided into the eight migration data blocks B1 to B8 and the contents of the migration data blocks B1 to B8 are successively migrated to the file F1_I on the left-hand side. As illustrated by the hatching (hatched blocks indicating blocks having user data stored therein), the four migration data blocks B1 to B4 have been migrated already and exist in the file system as managed by the first file management unit 310 and are actually stored on the storage unit 310, while blocks B5 to B8 need to be migrated yet.

Accordingly, the object store length OBJ of the file F1_I indicates the end-of-migration position EOM in the file content of file F1_I. On the other hand, in the corresponding file content of file F1_X, the end-of-file position EOF is indicated by the (remote) length of the file LOF. The (local) length of the file on the left-hand side could be equal to the object store length OBJ (e.g. in case no storage space has been yet allocated for blocks B5 to B8) or it could be equal to the (remote) length of the file LOF (e.g. in case storage space has been allocated already for blocks B5 to B8).

In FIG. 15B, file contents of the files F1_I and F1_X is illustrated after the content has been fully migrated and all of the data content of the file does exist also on the storage unit 310. Accordingly, the data of all migration data blocks B1 to B8 has been migrated and stored to the storage unit 310. As a consequence, the (remote) length of the file LOF of file F1_X is equal to the object store length OBJ of file F1_I, and the end-of-file position EOF of file F1_X is equal to the end-of-migration position EOM of file F1_I. This can be used for efficiently detecting that the file has been fully migrated (see step S1108 above).

Figure 16A:
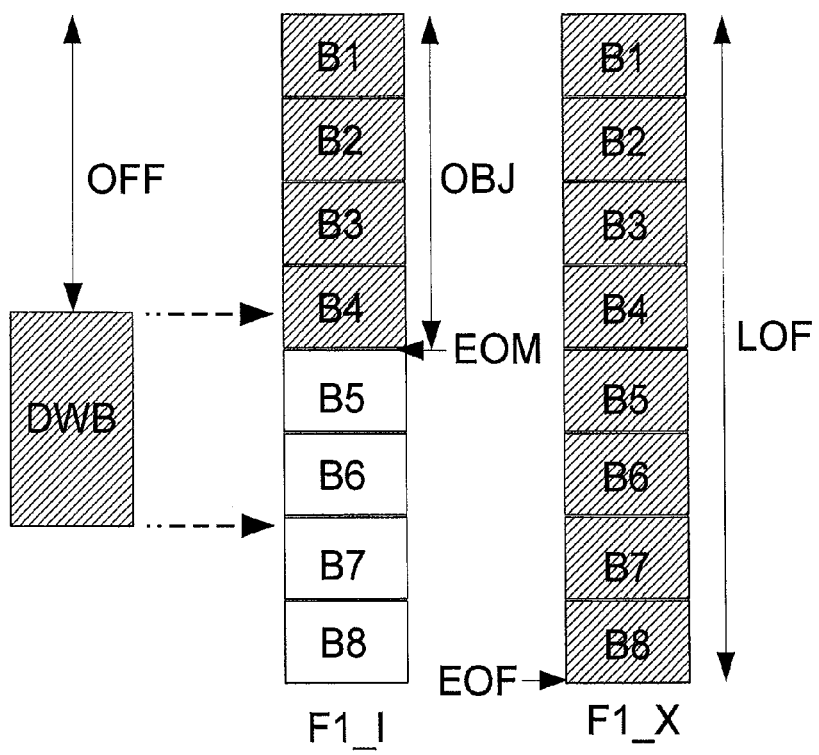
FIGS. 16A and 16B schematically illustrate exemplary data write procedures for file content of a file during migration and after migration.
Figure 16B:
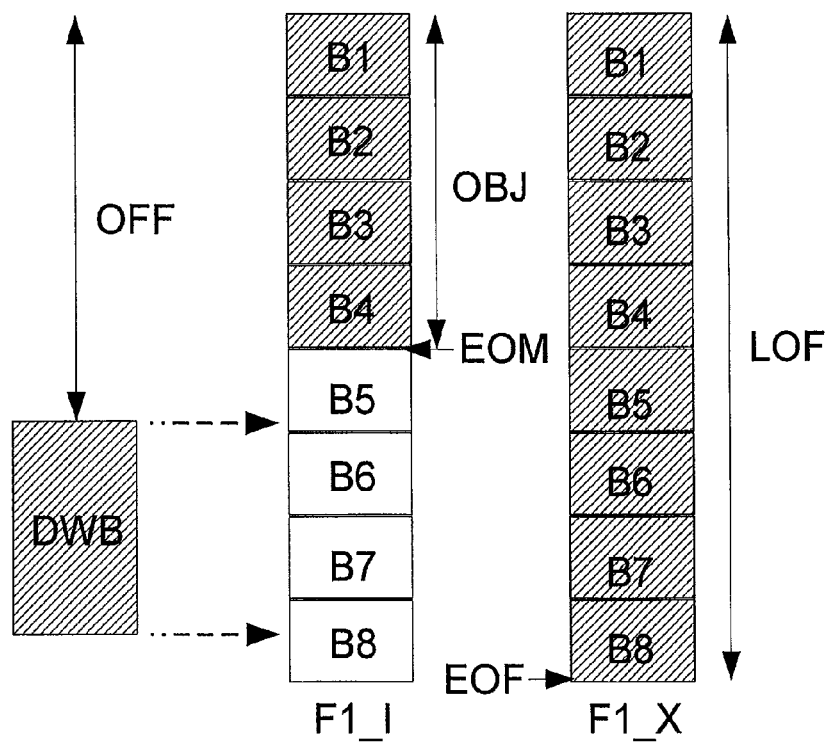

FIGS. 16A and 16B schematically illustrate exemplary data write procedures for file content of a file during migration and after migration. The migration situation in FIGS. 16A and 16B is similar to the migration situation in FIG. 15A above for files F1_I and F1_X, and it is assumed that at time at which the migration data blocks B1 to B4 have been migrated already, a data write request is received for writing a data write block DWB to the file associated with the file contents of F1_I and F1_X.

In FIG. 16A, an offset OFF of the data write block DWB is smaller than the current object store length OBJ of the file F1_I, and, therefore, it can be detected that the data write affects the target block B4 which has already been migrated. In accordance with steps S1205 and S1206, the data write according to data write block DWB will then be executed in the file content of file F1_I at the file system as managed by the first file system management unit 310 and it is preferably also executed in the file content of file F1_X at the file system as managed by the second file system management unit 410 or, otherwise, migration of migration data block B6 and of the portion of migration data block B7 up to the offset position OFF is skipped later.

In FIG. 16B, an offset OFF of the data write block DWB is larger than the current object store length OBJ of the file F1_I, and, therefore, it can be detected that the data write does not affect any migration data blocks which have already been migrated. In accordance with steps S1205 and S1207, the data write according to data write block DWB will then be executed in the file content of file F1_X at the file system as managed by the second file system management unit 410. It may also be executed in the file content of file F1_I at the file system as managed by the first file system management unit 310.

Figure 17A:
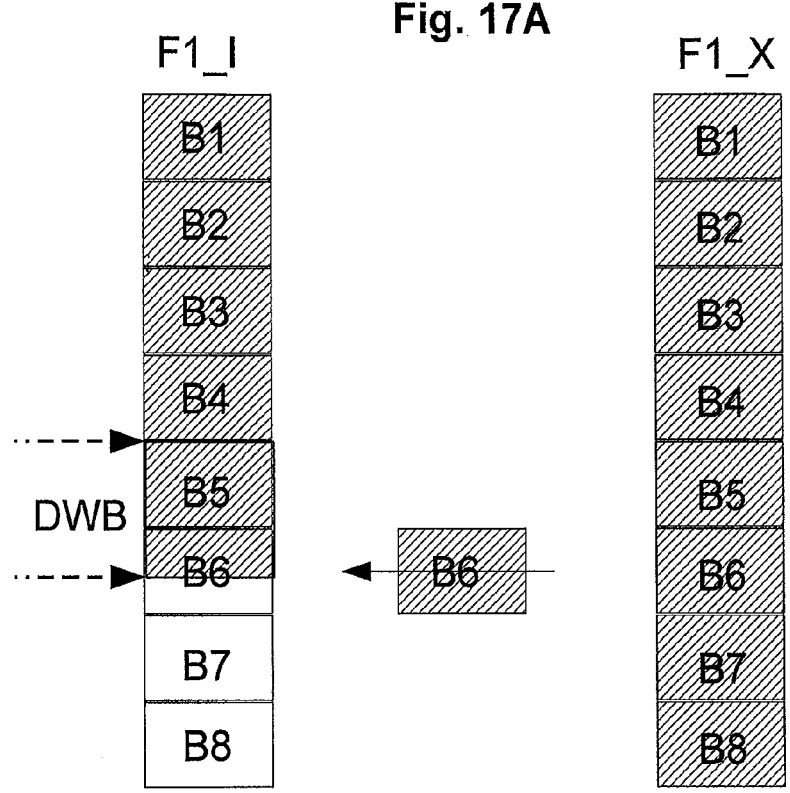
FIGS. 17A and 17B schematically illustrate exemplary data migration procedures for file content of a file during migration and after migration.
Figure 17B:
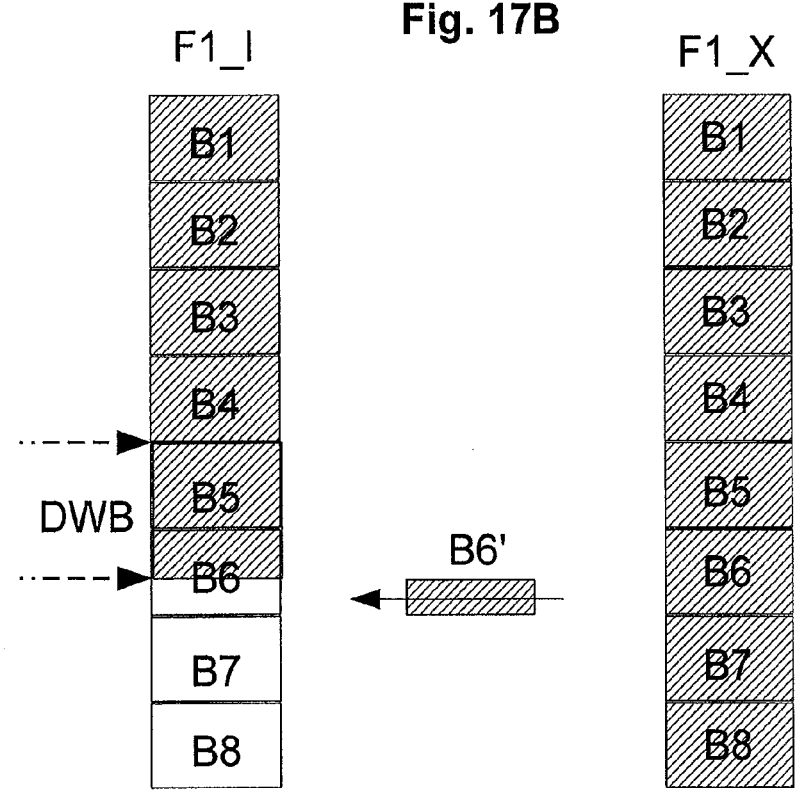

FIGS. 17A and 17B schematically illustrate exemplary data migration procedures for file content of a file during migration and after migration. The migration situation in FIGS. 16A and 16B is similar to the migration situation in FIG. 15A above for files F1_I and F1_X, and it is assumed that at time at which the migration data blocks B1 to B4 have been migrated already, a data write request is received for writing a data write block DWB to the file associated with the file contents of F1_I and F1_X. The data write has been executed in the file content of file F1_I at the file system as managed by the first file system management unit 310 and the end-of-migration position has been shifted to a position in migration block B6.

For migration purposes, the migration data block B6 can be migrated as a whole later, once the migration job for migration data block B6 is executed by the migration unit 345 as indicated in FIG. 17A, and the migration data block B6 can be written as a whole to the file content of file F1_I at the file system as managed by the first file system management unit 310. Alternatively, the migration unit 345 can check the current object length of the file content of file F1_I after the execution of the data write and migrate an adjusted smaller migration data block B6' which is cut off and extends from the position of the end position of the data write corresponding to the object store length of the file content of file F1_I after the execution of the data write to the end position of migration data block B6.

Figure 18:
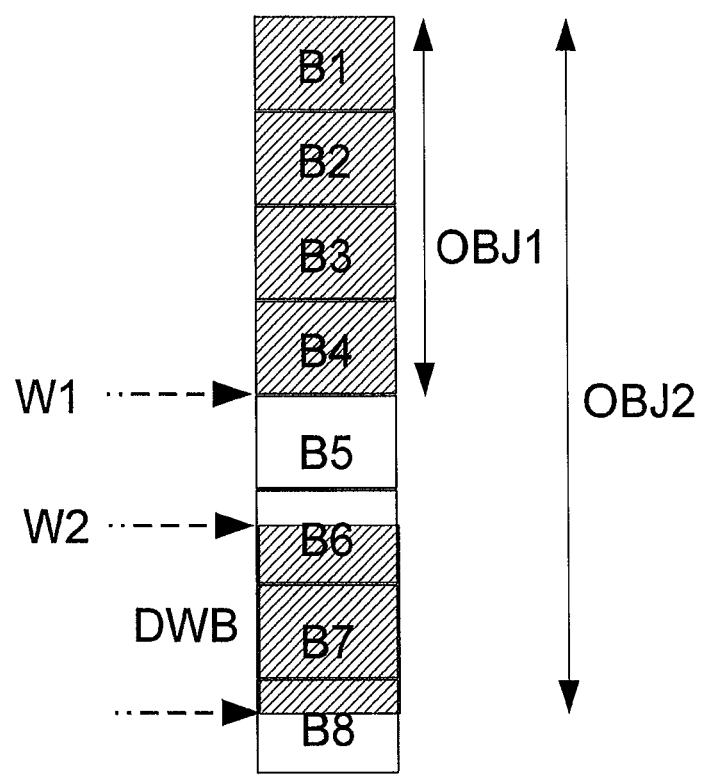
FIG. 18 shows an exemplary schematic view of file content of a file during migration.

FIG. 18 shows an exemplary schematic view of file content of a file during migration. Exemplarily, a user write request is received in connection with a data write block DWB having an offset according to position W2 larger than the object store length OBJ1 at position W1 in the file system managed by the first file system management unit 310 (i.e. migration data blocks B1 to B4 have been migrated already), which would shift the object store length to OBJ2 in FIG. 18 if being written to the file content of the file in the file system managed by the first file system management unit 310.

In some embodiments, the data write block DWB could be written only to the file content of the file in the file system managed by the second file system management unit 410 so that it would be migrated together with migrating content of migration data blocks B6 to B8. In other embodiments, for increasing migration efficiency, the data write block DWB could be written to the file content of the file in the file system managed by the first file system management unit 310, leading to a hole in between positions W1 to W2. Then, the content of data write block DWB could be skipped later during migration of migration data blocks B6 to B8 by skipping migration block B7 completely and adjusting the size of blocks B6 and B8 when being migrated in a similar manner than described above for block B6' in FIG. 17B.

However, in the latter embodiments, when being combined with sparseness detection as described for some embodiments above, i.e. when analyzing whether a migration data block has only bits of zeros, there may occur problems in being able to determine whether the hole between W1 and W2 is due to the fact that no data has been migrated yet or due to the fact that the data write block actually spans from W1 to the end position of the new object store length OBJ2 in that the hole between W1 to W2 is created by intent according to user-intended sparseness. Such problems can then be overcome by assigning checkpoint numbers to blocks of data, when blocks of data relating to a new data write are assigned a checkpoint number being incremented by one for each new data write request.

Then, in case the hole between W1 and W2 is due to user-intended sparseness (as an intended sparse part of the data write block DWB), the hole between W1 and W2 is assigned a newer checkpoint number. However, if the hole between W1 and W2 is representing just a hole due to the fact that the data has not yet been migrated, the hole W1 to W2 can be assigned an older checkpoint number, and it is later decided as to whether the data shall be migrated from the file content of the file in the file system managed by the second file system management unit 410 based on checkpoint number comparison.

Such checkpoint number may be a file system management parameter as known for file system management using a tree structure of file system objects including data blocks of user data and one or more node pointers (as file system metadata) pointing directly to data blocks and/or indirectly via one or more indirect node pointers to data blocks.

With regard to the above aspect of making use of checkpoint numbers, it is to be noted that there are known methods of file system management in which user data of the file system is stored in data blocks, and the file system contains a plurality of pointer nodes (as file system management metadata, sometimes referred to as pointer blocks, onodes, inodes etc.) in which the pointer nodes may point indirectly to data blocks via one or more other indirect pointer nodes and/or directly to data blocks. In such file system management methods, it is known to associate each pointer block with a certain checkpoint number and increment the checkpoint number for each file system modifying access for involved data blocks and pointer nodes so as to have checkpoints indicating versions of the file system.

For example, such exemplary use of checkpoint numbers is explained below and in more detail in U.S. Pat. No. 7,457,822 B1, which is herein incorporated by reference. FIGS. 19A to 19I exemplarily show an exemplary checkpoint number mechanism in a file system according to U.S. Pat. No. 7,457,822 B1 (corresponding to FIGS. 23 to 31 thereof).

Whenever the Object Store sub-module receives a request to modify an object, it first checks the root onode object (root block pointer) to determine the checkpoint number at which the root onode object was created. If the root onode object was created prior to creation of the last retained checkpoint, then the root onode object is part of that last retained checkpoint. In this case, the root onode object cannot be modified as described above, as this would corrupt the version of the object in the retained checkpoint. Rather, the object is modified in a special way as described by example below.

Figure 19A:
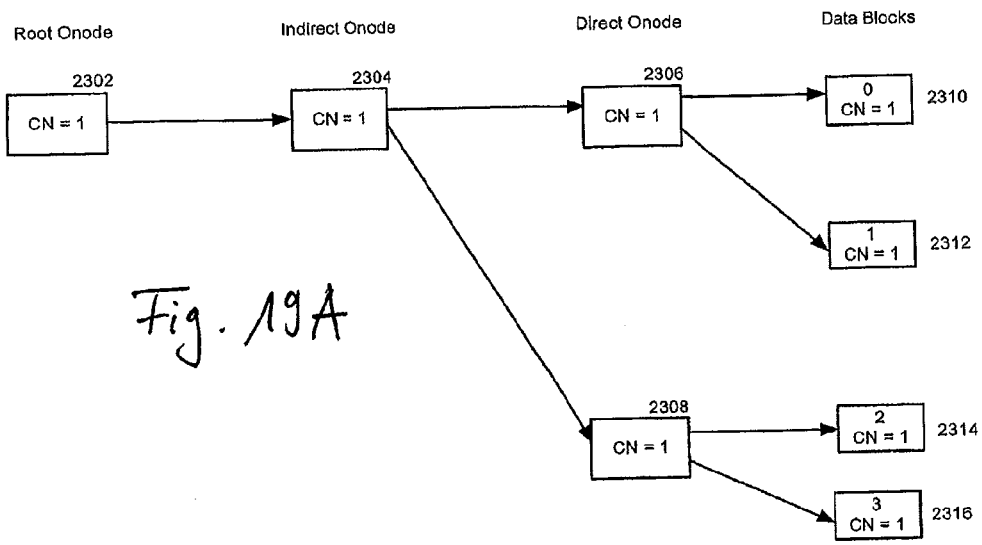
FIGS. 19A to 19I exemplarily show a checkpoint number mechanism in a file system.

FIG. 19A shows an object structure for an exemplary object that was created at a checkpoint number 1. The object includes four data blocks, namely data block 0 (2310), data block 1 (2312), data block 2 (2314), and data block 3 (2316). A direct onode (direct block pointer) 2306 includes a pointer to data block 0 (2310) and a pointer to data block 1 (2312). A direct onode 2308 includes a pointer to data block 2 (2314) and a pointer to data block 3 (2316). An indirect onode (indirect block pointer) 2304 includes a pointer to direct onode 2306 and a pointer to direct onode 2308. A root onode 2302 includes a pointer to indirect onode 2304. All onodes and all data blocks are marked with checkpoint number 1.

Suppose now that a retained checkpoint is taken at checkpoint number 2, and data block 0 (2310) is to be modified in checkpoint number 3. In this case, the Object Store sub-module first loads the root onode 2302 for the object and realizes that the root onode 2302 (which was created at checkpoint number 1) was created prior to the last retained checkpoint being taken at checkpoint number 2. It is preferable for the most up-to-date root onode be at the sector number indicated by the object number, in order to optimize access to the most up-to-date version of the object. Therefore, before doing anything else, the Object Store sub-module saves a copy of the old root onode 2302 to free space on the disk, writes a pointer to the saved root onode into the updated root onode, and writes a pointer to the updated root onode into the saved root onode.

Figure 19B:
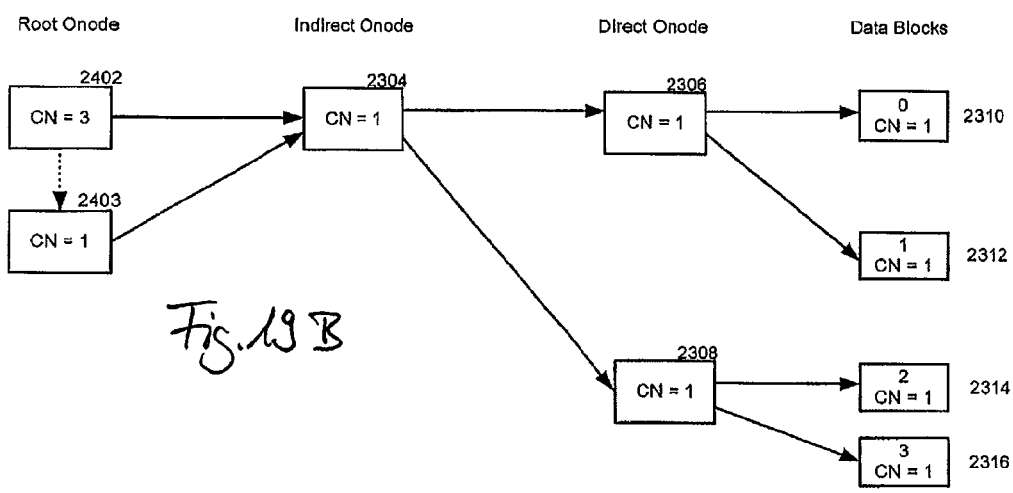

FIG. 19B shows the object structure after a copy of the old root onode is saved to free space on the disk. Specifically, block 2403 represents the copy of the old root onode 2302 saved to free space on the disk. A pointer to the current root onode 2402 is written into the saved root onode 2403. Block 2402 represents the updated root node with checkpoint number 3. A pointer to the saved root onode 2403 is written into the current root onode 2402.

The Object Store sub-module then traverses the object structure starting at the root onode until it reaches the descriptor for data block 0 (2310). Since data block 0 (2310) was created prior to the last retained checkpoint being taken, it cannot be modified. Instead, the Object Store sub-module writes a copy of data block 0 (2310), with the required data modifications, to free space on the disk.

Figure 19C:
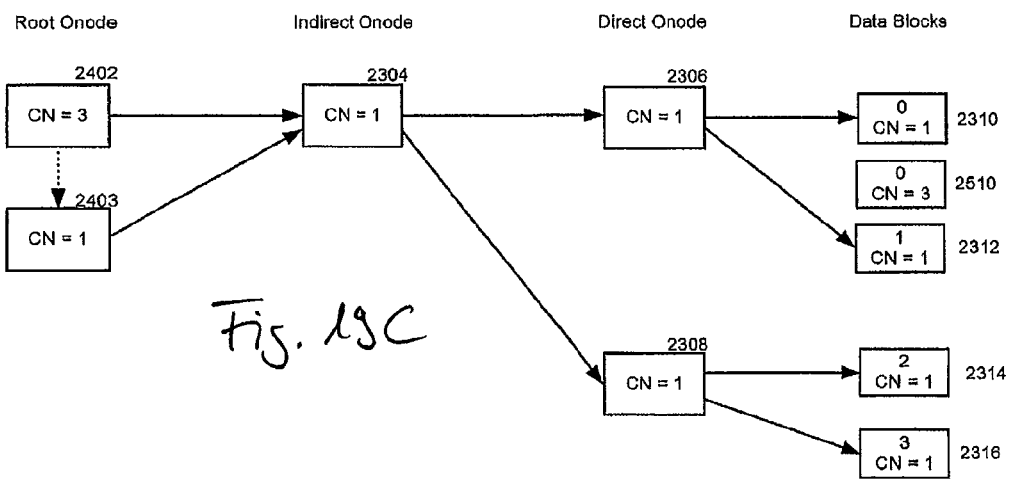

FIG. 19C shows the object structure after a modified copy of data block 0 is written to free space on the disk. Specifically, block 2510 represents the modified copy of data block 0 written to free space on the disk. Block 2510 includes checkpoint number 3 (i.e., the checkpoint at which it was created).

The Object Store sub-module now needs to put a pointer to the new data block 2510 in a direct onode, but the Object Store sub-module cannot put a pointer to the new data block 2510 in the direct onode 2306 because the direct onode 2306 is a component of the retained checkpoint. The Object Store sub-module therefore creates a new direct onode with pointers to the new data block 0 (2510) and the old data block 1 (2312).

Figure 19D:
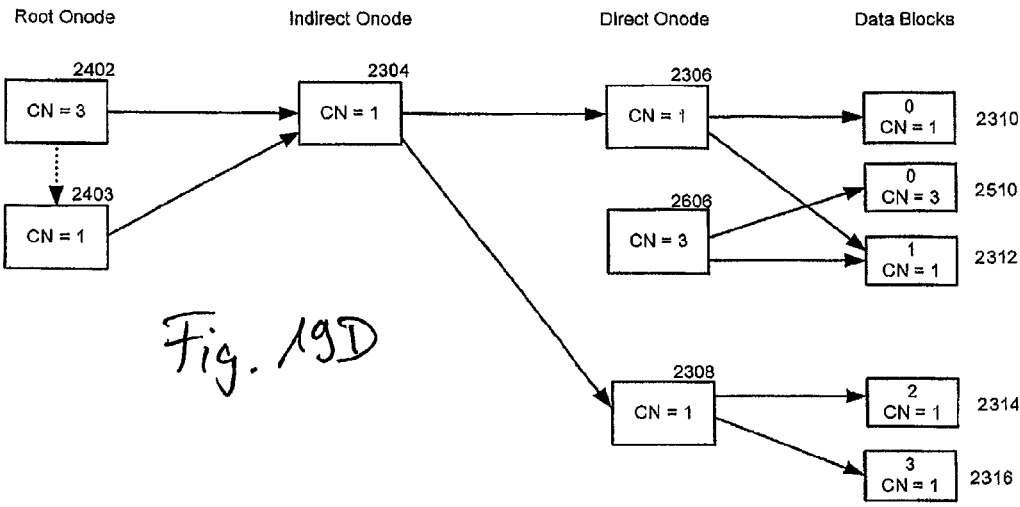

FIG. 19D shows the object structure after a new direct onode is created for the new data block. Specifically, block 2606 represents the new direct onode. Block 2606 includes checkpoint number 3 as well as pointers to the new data block 0 (2510) and the old data block 1 (2312).

The Object Store sub-module now needs to put a pointer to the new direct onode 2606 in an indirect onode, but the Object Store sub-module cannot put a pointer to the new direct onode 2606 in the indirect onode 2304 because the indirect onode 2304 is a component of the retained checkpoint. The Object Store sub-module therefore creates a new indirect onode with pointers to the new direct onode 2606 and the old direct onode 2308.

Figure 19E:
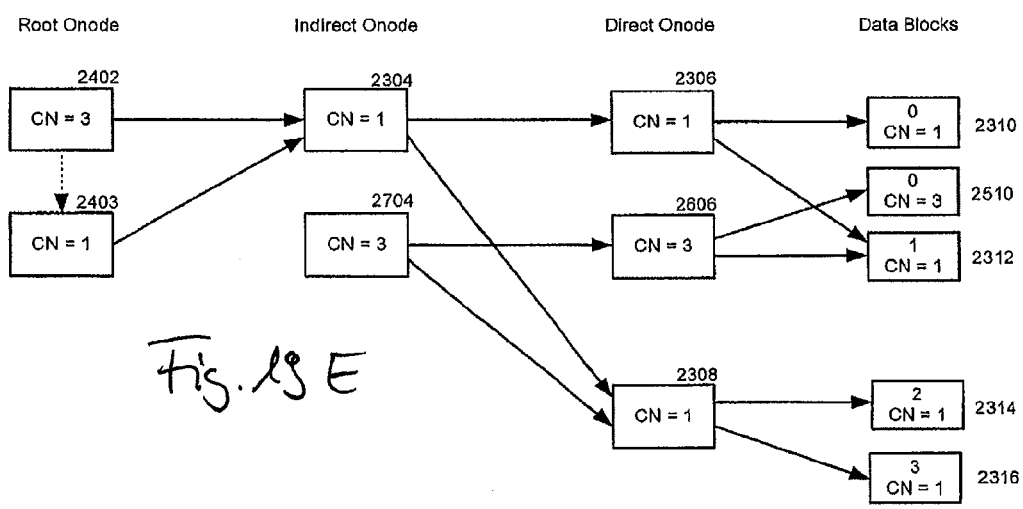

FIG. 19E shows the object structure after a new indirect onode is created for the new direct onode. Specifically, block 2704 represents the new indirect onode. Block 2704 includes checkpoint number 3 as well as pointers to the new direct onode 2606 and the old direct onode 2308.

Finally, the Object Store sub-module writes a pointer to the new indirect onode 2704 in the current version of the objects root onode 2402.

Figure 19F:
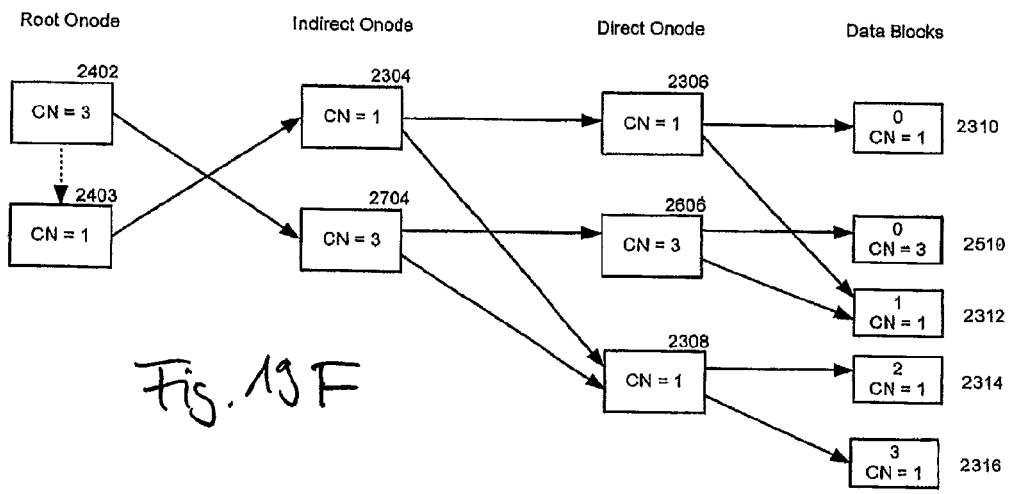
Figure 19G:
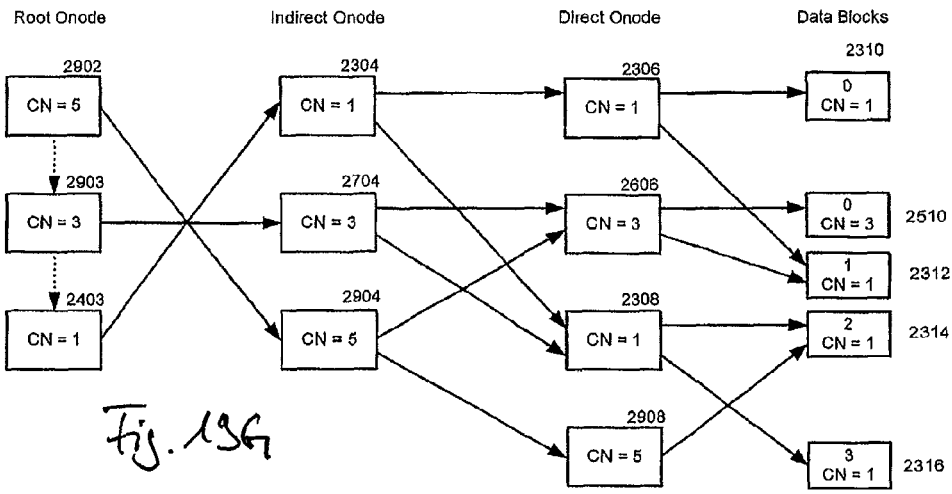

FIG. 19F shows the object structure after the pointer to the new indirect onode 2704 is written into the current version of the objects root onode 2402.

It should be noted that, after modification of data block 0 is complete, blocks 2403, 2304, 2306, and 2310 are components of the retained checkpoint but are not components of the current version of the object; blocks 2308, 2312, 2314, and 2316 are components of both the retained checkpoint and the current version of the object; and blocks 2402, 2704, 2606, and 2510 are components of the current version of the object but are not components of the retained checkpoint.

Suppose now that a retained checkpoint is taken at checkpoint number 4, and data block 3 (2316) is to be deleted in checkpoint number 5. The procedure here is similar to the procedure described above for modifying data block 0, and is described with reference to FIG. 19G which shows the object structure after deleting data block 3.

In this case, the Object Store sub-module saves a copy of the old root onode from checkpoint number 3, represented by block 2903, to free space on the disk, updates the root onode object 2902 to include checkpoint number 5, and updates various pointers in the current and saved root onodes. Specifically, saved root onode 2903 is essentially inserted into a doubly-linked list between the current root onode 2902 and the earlier saved root onode 2403. In the current root onode 2902, the pointer to an older root onode version is updated to point to the saved root onode 2903 rather than to the earlier saved root onode 2403. In the earlier saved root onode 2403, the pointer to a newer root onode version is updated to point to the newer saved root onode 2903 rather than to the current root onode 2902. In the saved root onode 2903, the pointer to a newer root onode version is updated to point to the current root onode 2902, while the pointer to an older root onode version is updated to point to the earlier saved root onode 2403.

The Object Store sub-module then traverses the object structure starting at the root onode until it reaches direct onode 2308, which includes the descriptor for data block 3 (2316). Because direct onode 2308 and data block 3 (2316) are components of an existing retained checkpoint, the Object Store sub-module cannot simply delete data block 3 (2316) and modify direct onode 2308 to remove the descriptor for data block 3 (2316). Therefore, the Object Store sub-module creates a new direct onode 2908 having checkpoint number 5 and a pointer to data block 2 (2314) but no pointer to data block 3 (2316). The Object Store sub-module also creates a new indirect onode 2904 having checkpoint number 5 and pointers to old direct onode 2606 and new direct onode 2908. Finally, the Object Store sub-module writes a pointer to the new indirect onode 2904 into the current version of the root onode 2902.

It should be noted that, after deletion of data block 3 is complete, blocks 2903, 2403, 2304, 2704, 2306, 2308, 2310, and 2316 are components of at least one retained checkpoint but are not components of the current version of the object; blocks 2606, 2510, 2312, and 2314 are components of the current version of the object and at least one retained checkpoint; and blocks 2902, 2904, and 2908 are components of the current version of the object but are not components of any retained checkpoint.

When the Object Store sub-module is asked to perform an operation on an object, it is passed a handle to allow it to identify the object. Among other things, this handle specifies the checkpoint number of the required object. Normally, this would be set to a value that indicates the current version of the object. However, if a different checkpoint number is specified, then the Object Store sub-module performs the operation on the requested version of the object.

The Object Store sub-module attempts to find the requested version of the object by stepping through the current and saved root onodes, using the pointer from a newer version of a root onode to an older version of a root onode, until a root onode is found having the requested checkpoint number or an earlier checkpoint number. The Object Store sub-module then traverses the object structure from that root onode. This is demonstrated by example with reference again to FIG. 19G.

If the Object Store sub-module receives a request for checkpoint number 5, then the Object Store sub-module first goes to the current version of the root onode object 2902. The current root onode 2902 has checkpoint number 5, which is the requested checkpoint number. The Object Store sub-module therefore traverses the object structure from root onode 2902 to provide the requested version of the object. Specifically, root onode 2902 points to indirect onode 2904. Indirect onode 2904 points to direct onodes 2606 and 2908. Direct onode 2606 points to modified data block 0 (2510) and to data block 1 (2312). Direct onode 2908 points to data block 2 (2314). Thus, the current version of the object includes the modified data block 0 and excludes deleted data block 3.

If the Object Store sub-module receives a request for checkpoint number 4, then the Object Store sub-module first goes to the current version of the root onode object 2902. The current root onode 2902 has checkpoint number 5, which is too recent, so the Object Store sub-module follows the pointer to saved root onode 2903. The root onode 2903 has checkpoint number 3, which is earlier than the requested version of the object. The Object Store sub-module therefore traverses the object structure from root onode 2903 to provide the requested version of the object. Specifically, root onode 2903 points to indirect onode 2704. Indirect onode 2704 points to direct onodes 2606 and 2308. Direct onode 2606 points to modified data block 0 (2510) and to data block 1 (2312). Direct onode 2308 points to data block 2 (2314) and to data block 3 (2316). Thus, the retained checkpoint for checkpoint number 4 includes the modified data block 0 and also includes data block 3.

If the Object Store sub-module receives a request for checkpoint number 2, then the Object Store sub-module first goes to the current version of the root onode object 2902. The current root onode 2902 has a checkpoint number of 5, which is too recent, so the Object Store sub-module uses the pointer in root onode 2902 to access saved root onode 2903. The saved root onode 2903 has a checkpoint number of 3, which is also too recent, so the Object Store sub-module uses the pointer in root onode 2903 to access saved root onode 2403. The saved root onode 2403 has a checkpoint number of 1, which is earlier than the requested version of the object. The Object Store sub-module then traverses the object structure from saved root onode 2403 to provide the requested version of the object. Specifically, the root onode 2403 points to indirect onode 2304. Indirect onode 2304 points to direct onodes 2306 and 2308. Direct onode 2306 points to data block 0 (2310) and to data block 1 (2312). Direct onode 2308 points to data block 2 (2314) and to data block 3 (2316). Thus, the retained checkpoint for checkpoint number 2 includes the original four data blocks.

It should be noted that, if the Object Store sub-module is unable to find the requested version of an object, then the Object Store sub-module typically generates an error message. For example, with reference again to FIG. 19G, if the Object Store sub-module receives a request for checkpoint number 0, then the Object Store sub-module steps through the root onodes until it reaches root onode 2403. The root onode 2403 is too recent but also does not have a pointer to an earlier root onode, so the Object Store sub-module generates an error message indicating that the requested version of the object could not be found.

It should also be noted that the retained checkpoints are not permitted to be modified, and the Object Store sub-module will only allow read operations to be performed on them.

There are two stages to the process of deleting a retained checkpoint. The first stage involves getting a list of all of objects that were either created or modified in the retained checkpoint that is being deleted. This is achieved by means of a special object (modified retained objects list objects) that is produced for every retained checkpoint. This object is created when either a volume is opened for the very first time, or after a retained checkpoint has been taken. Every time an object is created, or the first time an object is modified if it was created in a previous retained checkpoint, the object number is written to this object. The object number for this special object is stored in the dynamic superblock. Before creating a retained checkpoint, the software records the object number of this special object for when it later wants to delete that retained checkpoint.

The second stage of deleting the retained checkpoint involves the following sequence of operations for each object either created or modified in the retained checkpoint:

1. Lock the object so that it can't be used by another operation. This is only required if the retained checkpoint is being deleted on a live file system.

2. Find the root onode for the retained checkpoint, the root onode for the previous retained checkpoint (if one exists), and the root onode for either the next retained checkpoint (if one exists) or the current version of the object if the most recent retained checkpoint is being deleted and the object has not been deleted.

3. Go through the structure of the retained checkpoint being deleted and identify all the indirect and direct onodes and data blocks used by it. For each such onode and data block, determine whether the item is only used by the retained checkpoint being deleted. This can be done by finding the equivalent item in both the previous and next versions of the object. If the equivalent item is different in the previous and next versions of the object, then the item is unique to this retained checkpoint.

4. If the item is only used by the retained checkpoint being deleted, then it is no longer required, so it is returned to the free space. If the item is used by the next retained checkpoint, then the item is added to the updated retained objects list for the next checkpoint, if it is not already in the updated retained objects list for the next retained checkpoint. By adding the item to the updated retained objects list, the Object Store sub-module will know to check if the item is still required when that retained checkpoint comes to be deleted.

5. Finally, if the root onode for this retained checkpoint is only used in this retained checkpoint, it too is no longer required and is deleted. In this case, if there is an older retained checkpoint, the pointer backwards from the next version of the root onode (if any), which previously pointed to the root onode of the retained checkpoint being deleted, is updated to point at the root onode of the previous retained checkpoint.

Note that in order to maintain file system integrity, careful attention needs to be paid to how retained checkpoint deletion ties in with the process of taking checkpoints, to make sure that checkpoints always represent a consistent view of the file system and that a crash in the middle of deleting a retained checkpoint can be recovered.

Figure 19H:
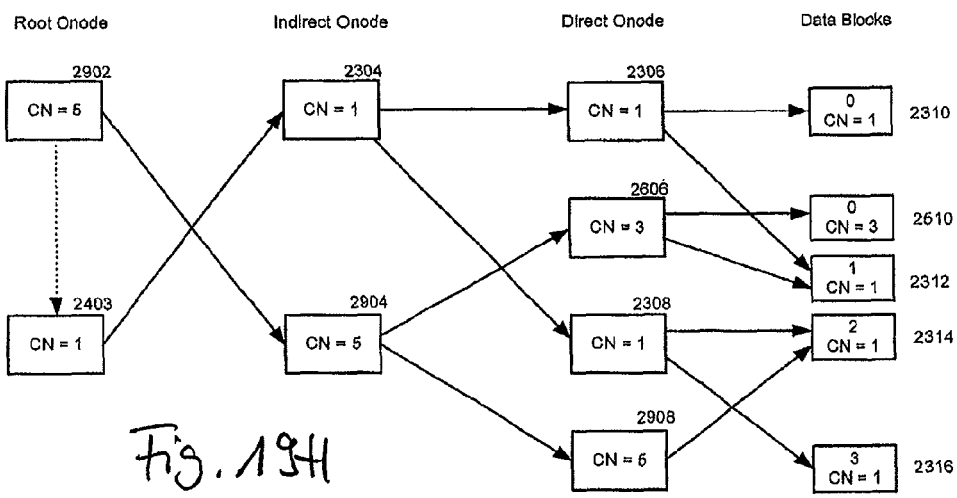

Deleting a retained checkpoint can be demonstrated by example. With reference again to FIG. 19G, suppose that the retained checkpoint created with checkpoint number 4 is to be deleted. This retained checkpoint is represented by root onode 2903. The only items in the structure that are used only by this retained checkpoint are the root onode 2903 and the indirect onode 2704. These onodes are returned to free space. The root onode 2902 is updated to point at the root onode 2403 rather than to the deleted root onode 2903. FIG. 19H shows the object structure after the retained checkpoint for checkpoint number 4 is deleted.

Figure 19I:
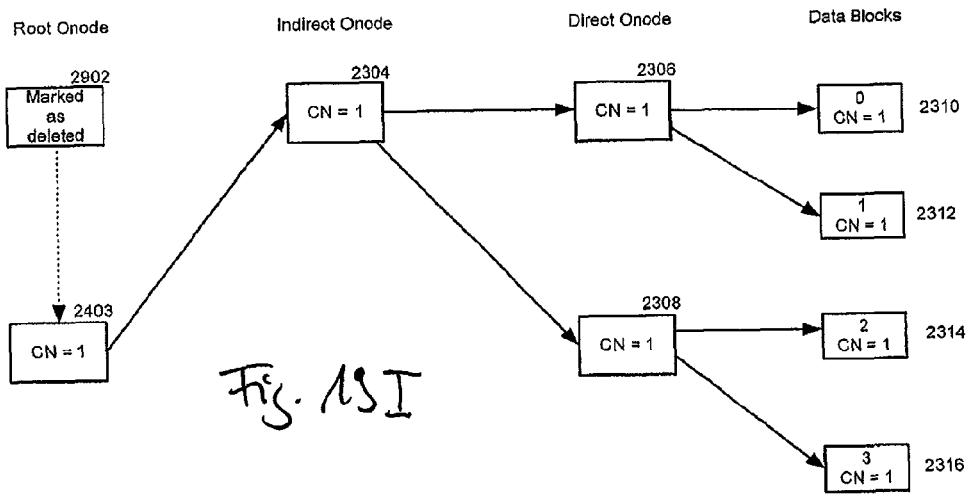

With reference again to FIG. 19H, suppose now that the current version of the object is to be deleted while the retained checkpoint for checkpoint number 2 still exists. This is similar to the case of a retained checkpoint being deleted in that there is a need to identify all of the items in the structure that are unique to the current version and return these to the free space. In this case, onodes 2904, 2606, and 2908 are used for the current version of the object but not for any remaining retained checkpoint, so these onodes are returned to free space. The current root onode 2902 is modified to indicate that it now references an object which has been deleted, but still has a pointer to at least one valid retained checkpoint. FIG. 19I shows the object structure after the current version of the object has been deleted.

When all remaining retained checkpoints for this object are deleted, the current version of the root onode 2902 is returned to the free root onode queue rather than to free space.

Under some conditions, it may be necessary or desirable to revert the live file system to a version represented by a retained checkpoint. Reverting the live file system to a version represented by a retained checkpoint can be accomplished in a number of different ways. Reverting the live file system to a retained checkpoint may involve such things as:

1. Copying the relevant contents of the root onode associated with the retained checkpoint into the current root onode (e.g., pointers to direct and indirect onodes and data blocks, pointer to earlier retained checkpoint, etc.).

2. Identifying the root onode associated with the preceding retained checkpoint (if one exists) and modifying the pointer in that root onode to point to the current root onode rather than to the root onode associated with the retained checkpoint to which the live file system is being reverted.

3. Deleting the root onode associated with the retained checkpoint.

4. Clearing the updated checkpoint objects list (i.e., after reverting the live file system to the version represented by the retained checkpoint, there are effectively no modified objects).

5. Deleting all objects created after the retained checkpoint, including root onodes and other objects associated with any retained checkpoints taken after the retained checkpoint to which the live file system is reverted.

Other than modifying the pointer in the root onode associated with the previous retained checkpoint, if one exists, any older retained checkpoints should remain unchanged. However, all newer retained checkpoints are effectively deleted.

All other functions normally associated with retained checkpoints can be achieved using the mechanisms described here. For instance, incremental backup can be performed by using the updated retained objects lists to work out what has changed between successive retained checkpoints.

Features, components and specific details of the structures of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

The invention claimed is:

1. An apparatus for data migration of a first file system in a data storage system comprising a plurality of client computers, a first file system managing unit for managing the first file system and being connected to the plurality of client computers, and a second file system managing unit for managing a second file system and being connected to the first file system managing unit,
the second file system comprising a plurality of data files and the first file system comprising a plurality of external link objects, each external link object of the first file system being associated with a respective data file of the second file system for enabling client access to the respective data file of the second file system;
the apparatus comprising the first file system managing unit adapted to:
divide file content data of a first file of the second file system into a first group of migration data blocks, and
migrate file content data of a first file of the second file system from the second file system managing unit to the first file system managing unit in units of migration data blocks of the first group of migration data blocks,
wherein client access to data content of a migration data block of the first group of migration data blocks is temporarily held off while the respective migration data block is migrated from the second file system managing unit to the first file system managing unit, and client access requests directed to the respective migration data block of the first group of migration data blocks received during migration of the respective migration data block are queued and executed after the respective migration data block of the first group of migration data blocks has been migrated.

2. The apparatus according to claim 1, wherein
client access to data content of the first group of migration data blocks is enabled for all migration data blocks, which have been migrated from the second file system managing unit to the first file system managing unit, and for all migration data blocks, which have not yet started migration from the second file system managing unit to the first file system managing unit.

3. The apparatus according to claim 1, wherein
the first file system managing unit is adapted to determine a block size of data migration data blocks of the first group of migration data blocks as the smaller value of a maximal block size as supported by the first file system management unit for receiving data blocks and the maximal block size as supported by the second file system management unit for sending data blocks.

4. The apparatus according to claim 1, wherein
when a write access request directed to one or more target migration data blocks of the first group of migration data blocks is received at the first file system managing unit from a client computer, the first file system managing unit is further adapted to:
determine whether at least one target migration data block has been migrated already,
wherein, if at least one target migration data block has been migrated already, the write access request is executed locally by the first file system management unit, and, if none of the target migration data blocks has started migration yet, the write access request is passed through to the second file system management unit for being executed in the second file system by the second file system management unit.

5. The apparatus according to claim 4, wherein
if at least one target migration data block has been migrated already, the first file system managing unit is further adapted to further pass through the write access request to the second file system management unit for being executed in the second file system by the second file system management unit.

6. The apparatus according to claim 1, wherein
when a write access request directed to one or more target migration data blocks of the first group of migration data blocks is received at the first file system managing unit from a client computer, the first file system managing unit is further adapted to:
determine whether all target migration data blocks have been migrated already,
wherein, if none of the target migration data blocks has been migrated yet, the write access request is executed locally by the first file system management unit, and,
when later migrating the one or more target migration data blocks of the first group of migration data blocks, the first file system managing unit is adapted to refrain from migrating a data portion corresponding to a data write block of the write access request.

7. The apparatus according to claim 1, wherein
when a write access request directed to one or more target migration data blocks of the first group of migration data blocks is received at the first file system managing unit from a client computer, the first file system managing unit is further adapted to:
determine whether all target migration data blocks have been migrated already,
wherein, if none of the target migration data blocks has been migrated yet, the write access request is executed locally by the first file system management unit, and,
the first file system managing unit is further adapted to assign a checkpoint number, which is smaller than a current checkpoint number that is assigned to the data write block of the write access request, to a data hole between an end position of an already migrated data portion and a start position of a data write block of the write access request.

8. The apparatus according to claim 1, wherein
when a read access request directed to one or more target migration data blocks of the first group of migration data blocks is received at the first file system managing unit from a client computer, the first file system managing unit is further adapted to:
determine whether all target migration data blocks have been migrated already,
wherein, if all target migration data blocks have been migrated already, the read access request is executed locally by the first file system management unit, and, if at least one of the target migration data blocks has not started migration yet, the read access request is passed through to the second file system management unit for being executed in the second file system by the second file system management unit, and, a corresponding read response received, at the first file system management unit from the second file system management unit, is passed through by the first file system management unit to the requesting client computer.

9. The apparatus according to claim 1, wherein
the first file system managing unit is further adapted to:
determine, at the first file system managing unit, an object store length of file content data stored by the first file system managing unit in the first file system being associated with the first file of the second file system,
determine, at the first file system managing unit based on data received from the second file system managing unit, a length of the first file of the second file system, and
determine that all migration data blocks of the first group have been migrated when it is determined that said object store length is equal to said length of the first file.

10. The apparatus according to claim 9, wherein characterized in that
the first file system managing unit is further adapted to:
delete the external link object of the first file system being associated with the first file of the second file system when it is determined that all migration data blocks of the first group have been migrated; and/or
send, to the second file system management unit, a request for deletion of the first file of the second file system when it is determined that all migration data blocks of the first group have been migrated.

11. The apparatus according to any claim 1, wherein
the first file system managing unit is further adapted to:
receive, from a client computer, a file creation request for creating a second file in the second file system in a path location indicated in the file creation request, and
create the second file in the first file system based on path location indicated in the file creation request.

12. The apparatus according to claim 1, wherein
the first file system managing unit is further adapted to:
determine, for a first migration data block of the first group of migration data blocks, whether said first migration data block has at least one non-zero bit; and
refrain from migrating said first migration data block from the second file system managing unit to the first file system managing unit when it is determined that said first migration data block does not have at least one non-zero bit and/or
update metadata of the first file indicating that a storage region associated with the said first migration data block shall contain only zeros.

13. The apparatus according to claim 12, wherein
determining whether said first migration data block has at least one non-zero bit is performed by the first file system management unit based on data indicative of a position of a first non-zero bit in the file content of the first file in the second file system based on a read response directed to the first file being received from the second file system management unit.

14. The apparatus according to claim 12, wherein
determining whether said first migration data block has at least one non-zero bit is performed by the first file system management unit based on a byte-by-byte analysis of the first migration data block.

15. The apparatus according to claim 1, wherein
the first file system managing unit is further adapted to:
determine, for a second migration data block of the first group of migration data blocks, whether said migration data block has at least one non-zero bit, if a ratio of a usage percentage of storage space allocated for the first file in the second file system and a length of the first file indicating the storage space allocated for the first file in the second file system falls below a predetermined threshold, and
refrain from migrating said second migration data block from the second file system managing unit to the first file system managing unit if it is determined that said second migration data block does not have at least one non-zero bit and/or
update metadata of the first file indicating that a storage region associated with the said first migration data block shall contain only zeros.

16. A method for data migration of a first file system in a data storage system comprising a plurality of client computers, a first file system managing unit for managing the first file system and being connected to the plurality of client computers, and a second file system managing unit for managing a second file system and being connected to the first file system managing unit,
the second file system comprising a plurality of data files and the first file system comprising a plurality of external link objects, each external link object of the first file system being associated with a respective data file of the second file system for enabling client access to the respective data file of the second file system;
the method comprising:
dividing file content data of a first file of the second file system into a first group of migration data blocks, and
migrating file content data of a first file of the second file system from the second file system managing unit to the first file system managing unit in units of migration data blocks of the first group of migration data blocks,
wherein client access to data content of a migration data block of the first group of migration data blocks is temporarily held off while the respective migration data block is migrated from the second file system managing unit to the first file system managing unit, and client access requests directed to the respective migration data block of the first group of migration data blocks received during migration of the respective migration data block are queued and executed after the respective migration data block of the first group of migration data blocks has been migrated.

17. A data storage system for data migration of a first file system, the data storage system comprising a plurality of client computers, a first file system managing unit for managing the first file system and being connected to the plurality of client computers, and a second file system managing unit for managing a second file system and being connected to the first file system managing unit,
the second file system comprising a plurality of data files and the first file system comprising a plurality of external link objects, each external link object of the first file system being associated with a respective data file of the second file system for enabling client access to the respective data file of the second file system;
the first file system managing unit being adapted to:
divide file content data of a first file of the second file system into a first group of migration data blocks, and
migrate file content data of a first file of the second file system from the second file system managing unit to the first file system managing unit in units of migration data blocks of the first group of migration data blocks,
wherein client access to data content of a migration data block of the first group of migration data blocks is temporarily held off while the respective migration data block is migrated from the second file system managing unit to the first file system managing unit, and client access requests directed to the respective migration data block of the first group of migration data blocks received during migration of the respective migration data block are queued and executed after the respective migration data block of the first group of migration data blocks has been migrated.

18. A file system server for use in a data storage system for data migration of a first file system, the data storage system comprising a plurality of client computers, a first file system managing unit for managing the first file system and being connected to the plurality of client computers, and a second file system managing unit for managing a second file system and being connected to the first file system managing unit,
the second file system comprising a plurality of data files and the first file system comprising a plurality of external link objects, each external link object of the first file system being associated with a respective data file of the second file system for enabling client access to the respective data file of the second file system;

the first file system managing unit being adapted to:

divide file content data of a first file of the second file system into a first group of migration data blocks, and migrate file content data of a first file of the second file system from the second file system managing unit to the first file system managing unit in units of migration data blocks of the first group of migration data blocks, wherein client access to data content of a migration data block of the first group of migration data blocks is temporarily held off while the respective migration data block is migrated from the second file system managing unit to the first file system managing unit, and client access request directed to the respective migration data block of the first group of migration data blocks received during migration of the respective migration data block are queued and executed after the respective migration data block of the first group of migration data blocks has been migrated.

19. A non-transitory computer readable storage medium comprising computer program code being configured to cause a processing unit of a file system management unit in a data storage system, comprising a plurality of client computers, a first file system managing unit for managing the first file system and being connected to the plurality of client computers, and a second file system managing unit for managing a second file system and being connected to the first file system managing unit, the second file system comprising a plurality of data files and the first file system comprising a plurality of external link objects, each external link object of the first file system being associated with a respective data file of the second file system for enabling client access to the respective data file of the second file system, to execute the steps:

dividing file content data of a first file of the second file system into a first group of migration data blocks, and migrating file content data of a first file of the second file system from the second file system managing unit to the first file system managing unit in units of migration data blocks of the first group of migration data blocks, wherein client access to data content of a migration data block of the first group of migration data blocks is temporarily held off while the respective migration data block is migrated from the second file system managing unit to the first file system managing unit, and client access requests directed to the respective migration data block of the first group of migration data blocks received during migration of the respective migration data block are queued and executed after the respective migration data block of the first group of migration data blocks has been migrated.

\* \* \* \* \*